(12) United States Patent
Awadin et al.

(10) Patent No.: US 12,376,098 B2
(45) Date of Patent: Jul. 29, 2025

(54) COVERAGE ENHANCEMENT FOR REDUCED CAPABILITY NEW RADIO DEVICES

(71) Applicant: INTERDIGITAL PATENT HOLDINGS, INC., Wilmington, DE (US)

(72) Inventors: Mohamed M. Awadin, Plymouth Meeting, PA (US); Patrick Svedman, Stockholm (SE); Qing Li, Princeton Junction, NJ (US); Yifan Li, Conshohocken, PA (US); Kyle Pan, Saint James, NY (US); Allan Tsai, Boonton, NJ (US); Pascal Adjakple, Great Neck, NY (US); Joseph Murray, Schwenksville, PA (US); Rocco Di Girolamo, Laval (CA); Zhuo Chen, Conshohocken, PA (US); Guodong Zhang, Woodbury, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 413 days.

(21) Appl. No.: 17/906,488

(22) PCT Filed: Mar. 19, 2021

(86) PCT No.: PCT/US2021/023152
§ 371 (c)(1),
(2) Date: Sep. 16, 2022

(87) PCT Pub. No.: WO2021/188893
PCT Pub. Date: Sep. 23, 2021

(65) Prior Publication Data
US 2023/0140213 A1 May 4, 2023

Related U.S. Application Data

(60) Provisional application No. 62/992,366, filed on Mar. 20, 2020.

(51) Int. Cl.
*H04W 72/1263* (2023.01)
*H04L 1/08* (2006.01)
*H04W 72/231* (2023.01)

(52) U.S. Cl.
CPC .......... *H04W 72/1263* (2013.01); *H04L 1/08* (2013.01); *H04W 72/231* (2023.01)

(58) Field of Classification Search
CPC ......... H04L 1/08; H04L 1/1887; H04L 1/189; H04L 1/1896; H04L 5/001; H04L 5/0012;
(Continued)

(56) References Cited

U.S. PATENT DOCUMENTS 11,277,862 B2 * 3/2022 Jeon ................... H04L 5/0092
11,368,275 B2 * 6/2022 Moon .................. H04L 5/0094
(Continued)

FOREIGN PATENT DOCUMENTS

WO WO-2020009498 A1 * 1/2020 ........... H04L 5/0007
WO WO-2022155488 A1 * 7/2022

OTHER PUBLICATIONS

3GPP TS 38.214, Physical Layer Procedures for data (Release 16), Dec. 2019.
(Continued)

*Primary Examiner* — Eric Nowlin
(74) *Attorney, Agent, or Firm* — Flaster Greenberg P.C.

(57) ABSTRACT

Blind coverage for wireless devices is enhanced varying one or more transmission characteristics of a repeated transmission sent or received by apparatuses, where the repeated transmission includes, for example a Physical Downlink Shared CHannel (PDSCH) and/or a Physical Uplink Shared
(Continued)

CHannel (PUSCH) transmissions. Varied characteristics may include a start time for each repetition, a duration for each repetition, a start frequency for each repetition, a bandwidth of each repetition, a number of repetitions for each subframe, and/or a number of repetitions for each slot. Repetitions may be within a Bandwidth Part (BWP) or span multiple BWPs. Repetitions may vary from one to another in start time, start frequency, duration, bandwidth, and slot and subframe patterns. Higher level signalling, such as Radio Resource Control (RRC) signalling may be used to control the inclusion or omission of a DeModulation Reference Signal (DMRS) in repeated transmissions.

16 Claims, 43 Drawing Sheets

(58) Field of Classification Search
CPC ... H04L 5/0028; H04L 5/0044; H04L 5/0048; H04L 5/0069; H04L 5/0087; H04L 5/0091; H04L 27/2601; H04W 72/1263; H04W 72/231
See application file for complete search history.

(56) References Cited

U.S. PATENT DOCUMENTS

| | | | | |
|---|---|---|---|---|
| 11,516,786 B2* | 11/2022 | Hwang | | H04W 72/23 |
| 11,546,121 B2* | 1/2023 | Kim | | H04L 5/0098 |
| 11,711,798 B2* | 7/2023 | Kim | | H04L 1/1664 |
| | | | | 370/329 |
| 11,792,751 B2* | 10/2023 | Harada | | H04L 5/0048 |
| | | | | 370/329 |
| 2019/0132862 A1* | 5/2019 | Jeon | | H04L 5/0098 |
| 2019/0149305 A1* | 5/2019 | Zhou | | H04L 5/0092 |
| | | | | 370/330 |
| 2019/0166066 A1* | 5/2019 | Ang | | H04L 5/0078 |
| 2019/0289513 A1* | 9/2019 | Jeon | | H04W 72/0453 |
| 2020/0052827 A1 | 2/2020 | Vilaipornsawai et al. | | |
| 2020/0162207 A1* | 5/2020 | Hwang | | H04L 1/1893 |
| 2020/0187093 A1* | 6/2020 | Awad | | H04W 48/10 |
| 2020/0313819 A1* | 10/2020 | Zhou | | H04W 72/046 |
| 2020/0344034 A1* | 10/2020 | Moon | | H04L 5/10 |
| 2020/0351946 A1* | 11/2020 | Pang | | H04W 72/23 |
| 2021/0037554 A1* | 2/2021 | Kim | | H04L 5/0092 |
| 2021/0204231 A1* | 7/2021 | Harada | | H04L 5/001 |
| 2021/0235440 A1* | 7/2021 | Liang | | H04W 72/0453 |
| 2021/0367743 A1* | 11/2021 | Kim | | H04L 5/0098 |
| 2022/0353817 A1* | 11/2022 | Cheng | | H04W 52/0258 |
| 2025/0030525 A1* | 1/2025 | Ly | | H04W 72/0453 |

OTHER PUBLICATIONS

3GPP TS 38.331, Radio Resource Control (RRC) protocol specification (Release 15), V15.8.0, Dec. 2019.
Ericsson: "On remaining issues of UE feature", 3GPP Draft; R1-1802766 REL-15 NR UE Feature List Remaining Open Issues, 3rd Generation Partnership Project (3GPP), Mobile Competence Centre; 650, Route Des Lucioles; F-06921 Sophia-Antipolis Cedex; vol. RAN WG1, No. Athens, Greece; Feb. 26, 2018-Mar. 2, 2018 Feb. 17, 2018 (Feb. 17, 2018), XP051398198.
Nokia et al: "On the PDCCH enhancements for NR URLLC" 3GPP Draft; R1-1813113_URLLC_DL_CONTROL, RD Generation Partnership Project (3GPP), Mobile Competence Centre; 650, Route Des Lucioles; F-0692'1 Sophia-Antipolis Cedex; France, vol. RAN WG1, No. Spokane, US; Nov. 12, 2018-Nov. 16, 2018 Nov. 11, 2018 (Nov. 11, 2018), XP051555094.
NTT Docomo et al: Offline summary for UL data transmission procedure, 3GPP Draft; R1-1811821, 3rd Generation Partnership Project (3GPP), Mobile Competence Centre; 650, Route Des Lucioles; F-06921 Sophia-Antipolis Cedex; France vol. RAN WG1, No. Chengdu, China; Pct. 8, 2018-Oct. 12, 2018 Oct. 9, 2018 (Oct. 9, 2018), XP0-51519148.
Ratasuk Rapeepat et al: "Coverage enhancement for M2M communications using LTE" 2014 21st International Conference on Telecommunications (ICT), IEEE, May 4, 2014 (May 4, 2014), pp. 482-486, XP032969700.
Third Generation Partnership Project, "Pusch Enhancements for NR URLLC", 3GPP TSG-RAN WG1 #98, R1-1908237, Prague, CZ, Aug. 26-30, 2019, 9 pages.
Third Generation Partnership Project, "Outcome of offline discussion on 7.1.3.1.4 (DCI content)—part II", 3GPP TSG-RAN WG1 #93, R1-1807738, Busan, Korea, May 21-25, 2018, 15 pages.
Third Generation Partnership Project, "Enhancements on Multi-TRP and Multi-Panel Transmission", 3GPP TSG-RAN WG1 #98bis, R1-1910116, Chongqing, China, Oct. 14-20, 2019, 13 pages.
Third Generation Partnership Project, "Text Proposal for UL Transmission Procedure", 3GPP TSG-RAN WG1 Meeting 91, R1-1800513, Reno, USA, Nov. 27-Dec. 1, 2017, 4 pages.
Third Generation Partnership Project, "Text Proposal for UL Transmission Procedure", 3GPP TSG-RAN WG1 Meeting 91, R1-1720824, Reno, USA, Nov. 27-Dec. 1, 2017, 12 pages.
Third Generation Partnership Project (3GPP), "On Uplink Data Scheduling", Huawei, HiSilicon, 3GPP TSG RAN WG1 NR Ad-Hoc Meeting, Qingdao, China, Jun. 27-30, 2017, R1-1710465, 5 pages.
Third Generation Partnership Project (3GPP), "Remaining Issues on BWP", Spreadtrum Communications, 3GPP TSG RAN WG1#92, Athens, Greece, Feb. 26-Mar. 2, 2018, R1-1801842, 2 pages.
Third Generation Partnership Project (3GPP), "Clarification on BWP ID in MAC CE", Spreadtrum Communications, R2, 3GPP TSG-RAN WG2 Meeting #104, Spokane, USA, Nov. 12-16, 2018, R2-1817334, 2 pages.

* cited by examiner

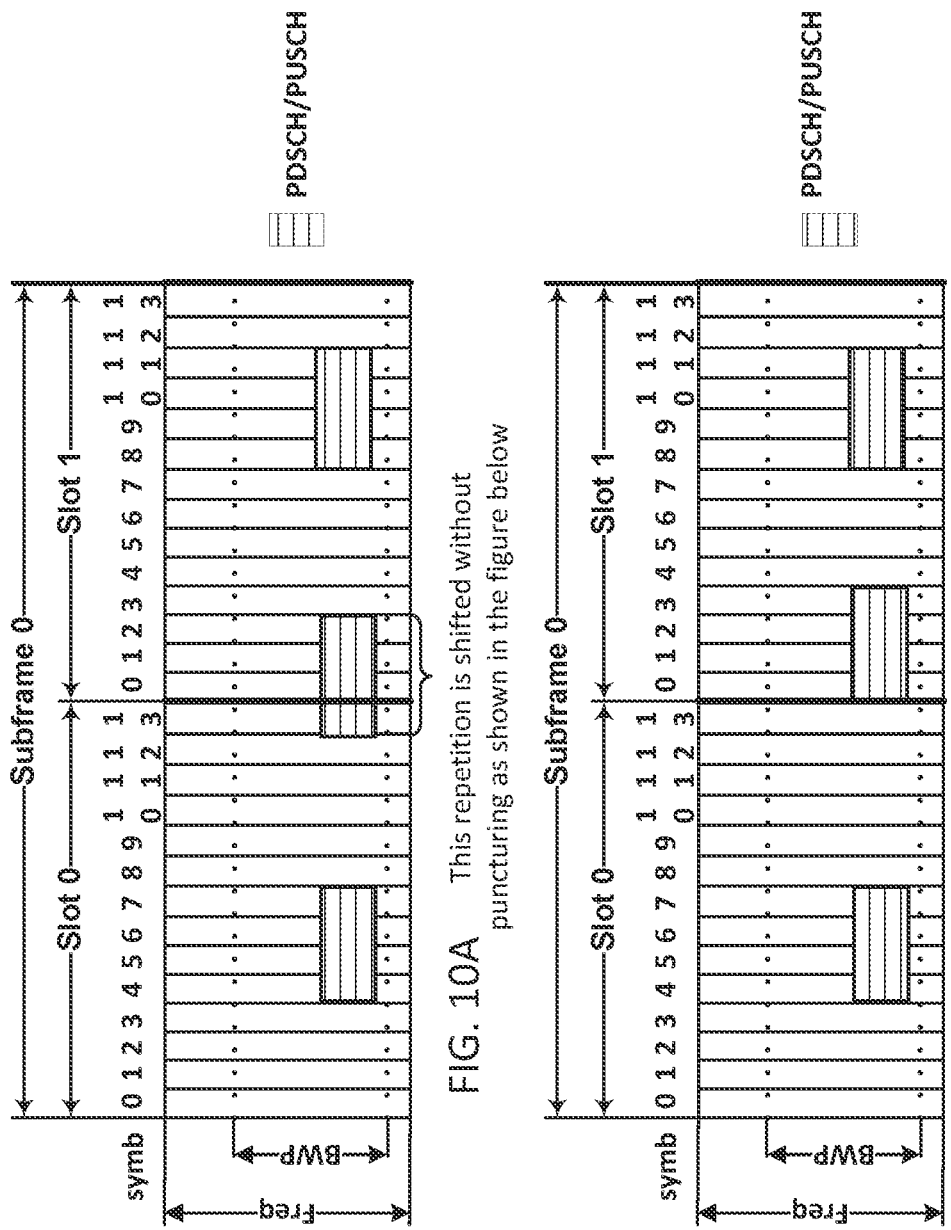

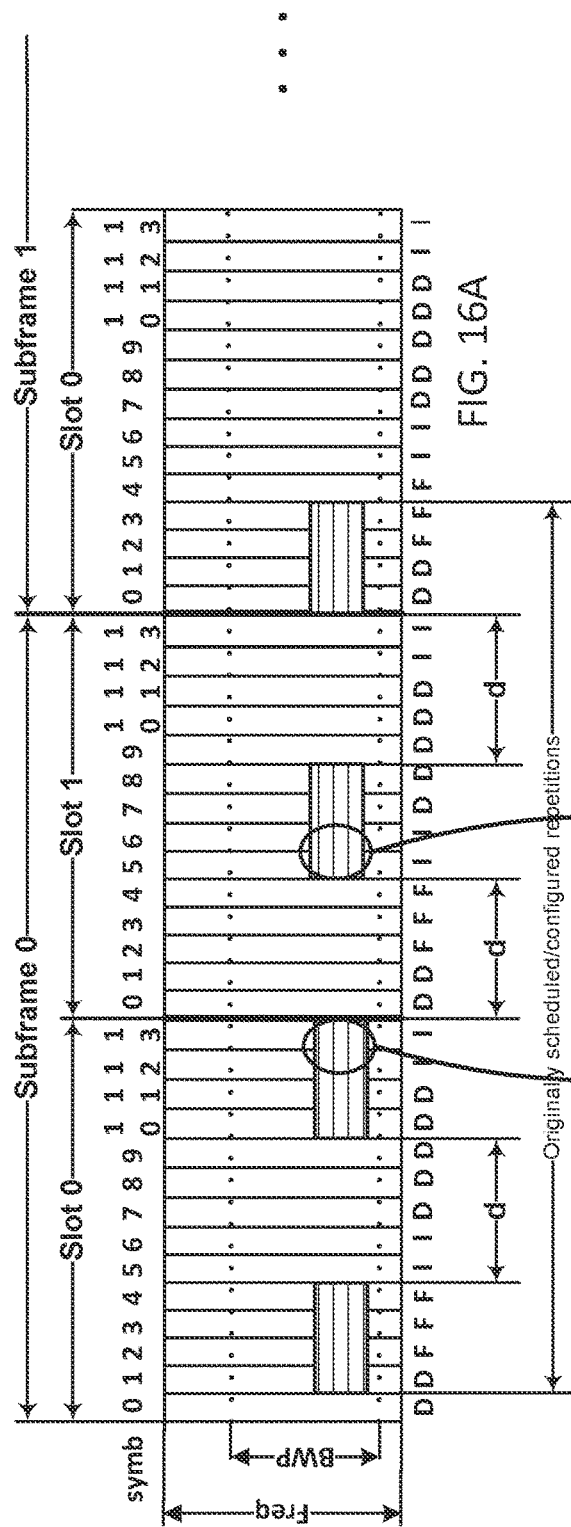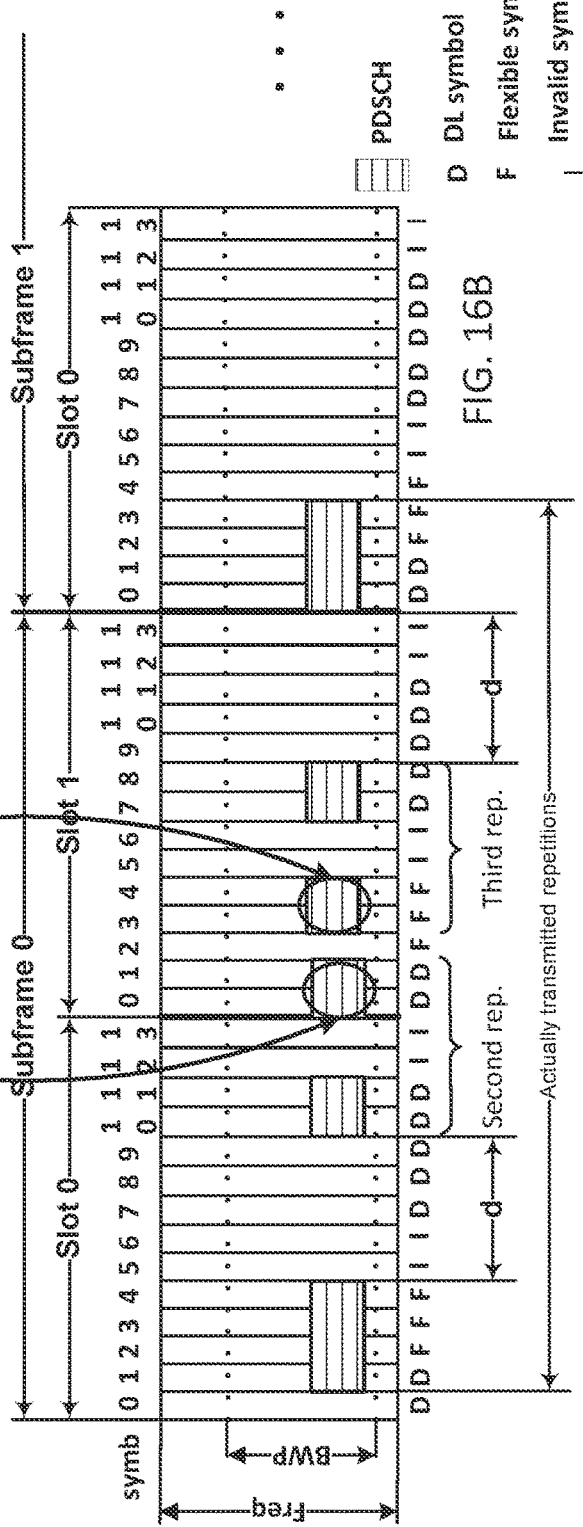

COVERAGE ENHANCEMENT FOR REDUCED CAPABILITY NEW RADIO DEVICES

CROSS-REFERENCE TO RELATED APPLICATIONS

This application is the National Stage Application of International Patent Application No. PCT/US2021/023152, filed Mar. 19, 2021, which claims the benefit of priority of U.S. Provisional Patent Application No. 62/992,366, filed 20 Mar. 2020, the contents of which is hereby incorporated by reference in its entirety.

BACKGROUND

This disclosure pertains to radio communications, such as those, for example, taking advantage of the techniques of 3GPP TS 38.331, Radio Resource Control (RRC) protocol specification (Release 15), V15.8.0, and 3GPP TS 38.214, Physical layer procedures for data (Release 16), V16.0.0.

SUMMARY

Blind coverage enhancement for wireless devices may be achieved by a number means, such as repeating Physical Downlink Shared CHannel (PDSCH) and/or Physical Uplink Shared CHannel (PUSCH) transmissions with various patterns in the time domain, e.g., within a Bandwidth Part (BWP) or across different BWPs. PDSCH and PUSCH may be repeated across different beams when frequency hopping is enabled or disabled.

To facilitate such repetitions, procedures may be used for managing the crossing of slot boundaries, managing invalid symbols and handling reserved resource elements. Signaling may be used to indicate the repetition parameters in time and frequency domains.

Unblind coverage enhancement may be realized using procedures to enable a User Equipment (UE) to assist the network in determining or modifying the number of repetitions for PDSCH and PUSCH.

For either blind or unblind coverage enhancement procedures, the overhead DeModulation Reference Signal (DMRS) may be reduced by a variety of means, such as DMRS sharing between different repetitions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIGS. 10A and 10B are time and frequency diagrams illustrating examples of shifting a repetition such that it is fully contained within a slot that has the most symbols for the repetition.

FIGS. 16A and 16B are time and frequency diagrams illustrating examples of splitting a repetition around invalid symbols In FIG. 17A, no threshold is defined. In FIG. 17B there are not enough symbols to carry any portion of the repetition.

In FIG. 30A, the DMRS in alternate repetitions is dropped. In FIG. 30B, the repetitions in which DMRS can be dropped are indicated by a bitmap.

DETAILED DESCRIPTION

Terminology

Figure 1:
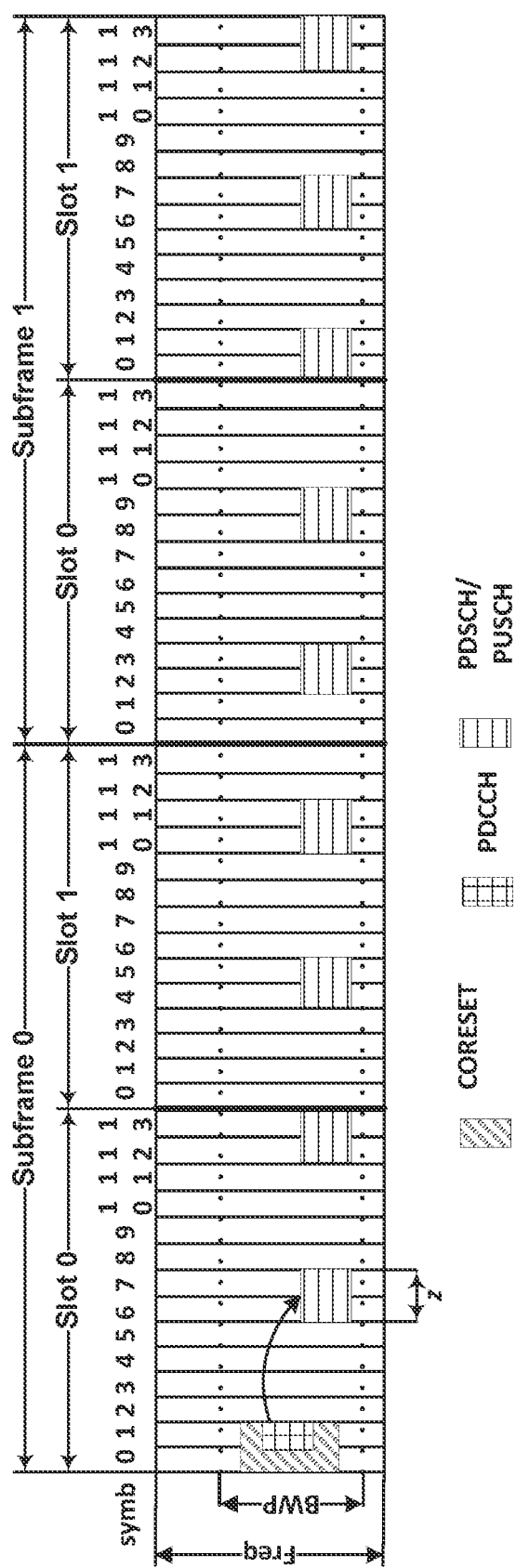
FIG. 1 is a time and frequency diagram illustrating an example of non-contiguous PDSCH or PUSCH repetitions for dynamically scheduled PDSCH or PUSCH or SPS-PDSCH or configured PUSCH grant type 2.

Table 0 of the Appendix describes many of the abbreviations used herein.

Herein the term "procedure" generally refers to methods of performing operations to achieve particular ends. The term "procedure" is used in place of "method" to avoid confusion with special meanings of the term "method" in the context of M2M and IoT applications. The steps described for procedures are often optional, and may potentially be performed in a variety of ways and in a variety of sequences. The term "procedure" should not be interpreted as referring to a rigid set and sequence of steps, but rather to a general methodology for achieving results that may be adapted in a variety of ways.

Repetition in NR

For physical downlink shared channel (PDSCH), there are multiple types of repetition procedures that can be configured. In one type, PDSCH may be repeated in consecutive slots. The number of repetitions is configured by radio resource control (RRC) parameter pdsch-AggregationFactor as described in 3GPP TS 38.331, Radio Resource Control (RRC) protocol specification (Release 15), V15.8.0

The same symbol allocation is applied across the pdsch-AggregationFactor consecutive slots. In other words, the repetitions occupy the same symbols indicated by start and length indicator value (SLIV) across the pdsch-AggregationFactor consecutive slots. For dynamic PDSCH scheduling, the downlink control information (DCI) format 1_1 or 1_2 scrambled by cell radio-network temporary identifier (C-RNTI), modulation coding scheme radio-network temporary identifier (MCS-RNTI) provides the SLIV of the first repetition and the same SLIV value is applied across the consecutive slots. See 3GPP TS 38.214, Physical layer procedures for data (Release 16), V16.0.0.

The semi-persistent PDSCH is configured by sps-config which provides, among other information, the periodicity for downlink semi-persistent scheduling (DL SPS). See TS 38.331. Moreover, it is activated by DCI format 1_0 or 1_1 or 1_2 scrambled by configured scheduling radio-network temporary identifier (CS-RNTI) which provides, among other information, the SLIV and k0 indicating the slot offset between DCI and its scheduled PDSCH See TS 38.214. If pdvch-AggregationFactor is configured, each PDSCH is repeated pdvch-AggregationFactor times in consecutive slots and all the repetitions occupy the same symbols.

For PDSCH repetitions when pdvch-AggregationFactor is configured, the redundancy version is cycled starting from the indicated redundancy version (RV) in the DCI according to the sequence 0-2-3-1.

Also, in the context of single-DCI based multiple transmission and reception point (M-TRP) PDSCH for ultra-reliable and low-latency communications (URLLC), multiple repetition procedures were developed. TDMSchemeA and TDMSchemeB PDSCH are of interest as they describe the PDSCH repetition in the time domain.

Specifically, in TDMSchemeA, the time domain PDSCH repetitions are confined within a single slot. The number of repetitions is implicitly determined, and it is equal to the number of indicated Transmission Configuration Indication (TCI) states in the DCI. The first repetition is indicated by following new ratio (NR) Rel. 15 scheduling through the SLIV. The remaining repetitions shall have the same duration as the first one, and the spacing between the first symbol of a repetition and the previous repetition is set by high layer parameter StartingSymbolOffsetK. See TS 38.214.

On the other hand, in TDMSchemeB, the time domain PDSCH repetitions are transmitted in consecutive slots. The number of repetitions is indicated by RepNumR16 in PDSCH-TimeDomainResourceAllocation. The same SLIV is applied for all PDSCH transmission occasions See TS 38.214.

For PDSCH repetitions according to TDMSchemeA or B, the RV of the PDSCH repetitions associated with the first TCI state shall follow the same RV derived in case of pdsch-AggregationFactor. For PDSCH repetitions associated with the second TCI state, an additional shift is applied, and the shift value is provided by high layer signalling RVSeqOffset. See TS 38.214.

The current framework for NR does not allow PDSCH repetitions to be adjusted dynamically.

For example, the number of repetitions in pdsch-AggregationFactor, and the spacing between the repetitions when using a TDMSchemeA PDSCH repetition procedure, must be set through RRC re-configuration.

Similarly, current NR configurations only allow the repetitions to either be fully confined in a single slot, or to span multiple consecutive slots with one repetition per slot.

Currently, PDSCH repetitions cannot be configured or scheduled to occupy non-consecutive slots, and PDSCH repetitions cannot be configured such that they are confined with a slot and at the same time they occupy multiple consecutive or non-consecutive slots, although these would be beneficial to balance between the latency requirement and coverage enhancement.

For Physical Uplink Shared Channel (PUSCH), there are two main types of repetitions: PUSCH repetition Type A and PUSCH repetition Type B. To a certain extent, PUSCH repetition Type A is like the repetitions for PDSCH, which take place in consecutive slots, with each slot having only one repetition. On the other hand, PUSCH repetition Type B, which was developed for URLLC in NR Rel. 16, enables back-to-back repetitions in single or multiple consecutive slots.

For PUSCH repetition Type A, the time domain resources of the first repetition are indicated by a SLIV value. On the other hand, for PUSCH repetition Type B, a separate field for the start and length is introduced to provide more flexibility, and to allow S+L<=27 compared with S+L<=14 for PUSCH repetition Type A.

Table 1 of the Appendix shows which PUSCH mapping type can be used with different types of PUSCH repetition.

Challenges

Reduced capability NR devices are expected to have limited capabilities which may be reflected in one or more of the following features: reduced processing power, fewer antennas, and shorter battery life. Therefore, the coverage for reduced capability NR devices is expected to be severely diminished for all channels. For PDSCH, the existing coverage enhancement procedures in NR have limited flexibility, since repetitions have to occur in consecutive slots with only single repetition in each slot, or multiple repetitions in a single slot. On the other hand, PUSCH has two types of repetition procedures. PUSCH repetition type A is similar to the PDSCH repetition procedure which suffers from the aforementioned drawbacks. PUSCH repetition type B is more appropriate for URLLC use cases. Therefore, enhancement for PDSCH or PUSCH repetition schemes for reduced capability NR devices are needed to relax the requirements that repetitions have to occur over consecutive slots Example Solutions For reduced capability devices, the traffic is typically either small or consists of medium data transmissions with more tolerance to latency comparing with URLLC devices. In addition, reduced capability devices are often located in places where blockage or attenuation is more severe, as compared with Enhanced Mobile Broadband (eMBB) devices. Different repetition schemes are described herein for improving the data transmission coverage with relaxed latency.

Start and Duration of Repetitions in Time Domain

To enhance the coverage of downlink or uplink shared channel, repetitions may be scheduled dynamically or non-dynamically. This may be applied to a PDSCH transmitted on downlink by a next generation nodeB (gNB), for example, or a PUSCH transmitted on uplink by a UE. Through semi-persistent PDSCH, or configured PUSCH grant type 1 or type 2, for example, the gNB may repeatedly transmit a data via PDSCH on downlink, and a UE may repeatedly transmit a data via PUSCH on uplink respectively. These repetitions may have the same or different power levels, redundancy versions, durations, Modulation Coding Scheme (MCS), and/or start or end location in different slots.

The repetitions may occupy contiguous or non-contiguous Orthogonal Frequency-Division Multiplexing (OFDM) symbols or slots. Repetitions may be either fully contained within one slot or subframe or frame or spanning multiple slots or subframes or frames. FIG. 1 shows an example of dynamic PDSCH or PUSCH transmissions with repetition indicated by DCI. For example, DCI format 0_0 or 0_1 or 0_2 for PUSCH and DCI format 1_0 or 1_1 or 1_2 for PDSCH may be used, and may be scrambled with C-RNTI. Semi-persistent PDSCH with repetition activated may be used with DCI format 1_1 or 1_2 scrambled with CS-RNTI, for example, or configured PUSCH grant type 2 with repetition activated with DCI format 0_0 or 0_1 or 0_2 scrambled with CS-RNTI. In the example of FIG. 1, PDSCH or PUSCH repetitions are uniformly spaced with four OFDM symbols over multiple slots or subframes. Each repetition is of the same length z spanning contiguous OFDM symbols.

Figure 2:
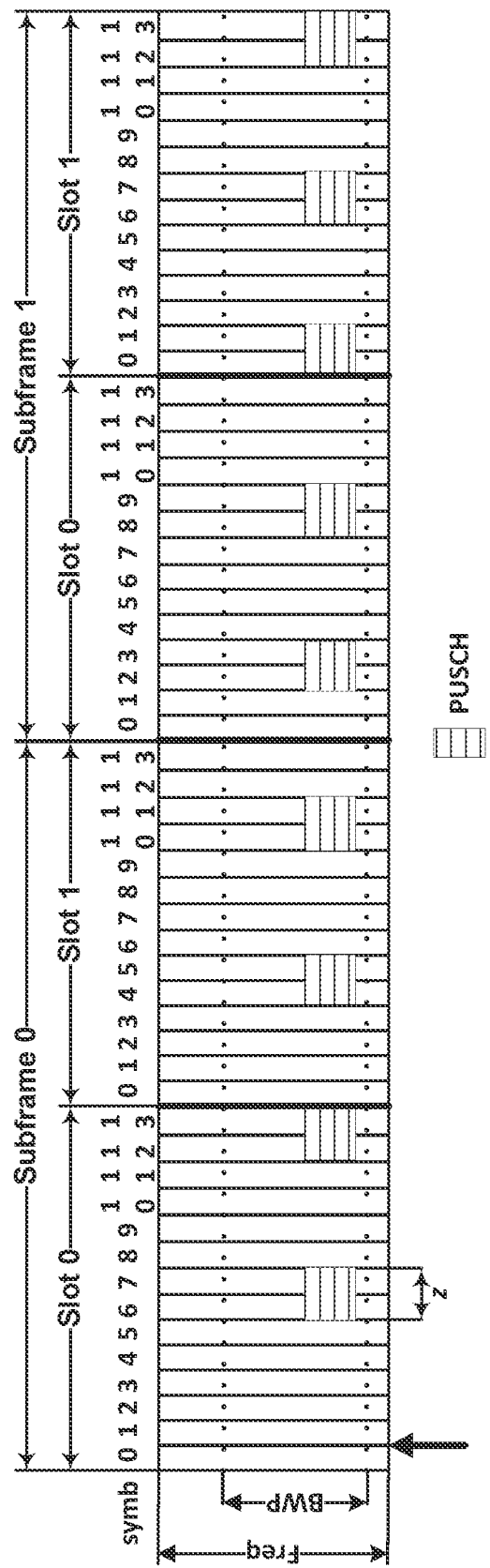
FIG. 2 is a time and frequency diagram illustrating an example of non-contiguous PUSCH repetition for configured PUSCH grant type 2.

For configured PUSCH grant type 1, FIG. 2 shows an example of multiple non-contiguous repetitions of PUSCH of the same duration z occurring within a slot. This differs from the current practice of configured PUSCH grant type 1, which enables the transmission of a single repetition per slot spanning over consecutive slots in repetition Type A, or multiple back-to-back repetitions per slot spanning consecutive slots in repetition Type B.

Figure 3:
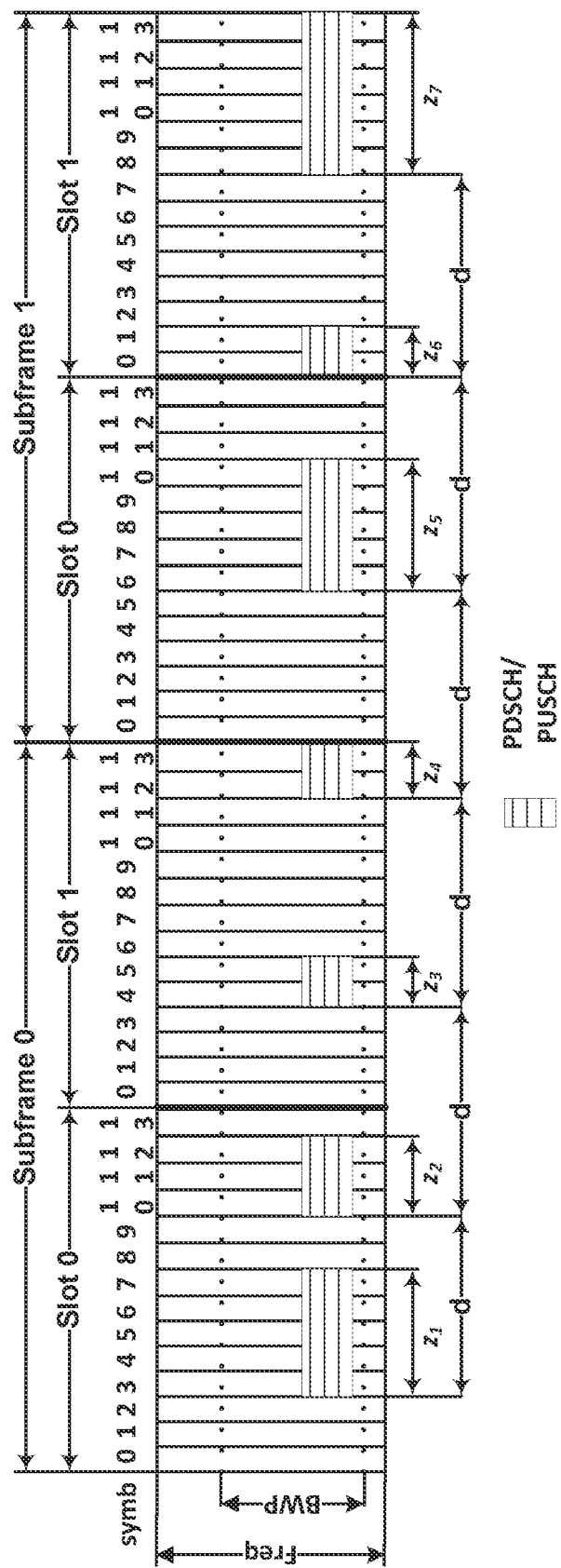
FIG. 3 is a time and frequency diagram illustrating an example of repetitions with uniformly spaced beginnings, but with different length.

As shown in the example of FIG. 3, in addition to having uniformly spaced repetitions with equal lengths, repetitions may have different durations, but still with their beginning symbols are equally spaced. Here the spacing between the beginning of any two consecutive repetitions is d symbols. Repetitions may have different durations, $z_i$, $i \in \{1, \ldots, K\}$. This may be beneficial to allow different repetitions to align with the slot boundaries and other scheduled or configured transmissions as well as with different modulation and coding schemes or to adapt to change in channel quality or scheduling strategy. This technique allows for changes in other transmission parameters such as frequency domain resources from one repetition to the other, MCS from one repetition to the other, or RV from one repetition to the other.

Figure 4:
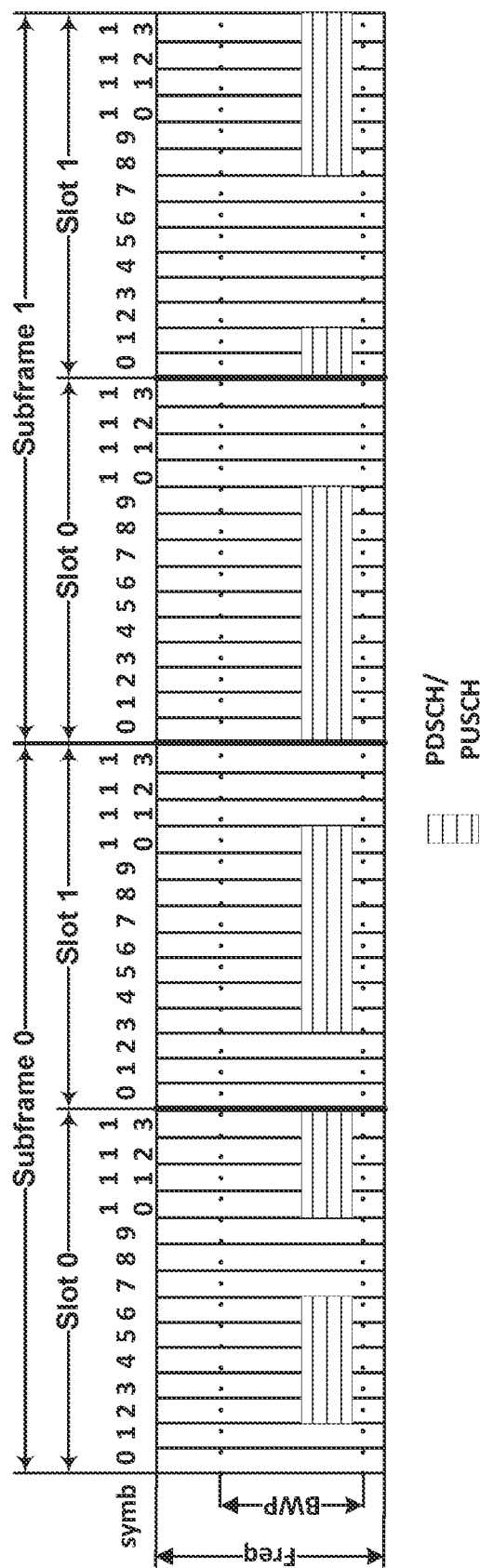
FIG. 4 is a time and frequency diagram illustrating an example of non-contiguous repetitions independent of each other.

FIG. 4 shows an example in which the start, duration and even the number of repetitions may vary from slot to another. Non-contiguous repetitions may not have a particular pattern for their beginning or their durations. In other words, the beginning and length of each repetition are independent of each other and each repetition has its own start location and length.

Figure 5:
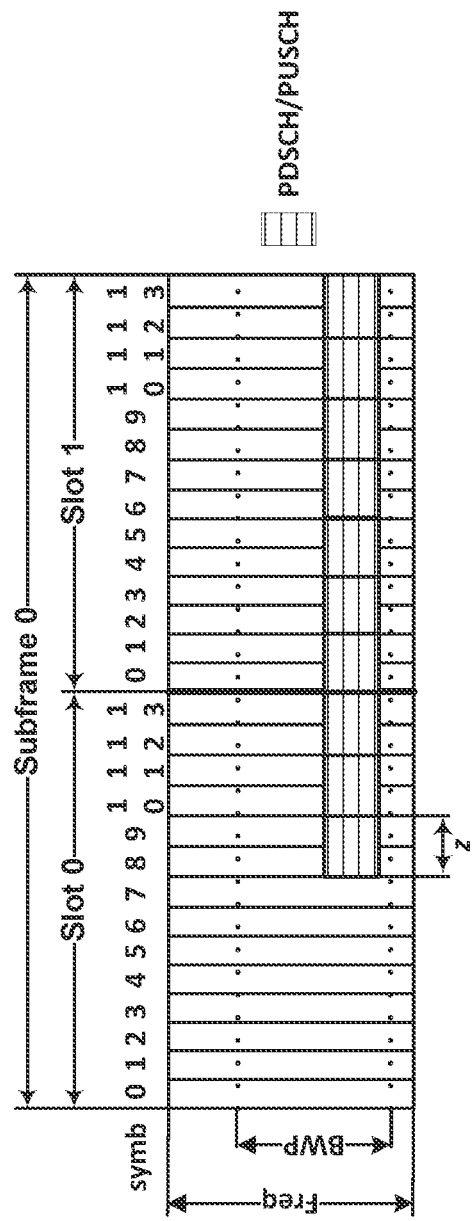
FIG. 5 is a time and frequency diagram illustrating an example of contiguous repetitions with 2 OFDM symbols duration.

For contiguous repetitions, the repetitions are back-to-back, and they may be either fully contained within a slot or spanning multiple slots. FIG. 5 shows an example of multiple repetitions each of the same duration, z=2 OFDM symbols length, over 2 consecutive slots. Also, the contiguous repetitions may have different durations. In this case, the end of one repetition is as same as the beginning of the next repetition.

Figure 6:
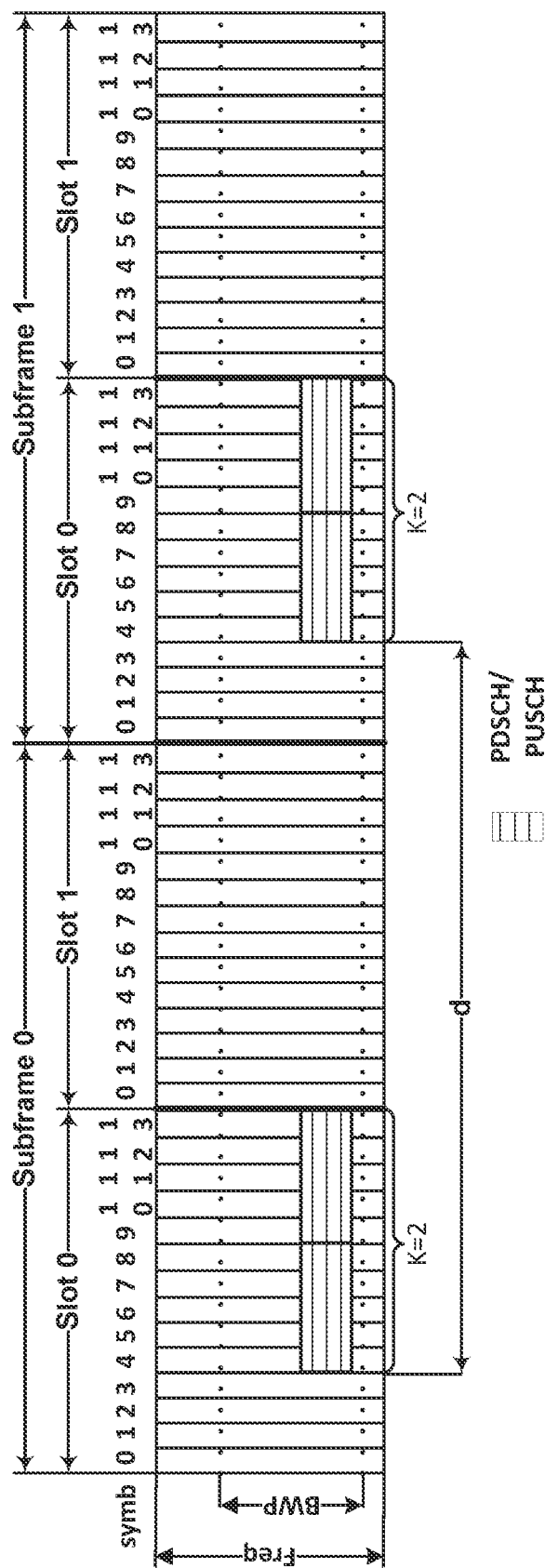
FIG. 6 is a time and frequency diagram illustrating an example of repetitions-groups over non-consecutive slots.

Moreover, the repetitions may be contiguous on one granularity level, and non-contiguous on another granularity level. For example, all the repetitions within a slot (an intra-slot repetition) may be contiguous. However, the intra-slot repetition may be repeated across non-consecutive slots. FIG. 6 illustrates a repetitions-group of K contiguous repetitions in a slot, where K=2. The next repetitions-group consisting of another K repetitions occurs over non-consecutive slots. The spacing between the beginning of a repetitions-group to the beginning of the next repetitions-group is denoted by d. Though in the example of FIG. 6 the same number of repetitions K is used each in group, and the repetitions-groups all have the same duration, in practice, each group may have different number of repetitions with varying durations. Repetitions may also be non-consecutive and may be spaced by $d_{offset}$ symbols indicated by high layer signaling.

Impact of Slot Boundaries

Depending on the start of a repetition, its duration, and how this information is signaled to the UE, some repetitions may cross the slot boundary. This is undesirable in NR, where the scheduling unit is a slot. There are a number of ways to address this issue.

One possibility is to split a PDSCH or PUSCH repetition which crosses the slot boundary into two "sub-repetitions," where the sub-repetitions are not necessarily of the same duration, depending on the location of the slot boundary relative to the repetition.

Figure 7:
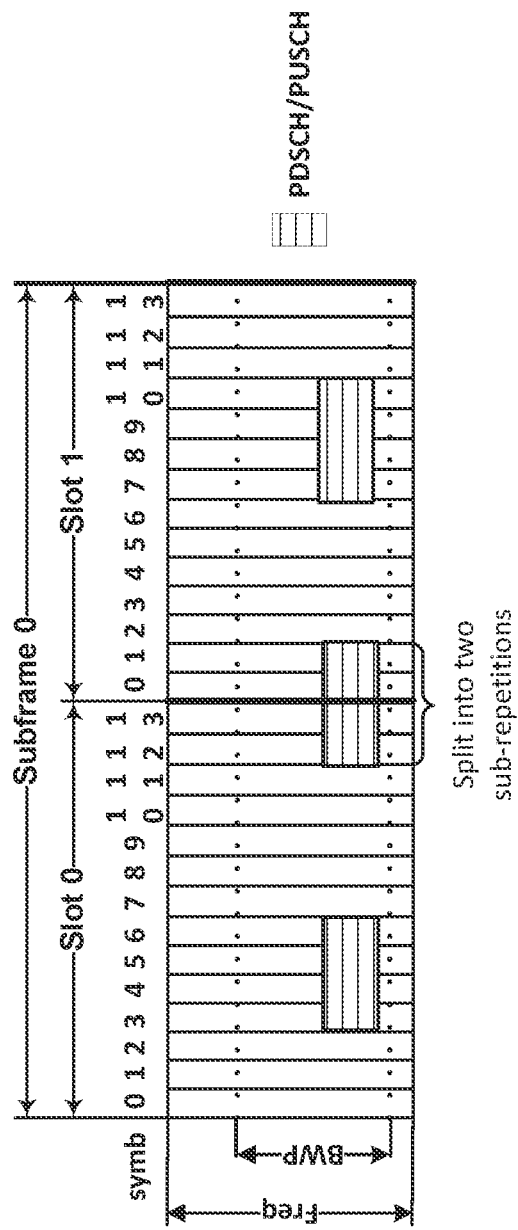
FIG. 7 is a time and frequency diagram illustrating an example of splitting a repetition into two sub-repetitions.

FIG. 7 shows an example of a repetition that is four symbols in length and crosses the boundary between Slot 0 and Slot 1. This DL or UL repetition may be split into two sub-repetitions of duration 2 OFDM symbols each.

Splitting a repetition into two sub-repetitions may create some ambiguity regarding the PDSCH or PUSCH mapping type, Type A or Type B. This may be addressed in two way.

First, a UE may assume that DMRS follows the original scheduled or configured repetition, without any additional DMRS symbols or changing the mapping type. For DL or UL transmission, the UE or gNB is then expected to use the originally scheduled or configured DMRS to conduct channel estimations of both sub-repetitions.

Second, regardless the original mapping type A or B, each sub-repetition may be assumed to follow PDSCH or PUSCH mapping Type B for DL or UL transmission, respectively. Consequently, each sub-repetition has at least one front-loaded DMRS symbol. The UE may rate match around resource elements (REs) occupied by the additional DMRS. Or, the UE may assume that those REs, carrying the additional DMRS, are punctured. Moreover, to further compensate for the additional DMRS overhead, the MCS index may be adjusted based on the duration of each sub-repetition. The mapping between the original MCS index and the MCS index of the sub-repetitions may be specified, e.g., as provided in the protocol specifications. Table 2 of the Appendix shows an example mapping of the original MCS index to a new MCS index for the sub-repetitions. The original repetition is of length z, scheduled or configured with $MCS_z$, and divided into two sub-repetitions of lengths $z_{mini,1}$ and $z_{mini,2}$, respectively.

Figure 8:
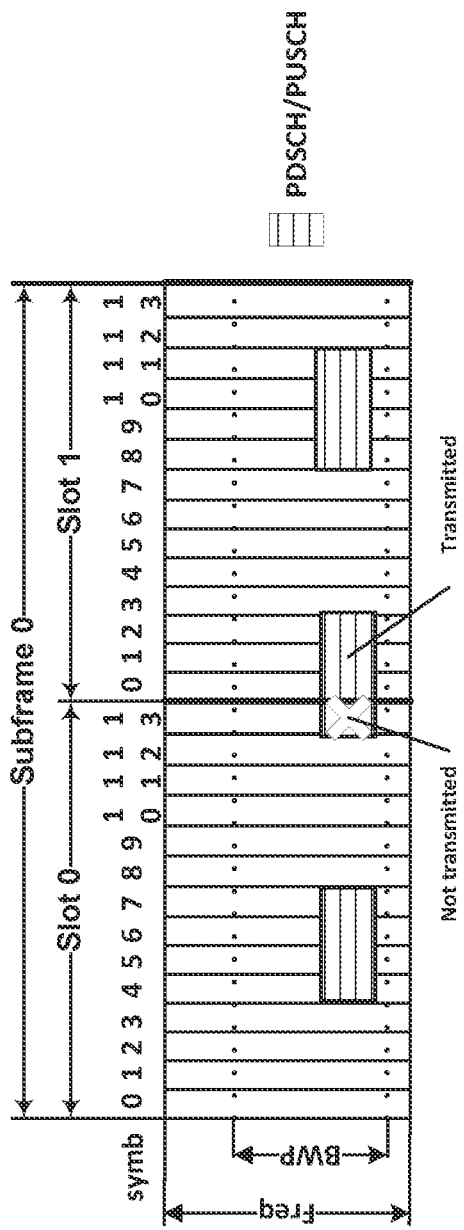
FIG. 8 is a time and frequency diagram illustrating an example of not transmitting a portion of the repetition when it crosses the slot boundary.

FIG. 8 shows an example of a repetition crossing the slot boundary with only one symbol in Slot 0 and the rest in Slot 1. Instead of splitting the repetition that crosses the slot boundary, the smaller portion of the repetition is not transmitted. For DL or UL transmission, a UE or gNB may assume that the smaller portion of the repetition is punctured, or it is dropped, and rate match over the remaining resources. Consequently, the first symbol is assumed not to be transmitted. Although FIG. 8 shows an example of dropping the smaller portion of the repetition at the beginning of the original repetition. In practice, if the smaller portion of the repetition falls at the end of the original repetition, it may be dropped.

The slot boundary may divide the repetition evenly, e.g., the number of repetition's symbols before the slot boundary is equal to the number of repetition's symbols after the slot boundary. In this case, some rules may be applied to determine which portion of the repetition is dropped. For example, the repetition portion in the even slot may be dropped whenever the repetition crosses the slot boundary, e.g., as specified in the protocol specifications. Also, the repetition portion that may be dropped may be signaled by high layer signaling, such as RRC parameter rep_portion_dropping, to be set to even or odd. Also, it may be specified, provided in the protocol specifications, that either the first or second portion of a repetition may always be dropped. Also, high layer signaling may indicate which portion to be dropped, for example RRC parameter rep_portion_dropping to be set to first or second.

Depending on which portion of the repetition is dropped and the PDSCH or PUSCH mapping type, some of the scheduled or configured DMRS may be dropped. This may be problematic for example, if the first portion of the repetition is dropped because at least the front loaded DMRS in PDSCH or PUSCH mapping type B will be dropped. There are two options.

First, if it is PDSCH or PUSCH mapping type B and the second portion of the repetition is dropped, the UE does not expect to receive or transmit additional DMRS than those in the first portion of PDSCH or PUSCH repetition.

Second, if it is PDSCH or PUSCH mapping type B and the first portion of the repetition is dropped, the UE expects the second portion of PDSCH or PUSCH mapping type B is transmitted and mapped according to type B, e.g., at least the first symbol of the second portion of the repetition will carry DMRS.

Figure 9A:
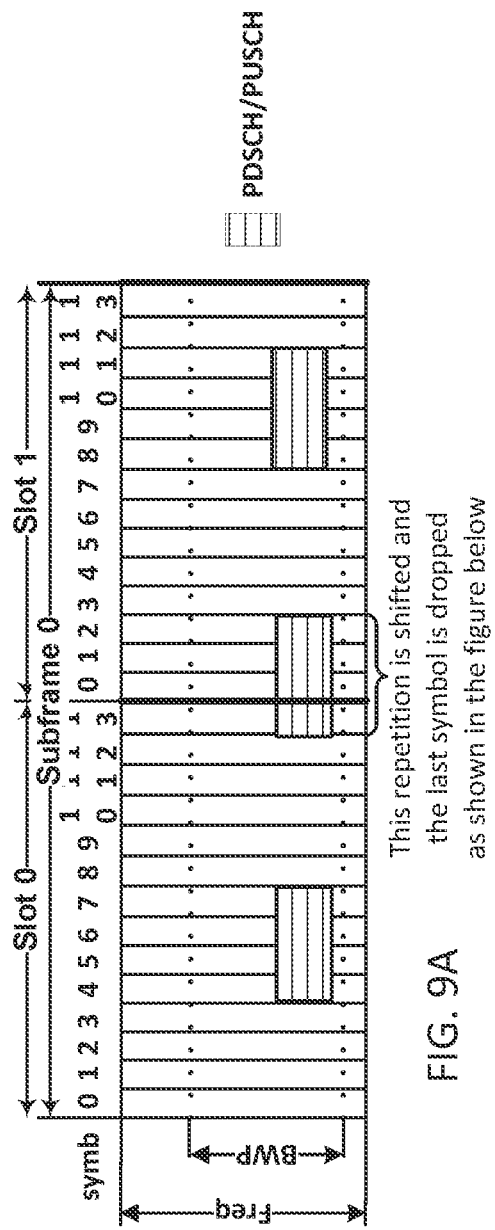
FIGS. 9A and 9B are time and frequency diagrams illustrating examples of shifting a repetition while fixing the end location to the original repetition.
Figure 9B:
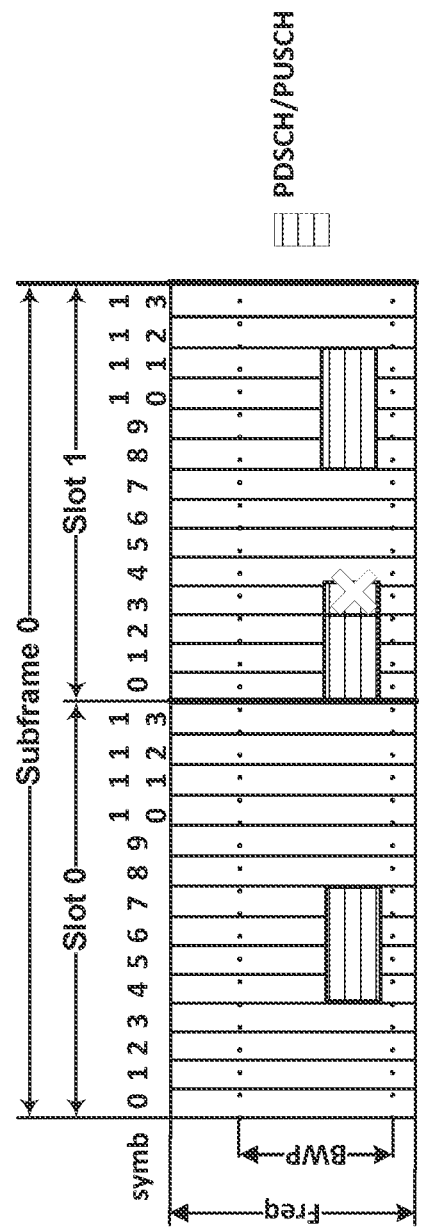

In FIGS. 9A and 9B, in which repetition is shifted without modifying its configured or scheduled end. Here, the repetition that crosses the slot boundary is shifted to the right, and the symbols beyond the end of the originally scheduled or configured repetition is punctured. In contrast to the example of FIG. 8, here in FIGS. 9A and 9B the PDSCH or PUSCH mapping type does not need to be modified, and the symbols carrying DMRS do not need to be adjusted based on the duration of the transmitted portion of the repetition. Basically, the gNB or UE shifts PDSCH or PUSCH to the beginning of the next slot and punctures the symbols beyond the scheduled or configured end of the original repetition.

In some cases, shifting the PDSCH or PUSCH to the next slot whilst fixing the end location may result in only a few remaining symbols to carry PDSCH or PUSCH. In the extreme case, there may only one symbol available for PDSCH or PUSCH transmission. In this case, it may be beneficial to drop the whole repetition. If the remaining duration after shifting and puncturing the repetition is smaller than particular threshold, then the whole repetition may be dropped. The threshold may be absolute number of symbols, such as threshold is equal to two symbols, or it may be relative to the duration of original scheduled or configured PDSCH or PUSCH, such as threshold that is equal to half of the duration of the original PDSCH OR PUSCH. The threshold value may be specified or signaled by high layer signaling such as RRC parameter rep_dropping_threshold.

Yet another solution is to shift the repetition to be fully contained within a slot. For example, the smaller portion PDSCH or PUSCH repetition may be shifted to the slot that has a bigger portion of the repetition. FIGS. 10A and 10B show an example of a four symbols repetition crossing the slot boundary between Slot 0 and Slot 1 where there is only 1 symbol in Slot 0 and 3 symbols in Slot 1. Consequently, this repetition is shifted to the right to be fully contained in Slot 1. Though FIGS. 10A and 10B show the repetition being shifted to the right, the repetition may also be shifted to the left if the smaller portion of the repetition occur in Slot 1. Another possibility is to always shift the repetition that crosses the slot boundary to the right or the left, regardless of where it crosses the slot boundary.

The slot boundary may divide the repetition evenly, e.g., the number of repetition's symbols before the slot boundary is equal to the number of repetition's symbols after the slot boundary. In this case, rules may be applied to determine the PDSCH or PUSCH repetition is to be shifted to the right or left. For example, it may be specified that the repetition may be shifted to be fully contained in an even slot. Also, the way of shifting the repetition may be signaled by high layer signaling, such as RRC parameter rep_portion_shifting to be set to even or odd.

Depending on the duration of the repetitions and the spacing between them, shifting the repetition that crosses slot boundary may partially or fully overlap with the previous or the next repetition if the shift occur to the right-direction or the left-direction, respectively. If shifting a repetition crossing the slot boundary in one direction results in collision with the previous or next repetition, then shifting may occur in the opposite direction if no collision occurs with next or previous repetition, respectively.

If shifting in the opposite direction results in collision with next or previous repetition, then shifting in the direction that results in minimum overlapping may be selected. Depending on the shifting direction, the beginning or the end of the shifted repetition may collide with the previous or next repetition, respectively. Similar procedures can be applied to DMRS. If the end of the shifted repetition collides with the next repetition, then puncturing or rate matching may be assumed for PDSCH or PUSCH over non-available symbols and no special handling for any dropped symbols carrying DMRS.

If the beginning of the shifted repetition collides with the previous repetition, then one of the following options can be applied, there are two options. The first is to drop the first few overlapping symbols and apply DMRS mapping type B based on the remaining PDSCH or PUSCH duration. The second is to puncture the same number of the overlapped symbols from the end of the shifted repetition. Consequently, no adjustment is needed for PDSCH or PUSCH DMRS.

Figure 11A:
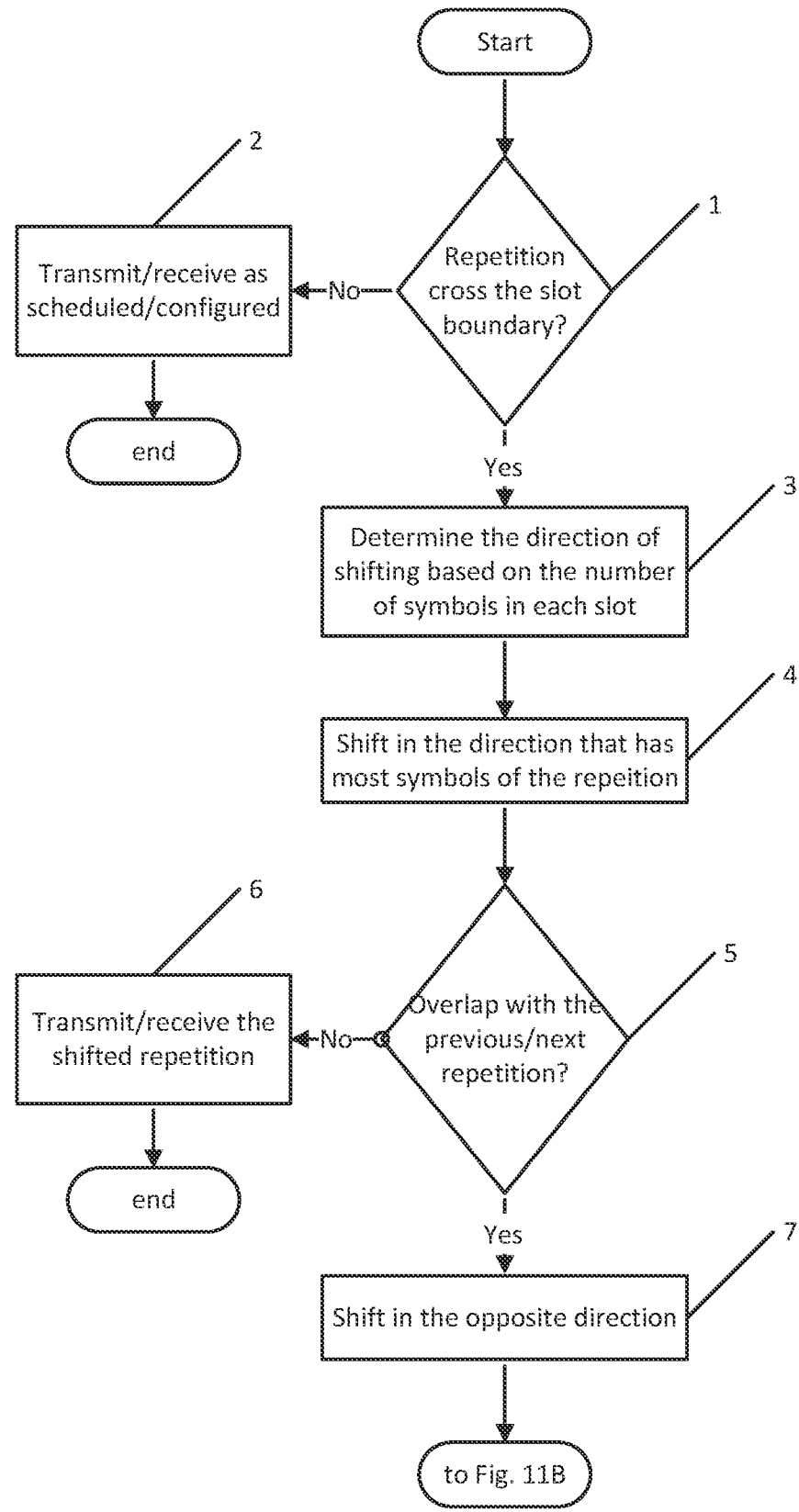
FIGS. 11A and 11B show a flowchart of an example repetition shifting procedure.
Figure 11B:
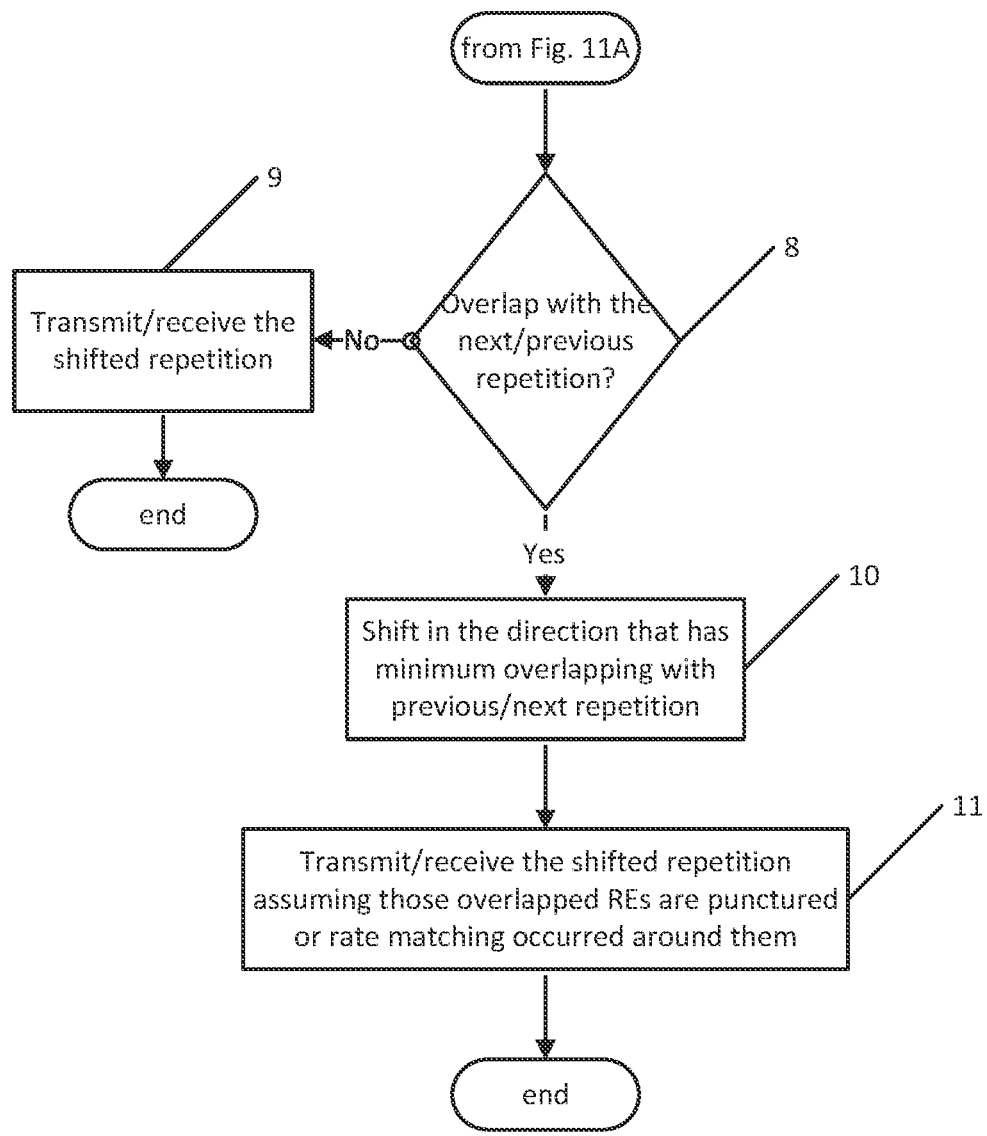

The flowchart in FIGS. 11A and 11B shows the steps of a shifting procedure that may be used when a repetition crosses the slot boundary. In step 1, the PUSCH or PDSCH is checked as to whether it crosses the slot boundary or not. If not, then in step 2 PUSCH or PDSCH is transmitted/received as scheduled or configured. If the repetition crosses the slot boundary (yes in step 1), then in steps 3 and 4 the repetition will be shifted to the slot that has most symbols of the repetition. If the shifted repetition does not collide with the previous/next repetition (no in step 5), then in step 6 the shifted PUSCH or PDSCH is transmitted/received. On the other hand (yes in step 5), the repetition is shifted in the opposite direction in step 7. If no collision in the opposite direction (no in step 8), then it will be transmitted in step 9. Otherwise (yes in step 8), the PUSCH or PDSCH is shifted in direction that has the minimum overlapping the previous/next repetition in step 10. Then in step 11 either puncturing those overlapped symbols or match around can take place and DMRS may be adjusted as described above.

As a result of shrinking the duration of a repetition, the remaining physical resources may not be enough to carry PDSCH or PUSCH with the indicated MCS index reliably. Therefore, the MCS index may be adjusted based on the size of the remaining. Similar to Table 2, the adopted MCS index may be provided by a table based on the new duration of the repetition, for example only the first two columns can be used and the related parameters may be indicated by high layer signaling such as RRC. Also, in case of PUSCH transmission, a UE may indicated the selected MCS index in biggybacked UCI. Also, the new MCS index may be associated with transmitted DMRS of PUSCH or PDSCH. For example, the initiating sequence of the DMRS may depend on the new MCS index. Alternatively, the PDSCH or PUSCH may be transmitted with the same MCS index regardless the size of the remaining resources.

Alternatively, if shifting a repetition results in overlapping with previous or next repetition or there are not enough resources to carry the whole repetition, then this repetition may be dropped. It is possible to compensate for dropped repetitions.

Another solution is to drop the whole PDSCH or PUSCH repetition if crosses the slot boundary. It may not be necessary to compensate for the dropped repetition. For example, if the total number of configured/scheduled repetitions is K and only one repetition crosses slot boundary, then the actually transmitted number of repetitions is K−1.

It is possible to compensate for the dropped repetition, for example, whereby the total number of actually transmitted repetitions stays the same, e.g., K, by transmitting a compensation of the dropped repetition, but then the duration of the total number of repetitions will be increased. The scheduling/configurations of the replacing repetition may follow similar configurations of the original repetitions or separate configurations for the repetition compensation can be indicated.

Figure 12:
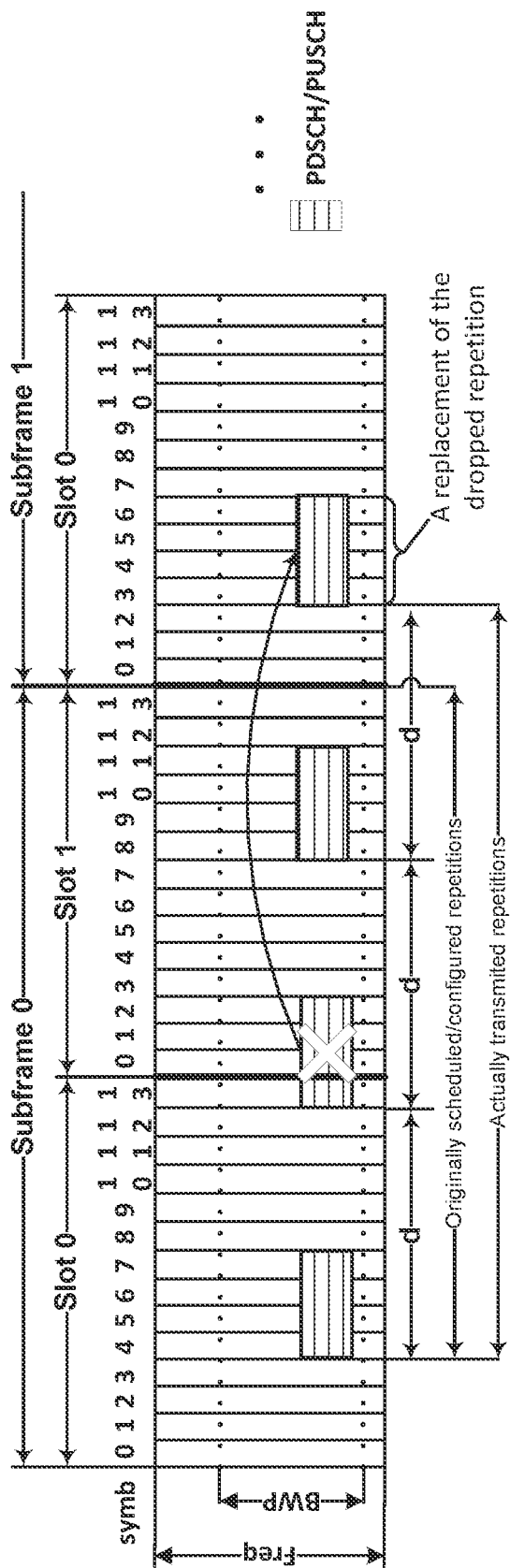
FIG. 12 is a time and frequency diagram illustrating an example of dropping a repetition that crosses a slot boundary.

FIG. 12 shows an example with three scheduled or configured repetitions. Their start positions are equally spaced by d symbols. The second repetition crosses the slot boundary. In this case, the compensation of the dropped repetition may be transmitted with following the same spacing In some cases when a repetition collides with invalid symbols, the repetition may be divided into two or more sub-repetitions. In this case, the number of transmitted repetitions may be more than the number of indicated repetitions.

The separate configurations for the repetition compensation may contain information on the duration of the replacement repetitions, an MCS index, the time and frequency resources that it may occupy, and/or the time and frequency resources for multiple candidate locations to carry one or more replacement repetitions. For example, the replacement repetition may occupy the same frequency band as the last repetition. An offset from the last repetition may indicate the first candidate location for replacement repetitions, and another parameter may indicate the periodicity of the candidate location.

If the repetition compensation crosses another slot boundary, a gNB or UE may attempt to transmit it again and again until reaching maximum number of attempts, or until the expiration of a timer. The maximum number of attempts/timer expiry threshold may be signaled by high layer signaling such as RRC parameter max_attempt/timer_threshold.

Also, a combination of the aforementioned solutions can be applied to handle the case when a repetition crosses the slot boundary.

Impact of Invalid Symbols

In addition to the interaction between repetitions and slot boundary, we need also to discuss the interaction between invalid symbols/reserved REs For PDSCH repetitions, a UE does not expect to receive DL transmission in invalid symbols, which may occur from one or more of the following eight scenarios.

First, if a slot format indicator (SFI) is not configured, e.g., the UE is not configured to monitor PDCCH for DCI format 2_0, for example. Any symbol(s) indicated to be semi-static uplink symbol(s) by tdd-UL-DL-Configuration-Common and tdd-UL-DL-ConfigurationDedicated, if provided, is considered as invalid symbol(s).

Second, is when SFI is configured, e.g., a UE is configured to monitor PDCCH for DCI format 2_0 for example, and it is successfully received by the UE: Any symbol(s) is indicated dynamically as flexible/uplink symbol(s) is considered invalid symbol(s).

Third, is when SFI is configured, e.g., UE is configured to monitor PDCCH for DCI format 2_0 for example, and it is not received by the UE. Any symbol(s) indicated as semi-static uplink is considered invalid symbol(s).

Fourth, is when the symbols that are configured to carry synchronization signal block (SSB) if any of the symbols' REs that carry PDSCH overlap with the symbols' REs that carry SSB are considered invalid symbols.

Fifth, is when the symbols that are configured to carry SSB, even if no overlap between the REs carrying PDSCH and REs carrying SSB when the SSB is not quasi co-located (QCLed) with PDSCH DMRS, or SSB is not QCLed with channel state information-reference signal (CSI-RS) which is QCLed with PDSCH DMRS, e.g., PDSCH repetition is transmitted on different beam than is used for SSB, are considered invalid symbols.

Sixth, is when REs carrying PDSCH repetition partially or fully overlap with REs allocated for a control resource set (CORESET) are assumed to be invalid REs and the symbols carrying those REs are considered invalid symbols if the CORESET and PDSCH are transmitted on the same beam, for example, CORESET DMRS is not QCLed with PDSCH DMRS Seventh, is when the symbols that overlap with the configured measurement gaps are considered invalid symbols.

Eighth, is when the symbols configured to carry random access channel (RACH) occasion are considered invalid symbols.

Normally no invalid symbols are expected to collide with the first scheduled PDSCH repetition. If invalid symbols are expected to collide with the first PDSCH repetition, then procedures may be applied that are similar to those described herein for the subsequent PDSCH repetitions when they collide with invalid symbols.

When a collision happens between a PDSCH repetition and an invalid symbol, in principle, the aforementioned solutions to address the case where a repetition cross the slot boundary, or a combination of them, may be applied. Here, however, the invalid symbols may not be pre-known. They may be distributed anywhere in the slot, and they may be consecutive or non-consecutive.

One way to address this is to assume that the repetition is dropped if it partially or fully overlaps one or more invalid symbols. For PDSCH, the UE may not receive such a PDSCH repetition. The dropped repetitions may not be compensated if the ratio of the number of dropped repetitions to the total number of scheduled or configured repetitions is smaller than particular threshold. This threshold may be specified, provided in the protocol specifications, or may be signaled through high layer signaling, e.g., in rep_dropping_ratio.

Figure 13:
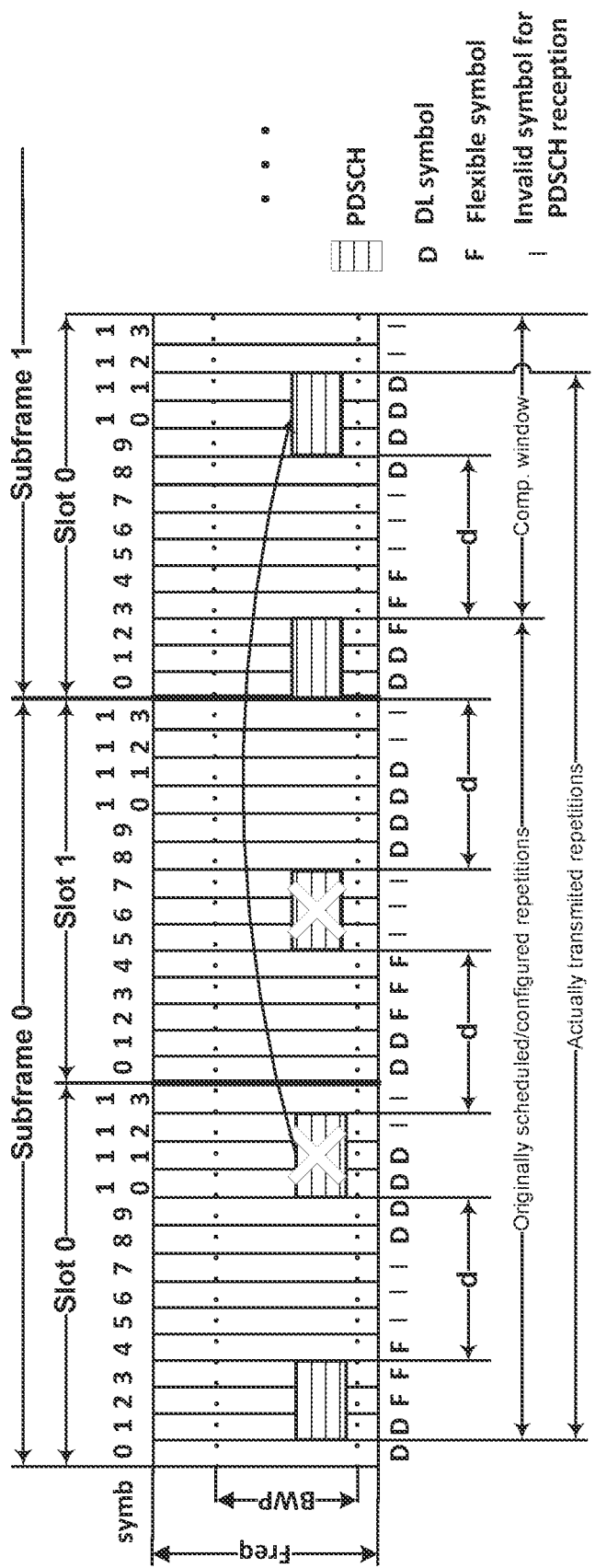
FIG. 13 is a time and frequency diagram illustrating an example of compensating for the dropped repetitions such that a ratio of total number of dropped repetitions is less than or equal to a repetition dropping ratio.

FIG. 13 shows four scheduled or configured PDSCH repetitions, equally spaced by d symbols, where rep_dropping_ratio=0.25. Here, only one repetition in four can be dropped without being compensated. In the example of FIG. 13, two out of four repetitions collide partially or fully with invalid symbols, and consequently, these two repetitions are dropped, and UE does not attempt receive any of them. Given rep_dropping_ratio=0.25, at least one of these dropped repetitions, needs to be compensated to enable reliable decoding at UE. This compensation may be transmitted using parameters similar to the other repetitions, but it is shifted by d symbols after the last one.

When a repetition compensation collides with one or more invalid symbol, the gNB may attempt to retransmit it again following the same repetition pattern, e.g., spacing between any possible repetition is d symbols. The UE may attempt to receive the repetition during a compensation window, as shown in FIG. 13. The duration of the compensation window may be signaled by high layer signaling such as RRC parameter comp window. Or the UE may attempt to receive the repetition in a number of candidate locations equally spaced by d symbols. The maximum number of possible repetition compensation may be signaled by high layer signaling, e.g., via RRC parameters. Other parameters may be indicated such as a new MCS index. The MCS index, for example, may be indicated by an offset to the indicated MCS index of the original repetitions. A new duration of compensation repetition may be indicated, for example, in the form of offset to the duration of the original repetitions. Although in the example of FIG. 13 the repetition compensation followed the same repetition pattern, a dedicated high layer signaling such as RRC may configure different parameters in case where a compensation is needed, as shown in the example Table 3 of the Appendix.

Please note that the described procedure may also applied when repetition(s) cross the slot boundary and/or repetition(s) collides with invalid symbols.

As another approach to define the compensation window. For example, the compensation window may start from the last symbol of PDSCH repetition with X symbols before transmitting acknowledgement/negative acknowledgement (ACK/NACK). High layer signaling may be used to indicate the value of X. Alternatively, the parameter X may be reported in a UE capability report, or it may be fixed in the protocol specifications.

Another approach is to define the compensation window as ending X symbols before transmitting ACK/NACK. X may be given by higher layer signaling, in a UE capability report, or set in a specification.

Figure 14:
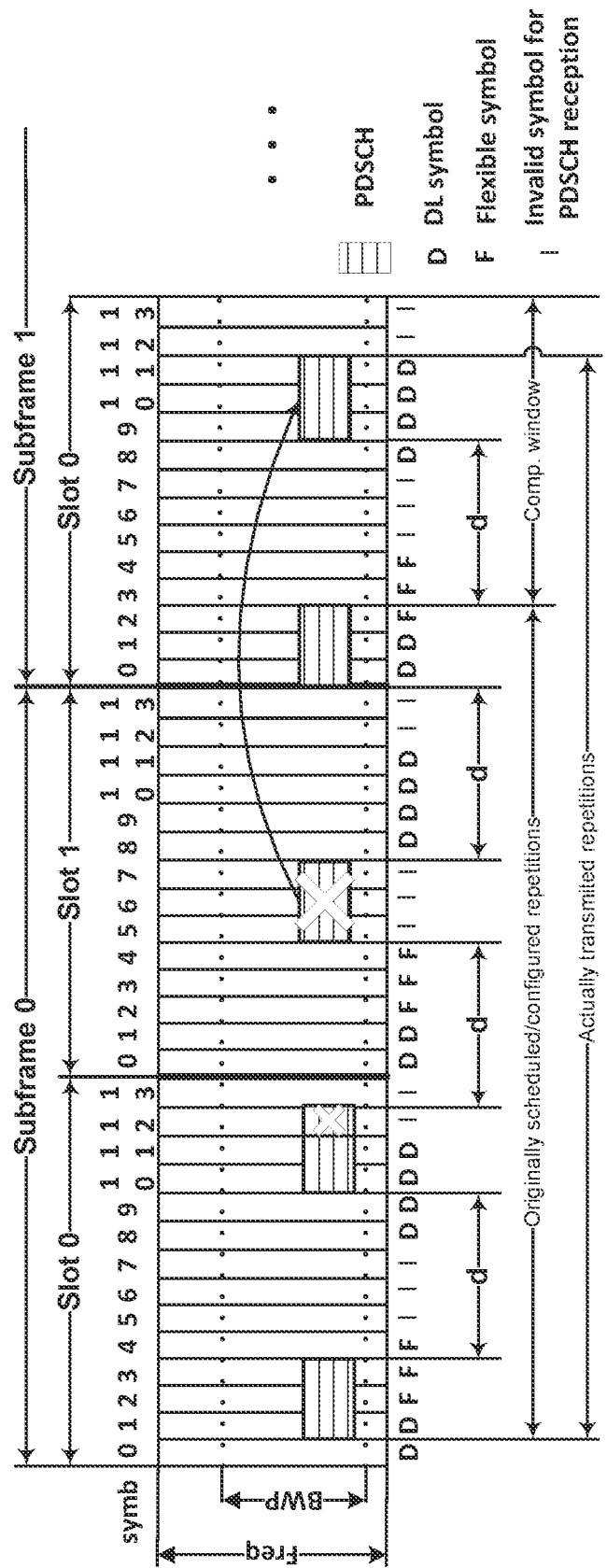
FIG. 14 is a time and frequency diagram illustrating an example of transmitting a repetition that partially collides with an invalid symbol while dropping, and compensating for, a repetition that fully collides with invalid symbols.

Another solution is for the UE to assume that the PDSCH that partially overlapped with an invalid symbol will be transmitted over the remaining valid symbols, either puncturing the overlapping symbol or rate matching around it. If any invalid symbol collides with any PDSCH DMRS symbol, then the UE may assume that the whole repetition is dropped. Or, if there is any DMRS symbol that has not collided with the invalid symbol, then the repetition is transmitted, and the invalid collided symbol is either punctured or rate matched around. If the valid symbols are smaller than particular threshold, the UE may assume that repetition is dropped. For example, FIG. 14 shows an example in which the second repetition has only one invalid symbol and therefore it is transmitted only if the invalid symbol is dropped. In this example, the third repetition is fully collided with invalid symbols. Consequently, it is dropped and compensated later.

Please note, if the invalid symbol collides with the first DMRS symbol(s) in repetition, procedures similar to the aforementioned may be used to transmit addition DMRS or change the mapping type.

Although the example of FIG. 14 shows the invalid symbol at the end of the second repetition, the invalid symbol may occur anywhere with the repetition, e.g., in the middle of the repetition. In this case, the repetition may still be transmitted if there are still enough valid symbols and number of invalid symbols is smaller than specified/indicated threshold.

Figure 15A:
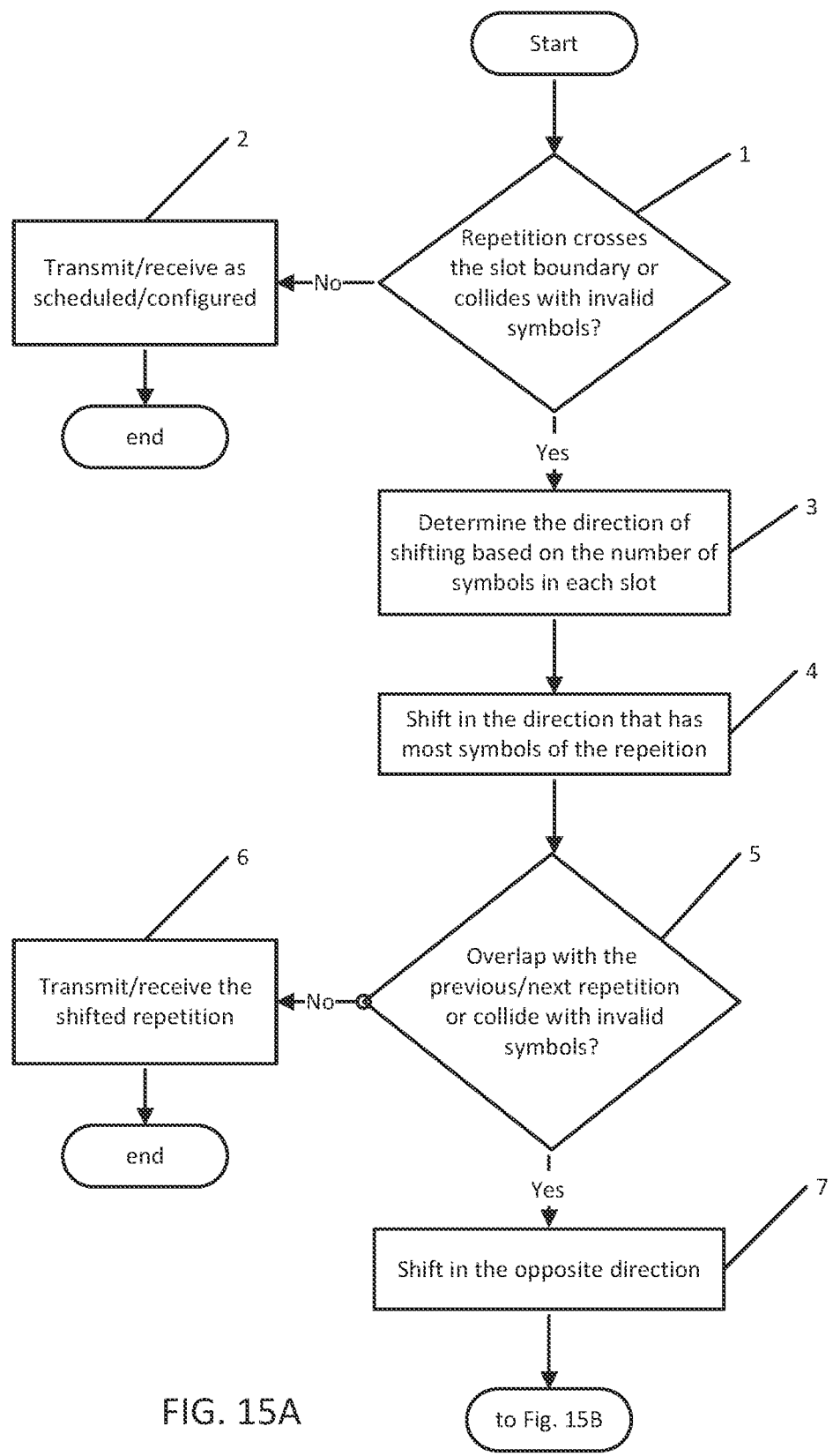
FIGS. 15A and 15B show a flowchart of an example repetition shifting procedure which considers the invalid symbols.
Figure 15B:
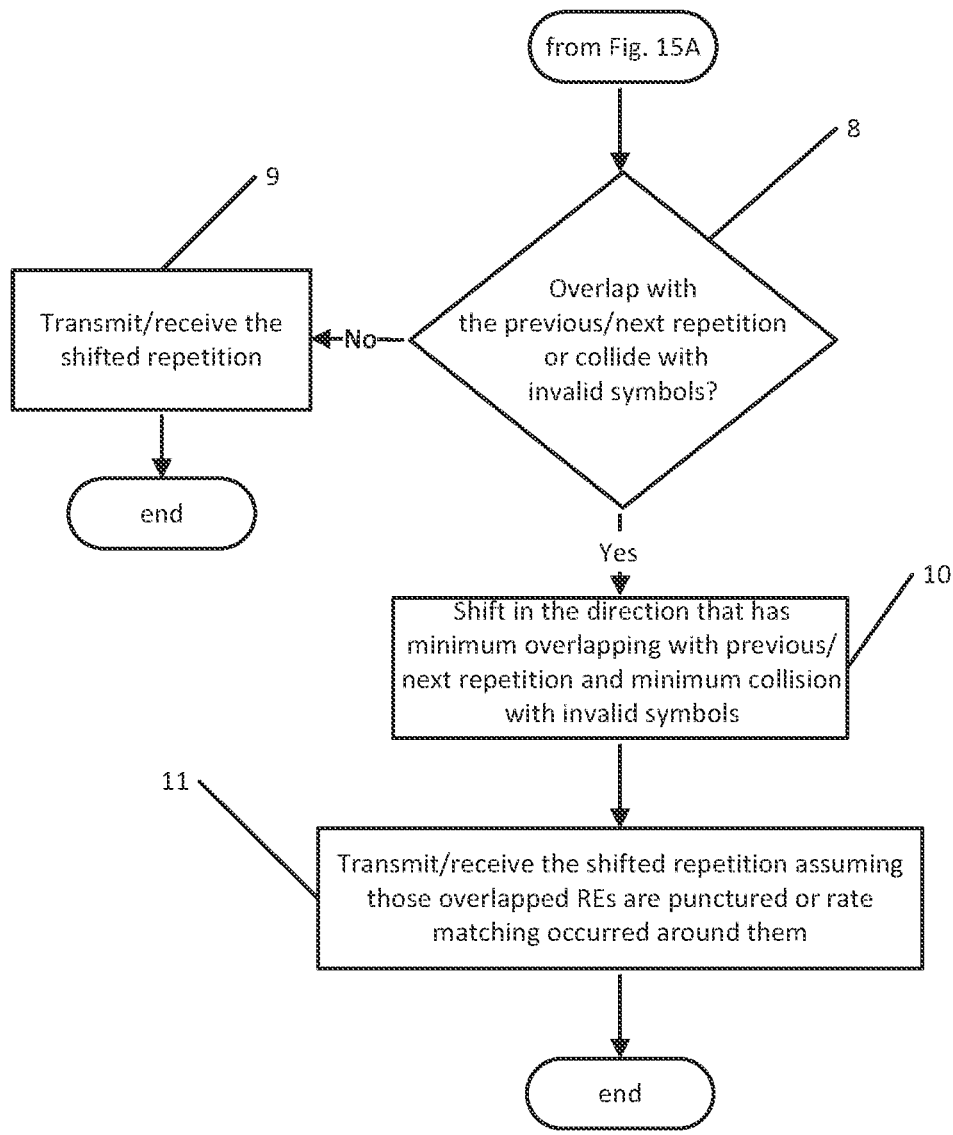

Alternatively, a repetition may be shifted when it collides with invalid symbol(s). Procedures similar to the aforementioned shifting procedures may be applied. Here however, to determine the shifting direction, it needs to be determined whether the shifted PDSCH repetition collides with any invalid symbols, and how many symbols it collides are collided. FIGS. 15A and 15B show a flowchart of an example repetition shifting procedure which considers the invalid symbols. The procedure is like that of FIGS. 11A and 11B. In FIGS. 15A and 15B, by contrast, invalid symbols are taken into considerations via steps 1, 5, 8, and 10.

Alternatively, if a repetition collides with invalid symbols, it may be divided into multiple portions around those invalid symbols. The multiple portions may be of equal or different duration. For example, FIG. 16A shows an example where the second and third repetitions partially collide with invalid symbols indicated by circles. In FIG. 16B, for the second repetition, the collided symbols are shifted forward to the first two symbols of Slot 1. In contrast, the collided symbols of the third repetition are shifted backward to earlier in Slot 1.

Here, the DMRS of PDSCH repetition may be handled in a way similar to that described herein for when a repetition crosses the slot boundary. Also, as the portion of a repetition that collided with invalid symbols is shifted, it may collide with the previous/next repetition. Therefore, procedure to handle collisions between repetitions may be adopted here as well.

Figure 17B:
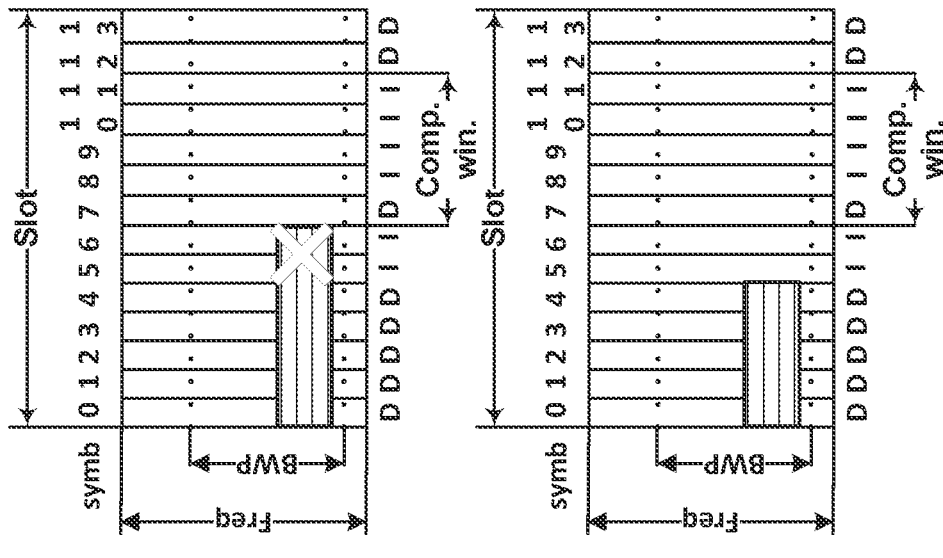
FIGS. 17A and 17B are time and frequency diagrams illustrating examples of splitting a repetition around the invalid symbols within a compensation window.
Figure 17A:
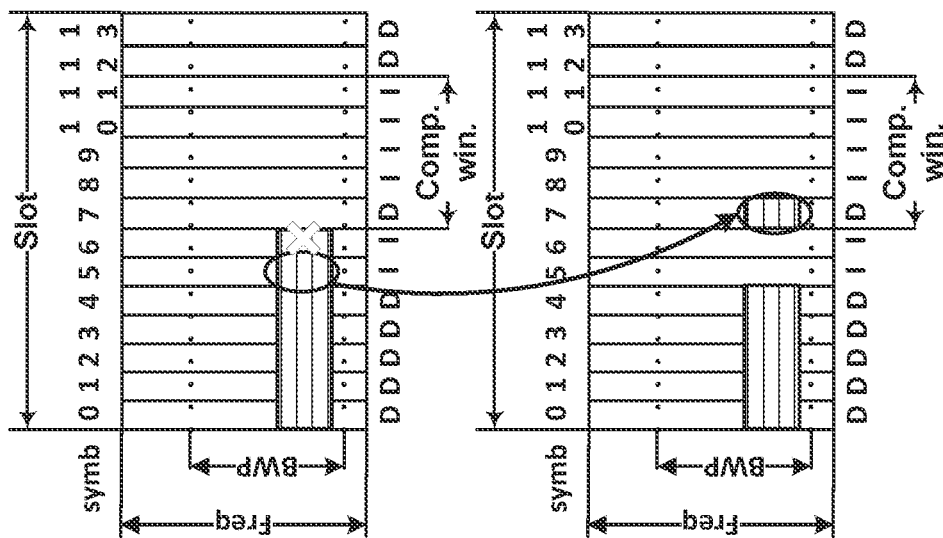

In some cases, there may not be enough valid symbols to carry the shifted portion of repetition as shown in the example of FIG. 17A. In this case, the shifted portion may be dropped. Specifically, a compensation window in which a portion of repetition may be transmitted when there is a collision with invalid symbols. In the example of FIG. 17A, only one symbol of the repetition may be transmitted within the valid symbols in the compensation window.

For each repetition, its compensation window may start immediately or after some offset from the last the repetition's last symbol. This offset and duration of the window may be signaled by high layer signaling such as RRC parameters Comp_Win_PerRep_offset and Comp_Win_PerRep_duration, respectively.

In some cases, it may be beneficial to define a threshold for the minimum duration over contiguous/non-contiguous symbols on which the repetition portion that may be transmitted within a compensation window. In FIG. 17B for example, the threshold is equal to two symbols, and are there are not enough symbols to carry any portion of the repetition. The threshold value may be signaled by high layer signaling such as RRC parameter min avail sym. High layer signaling may be used to indicate whether the available symbols have to be consecutive symbols or may be non-consecutive.

For UL PUSCH repetitions, the invalid symbols may be determined in the same way as in NR Rel. 16. To avoid the invalid symbols, a procedure similar to that described for DL PDSCH repetition can be applied.

The feature of splitting/shifting a PUSCH or PDSCH repetition when it crosses the slot boundary or collides with invalid symbols may be enabled or disabled by high layer signaling. For example, RRC parameter may be used for this purpose or medium access control-control element (MAC-CE) to allow gNB control this feature semi-statically.

Impact of Reserved RBs

In NR, RRC parameters can be used to configure a rate matching pattern for PDSCH. Specifically, rateMatchingPatternGroup1 and rateMatchingPatternGroup2 may indicate which Resource Blocks (RBs) are not available to for PDSCH reception. Hence, the UE can perform rate matching around those reserved RBs to decode PDSCH. This may beneficial when PDSCH is big and only a few RBs are not available. On the other hand, with PDSCH for reduced capability NR devices, rate matching around unavailable RBs may result in unsuccessful decoding of PDSCH and wasting power.

To address this issue, one or more of the following techniques may be employed. If the coding rate and/or the ratio of the unavailable resources to the original scheduled or configured resources increase beyond particular thresholds, then UE may assume PDSCH repetition is dropped. The threshold values may be signaled by high layer signaling such RRC parameters, coding_rate_th and unavailable_res_ratio, respectively. If the coding rate and/or the ratio of the unavailable resources to the original scheduled or configured resources are less than or equal to coding_rate_th and/or unavailable_res_ratio, respectively, then PDSCH repetition may be assumed to be transmitted and regular NR behavior regarding rate matching takes place.

Thresholds for the coding rate, a ratio of the unavailable resources, and/or other factors may be used to determine whether PDSCH repetition may be dropped, punctured, shifted, and/or combined with other repetitions. High layer signaling may indicate three thresholds values, such as an RRC parameter coding_rate_th={a, b, c}, where a<b<c. If the effective coding rate is greater than c, then the repetition may be dropped. If the effective coding rate is greater than b, but smaller than c, the repetition may be transmitted rate matching takes place around unavailable REs. If the effective coding rate is greater than a, but smaller than b, then the repetition may be transmitted, and puncturing takes place the unavailable REs. If the effective coding rate is smaller than a, then the repetition may be transmitted without any puncturing or rate matching.

Procedures such as shifting/puncturing may be applied here as well. Instead of applying them around the invalid symbols, the procedures may be applied around the reserved RBs as well. Also, a compensation of the dropped repetition may be transmitted as described in the previous examples.

As yet another possibility to handle crossing the slot boundary or colliding with invalid symbols is to shorten the repetition and adjust some of the transmission parameters accordingly. If a repetition is shortened by certain ratio in the time domain (half for example), then the allocated frequency domain resources may be adjusted (doubled for example) such that the total number of allocated REs remain the same and MCS index does not change. Alternatively, if a repetition is shortened by certain ratio in the time domain (half for example), the allocated frequency domain resources may not be increased, but the MCS index may be scaled or modified according to certain rule such the coding rate remain within acceptable limit.

Repetition in Frequency Domain (Frequency Hopping)

Reduced capability NR devices such as low complexity UEs are expected to operate on reduced bandwidths, as compared with eMBB or URLLC UEs. Accordingly, the maximum bandwidth of any active bandwidth part (BWP) for a reduced capability NR device may be set less than or equal to particular threshold based on reported UE capabilities, for example, or provided in the protocol specifications For example, the threshold may be equal to 24 PRB which correspond to 5 MHz and 10 MHz for SCS of 15 KHz and 30 KHz, respectively.

A new UE category for reduced capability NR devices may be defined. Among other information, the category may define the maximum number of antennas that can be supported by reduced capability NR devices in addition to the maximum bandwidth that can be supported by such devices. A reduced capability NR device may indicate such capability as early as in RACH procedure. For example, some preambles may be reserved for reduced capability NR devices depending on the maximum supported bandwidth and number of antennas. Such information may be indicated in Msg3 in a 4-step RACH, for example or in message A (MsgA) in 2-step RACH. For example, a field called Red-CapNR_BW-r17 may indicate the maximum supported bandwidth.

Although NR allows an eMBB/URLLC UE to be configured with up to four BWPs, reduced capability NR devices may be configured with more than four BWPs, but with only one BWP activated at any moment. A field called RedCapNR_NumBWP-r17, for example, to indicate the maximum number of BWPs that can be configured for reduced capability NR devices. This field may be indicated as part of UE capability report.

To further enhance coverage of DL or UL transmission, frequency hopping may be deployed for both DL and UL transmission. The frequency hopping may be indicated to either occur within a BWP or across different BWPs Hopping within a BWP Hopping within a BWP means that all hopping occurs with the same BWP carrying the first repetition. For PUSCH repetition, frequency hopping may follow NR procedures to determine the starting RB such that all the hops are fully contained within a UL BWP. On the other hand, for PDSCH frequency hopping, all the hops may be fully contained within a DL BWP. High layer signaling may be used to control such operations. For example, a new RRC parameter to enable/disable PDSCH frequency hopping freq_hopping may be used to enable or disable frequency hopping, and another RRC parameter to indicate whether the frequency hopping occur within a BWP or across BWPs. For this purpose, a single parameter may be used for UL and DL, or a sperate parameter may be used for each. An RRC parameter may signal information about the when the hopping will take place in the time domain, for example, and if this parameter is absent, PDSCH frequency hopping is disabled.

In cross-slot hopping, the hopping occurs across the slot boundary, the starting RB of PDSCH hop may be given by:

$$RB_{actual} = \begin{cases} RB_{start\_indicated} & n_s^\mu \bmod 2 = 0 \\ (RB_{start\_indicated} + RB_{offset}) \bmod N_{BWP}^{size} & n_s^\mu \bmod 2 = 1 \end{cases}$$

Or by the following equation $$RB_{actual} = (RB_{start\_indicated} + n_s^\mu RB_{offset}) \bmod N_{BWP}^{size}$$

where $RB_{start\_indicated}$ is the starting RB within BWP as provided by the DCI of dynamically scheduled PDSCH or the DCI activating semi-persistent DL transmission, and $RB_{offset}$ is the frequency hop between the two hops, details of signaling/indicating the offset value will be provided later, and $n_s^\mu$ is the slot number within a radio frame.

Figure 18:
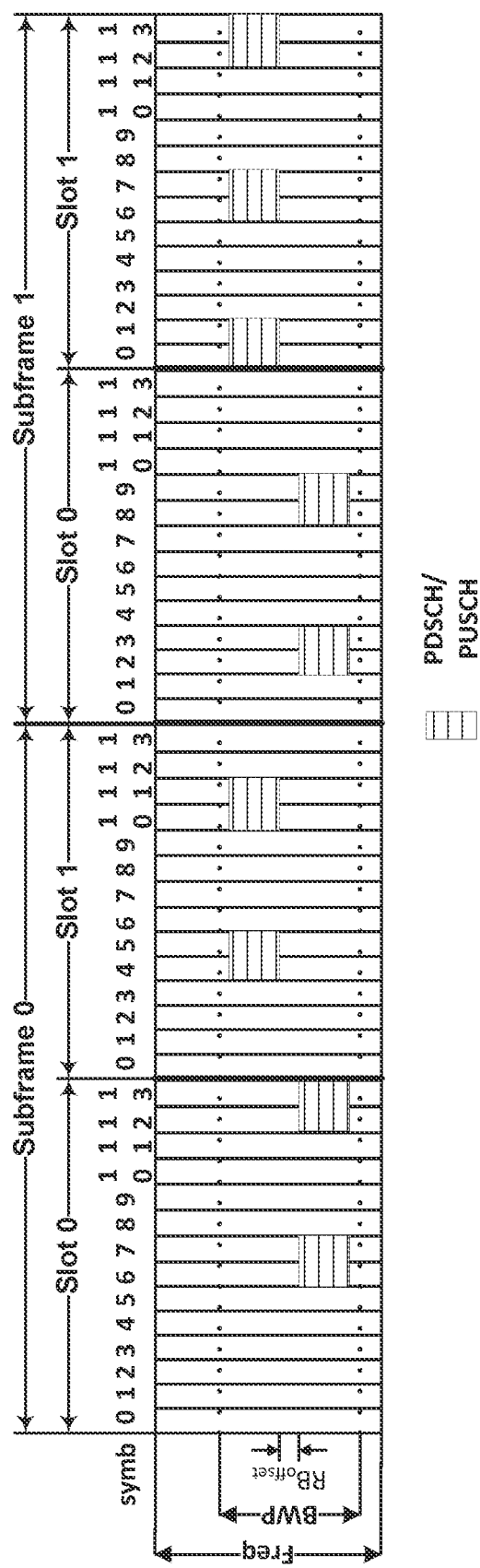
FIG. 18 is a time and frequency diagram illustrating an example of inter-slot hopping for PDSCH or PUSCH within a BWP.

FIG. 18 shows an example of within-BWP hopping and cross-slot hopping for PDSCH or PUSCH. The first group of repetitions in the Slot 0 starts from the RB indicated by the grant. The second group of repetitions in the Slot 1 applies an offset of $RB_{offset}$. The remaining repetitions in different slots keep iterating between those two frequency levels.

The DMRS of each hop may occupy the same symbols, as if frequency hopping were disabled, Alternatively, the DMRS of each hop may follow PDSCH or PUSCH mapping type B when frequency hopping is enabled.

In this example frequency hopping occurs in each other slot. In practice, frequency hopping may occur every $N_{slot\_hop}$. In this case, the starting RB for a group of repetitions may be provided by:

$$RB_{actual} = \begin{cases} RB_{start\_indicated} & \lfloor n_s^\mu/N\text{slot\_hop} \rfloor \bmod 2 = 0 \\ (RB_{start\_indicated} + RB_{offset}) \bmod N_{BWP}^{size} & \lfloor n_s^\mu/N\text{slot\_hop} \rfloor \bmod 2 = 1 \end{cases}$$

The parameter $N_{slot\_hop}$ may be signaled by high layer signaling such as RRC parameter SlotsPerHop.

Figure 19:
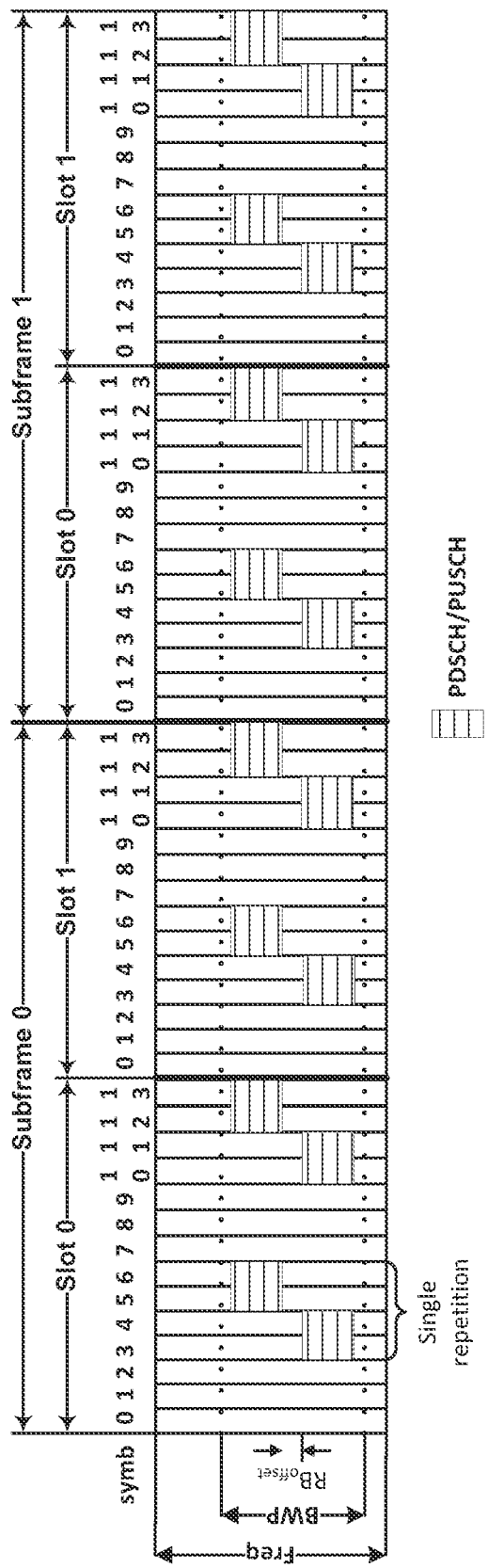
FIG. 19 is a time and frequency diagram illustrating an example of intra-repetition hopping for PDSCH or PUSCH within a BWP.

Another solution for hopping within a BWP is intra-repetition hopping, in which the hopping occurs within each repetition. The hop may take place at particular symbol within the repetition. The number of symbols within the first hop may be given according to a formula such as $\lfloor N_{symb}^{repetition}/2 \rfloor$, or $\lceil N_{symb}^{repetition}/2 \rceil$ for example where $N_{symb}^{repetition}$ is the total number symbols within a repetition. For each repetition, the first hop may occur at RB $RB_{start\_indicated}$ as provided in the grant while the second hop occur at RB $(RB_{start\_indicated}+RB_{offset}) \bmod N_{BWP}^{size}$, as shown in the example of FIG. 19.

The DMRS of PDSCH of any hop in intra-repetition hopping may follow PDSCH mapping type B with duration equal to the number of symbols in the hop. Alternatively, the position of the symbols carrying DMRS of PDSCH hop may be provided by a table, as the example of Table 4 of the Appendix, where $l_d$ is the intra-hop duration, and $l_0$ is the first DMRS position relative to the start of each hop ($l_0$=0 for PDSCH mapping type B while its signaled by dmrs-TypeA-Position for PDSCH type A which is defined in NR), I is the DMRS position defined relative to the start of each hop.

Figure 20:
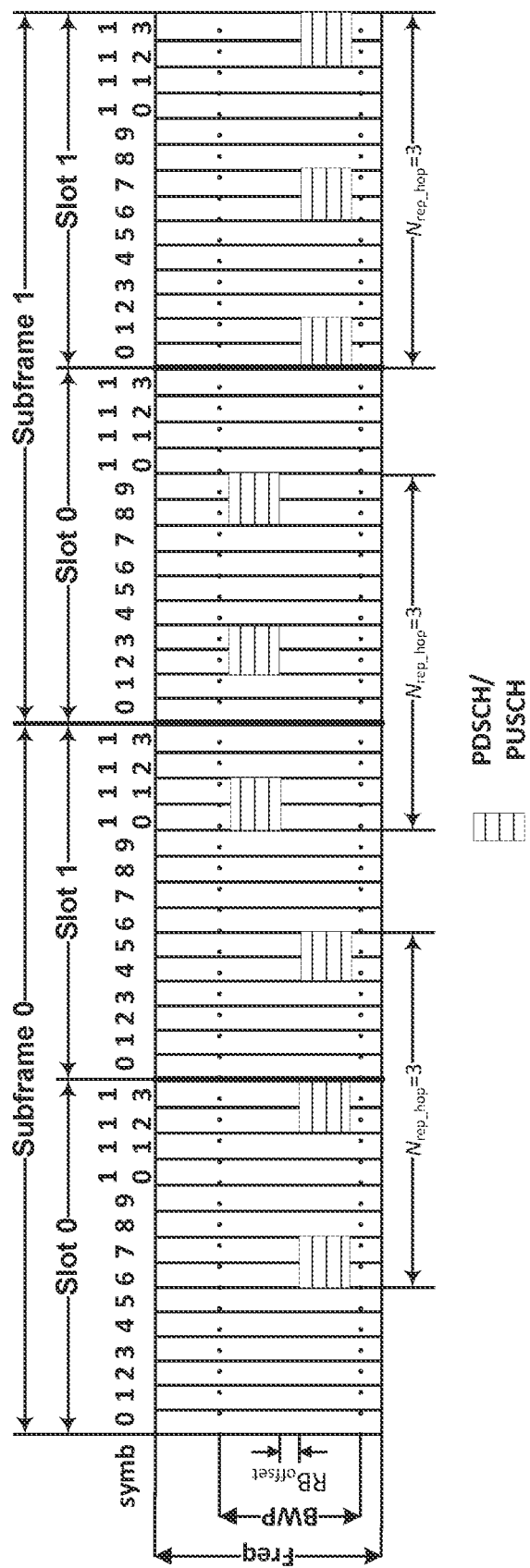
FIG. 20 is a time and frequency diagram illustrating an example of inter-repetition hopping for PDSCH or PUSCH within a BWP.

For inter-repetition hopping within a BWP, a hop may take place after each $N_{rep\_hop}$ repetitions. This may be applied for both PDSCH and PUSCH as shown in the example of FIG. 20. The parameter $N_{rep\_hop}$ may be signaled by high layer signaling such as RRC parameter NunRepetPerHop. RRC parameters or MAC-CE may configure multiple values for the number of repetitions per hop and then DCI, for example.

The starting RB of PDSCH or PUSCH hop may be given by:

$$RB_{actual}^i = \begin{cases} RB_{start\_indicated} & \lfloor i/N_{rep\_hop} \rfloor \bmod 2 = 0 \\ (RB_{start\_indicated} + RB_{offset}) \bmod N_{BWP}^{size} & \lfloor i/N_{rep\_hop} \rfloor \bmod 2 = 1 \end{cases}$$

where $RB_{start\_indicated}$ is the starting RB within BWP as provided by the DCI of dynamically scheduled PDSCH or the DCI activating semi-persistent DL transmission, and $RB_{offset}$ is the frequency hop between the two hops, details of signaling/indicating the offset value will be provided later, and i is the repetition index where the first repetition correspond to i=0 and i is increment by 1 for each subsequent repetition.

The DMRS of each hop may occupy the same symbols as if frequency hopping were disabled, or the DMRS of each hop may follow PDSCH or PUSCH mapping type B when frequency hopping is enabled.

To support multiple hopping procedures, new high layer signaling may be used to select among the supported hopping procedures. For example, an RRC parameter such as PDSCH_hopping_type may be used for this purpose, and may take values such as slot hopping, intra_repetition, and inter_repetition, for example.

A BWP switching timer may be adjusted based on an indicated spacing between scheduled or configured repetitions to avoid unnecessary BWP switching between repetitions. This may be done in two ways.

First, a BWP inactivity timer may be set to the maximum of the indicated value, by bwp-InactivityTimer for example, the maximum separation between any two consecutive repetitions or any function of it.

Second, a BWP inactivity timer may not be triggered after the reception of the first repetition until the last indicated repetition. In other words, if a UE receives the first repetition, it does not trigger the BWP inactivity timer even if no activities on the current active BWP because the UE is aware that more repetitions should be received or transmitted until the last repetition.

Hopping Across BWPs

Reduced capability NR devices are expected to have limited capabilities. The maximum frequency bandwidth of the active BWP is expected to be much smaller than the maximum frequency bandwidth of the active BWP for URLLC/eMBB UEs. Therefore, limited, if any, frequency diversity gain may be attained by hopping within BWP. Frequency hopping may occur across BWPs for both PDSCH and PUSCH.

Let us say that $BWP_{original}$ is the BWP in which PDSCH or PUSCH (the first repetition) is scheduled or configured to be transmitted. $BWP_{hopping}$ is the BWP which carries some repetitions when frequency hopping across BWP is enabled. There may be single or multiple BWPs used for frequency hopping.

Figure 21:
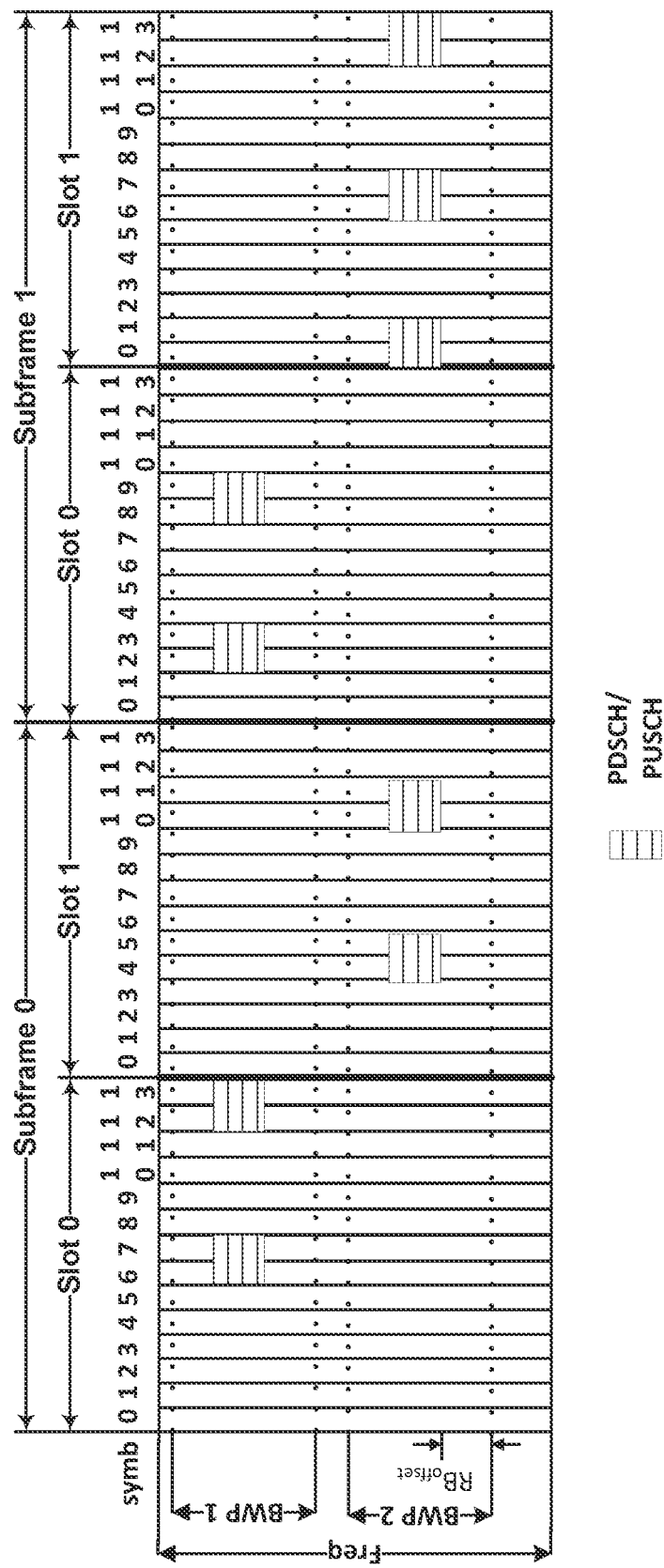
FIG. 21 is a time and frequency diagram illustrating an example of cross-BWP and cross-slot hopping.

Inter-slot hopping across BWPs may be achieved by frequency hopping of PDSCH or PUSCH to occur across the slot boundary, but in different BWPs. FIG. 21 shows an example of hopping between $BWP_{original}$=BWP 1 and $BWP_{hopping}$=BWP 2 every other slot. The hopped repetitions in $BWP_{hopping}$ may occupy the same frequency resources as those $BWP_{original}$. Also, an offset may be applied for the hopped repetitions in $BWP_{hopping}$. The offset may be relative to the $RB_{start\_indicated}$ of the scheduled or configured PDSCH or PUSCH in the $BWP_{original}$/$BWP_{hopping}$. Also, the offset may be relative to particular RB in $BWP_{hopping}$ or in the carrier. The details of signaling the offset value will be provided later. For the reference RB, it may be indicated by high layer signaling. FIG. 21 shows an example that the reference RB is PRB0 of $BWP_{hopping}$.

Since switching every slot between different BWPs may result in high power consumption at reduced capability NR devices, it may be beneficial to hop every $N_{slot\_hop}$ slots. The parameter $N_{slot\_hop}$ may be signaled by high layer signaling such as RRC parameter SlotsPerHop.

In this example, the hopping occurs between two BWP only. In practice, the hopping may occur between multiple BWPs, e.g., wherein PDSCH or PUSCH is scheduled or configured to be transmitted in $BWP_{original}$ and hopping occurs between $BWP_{original}$, $BWP_{hopping,1}$, $BWP_{hopping,2}$, $BWP_{hopping,3}$, etc. The IDs of $BWP_{hopping}$ may be derived according to some rules. For example, the ID of $BWP_{hopping}$ may be equal to ID of $BWP_{original}$+{1, 2, 3}, and where the hopping occurs in an increased order of BWP ID.

Figure 22:
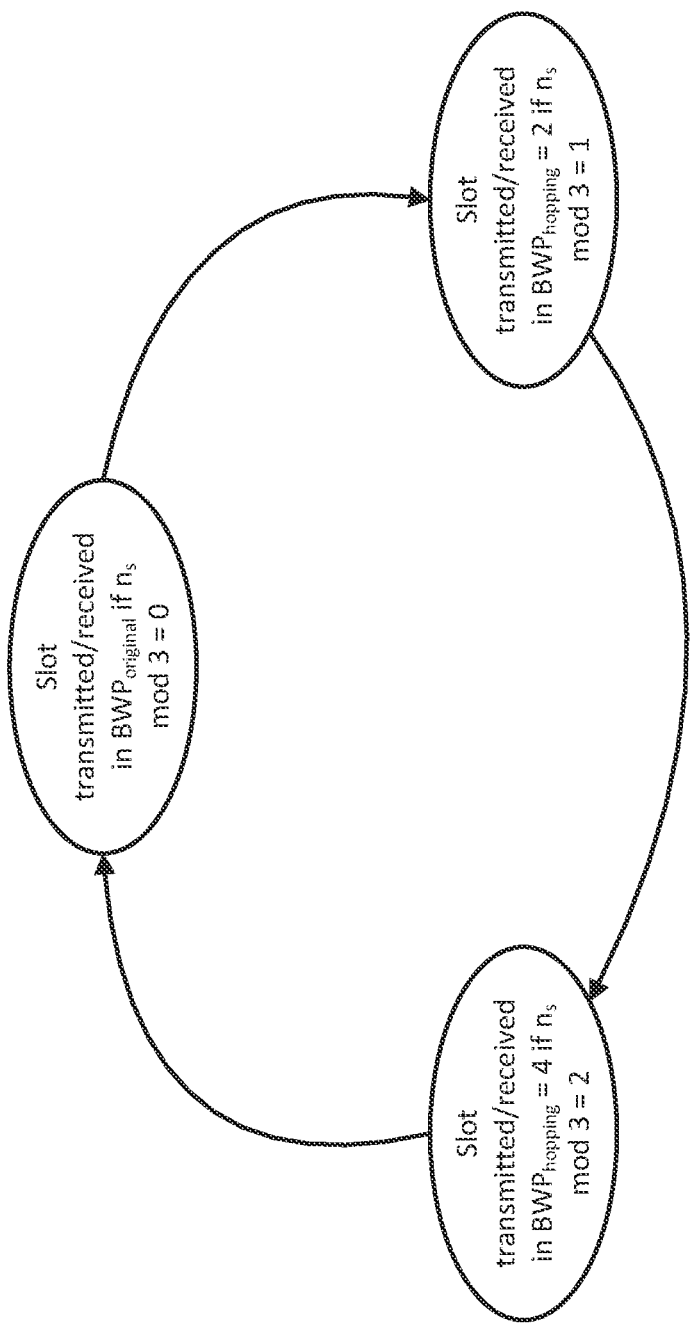
FIG. 22 illustrates an example of cycling the hops between different BWPs.

Alternatively, the order and IDs of hopping across BWPs may be provided by high layer signaling such as RRC parameter hopping order. For example, if $N_{slot\_hop}$=1 and hopping_order={2, 4}, then the first slot carrying PDSCH or PUSCH will be transmitted/received in $BWP_{original}$, the second slot will be in BWP ID=2, the third slot will be in BWP ID=4, etc., cycling between those three BWPs as shown in the example of FIG. 22.

IDs of BWPs that may carry the hops may signaled in DCI. DCI may schedule/active dynamic PDSCH, semi-persistent PDSCH, dynamic PUSCH, Type 2 configured UL grant, etc. For Type 1 configured UL grant, RRC parameter similar to what described earlier may be used to indicate BWP IDs for frequency hopping.

The sequence of BWP IDs that will carry the hops may not necessarily be in the increasing order of their IDs. The exact sequence may be signaled in a number of ways. For example, if the hopping occurs with BWP IDs 0, 1, 2, 3, the hopping sequence may be {0, 0, 0, 0, 3, 3, 3, 3, 0, 0, 0, 0, 2, 2, 2, 2} and then the pattern may be repeated, for example. Also, the hopping pattern sequence may be random. The seed to generate the random sequence of BWP IDs may be indicated by high layer signaling.

Figure 23:
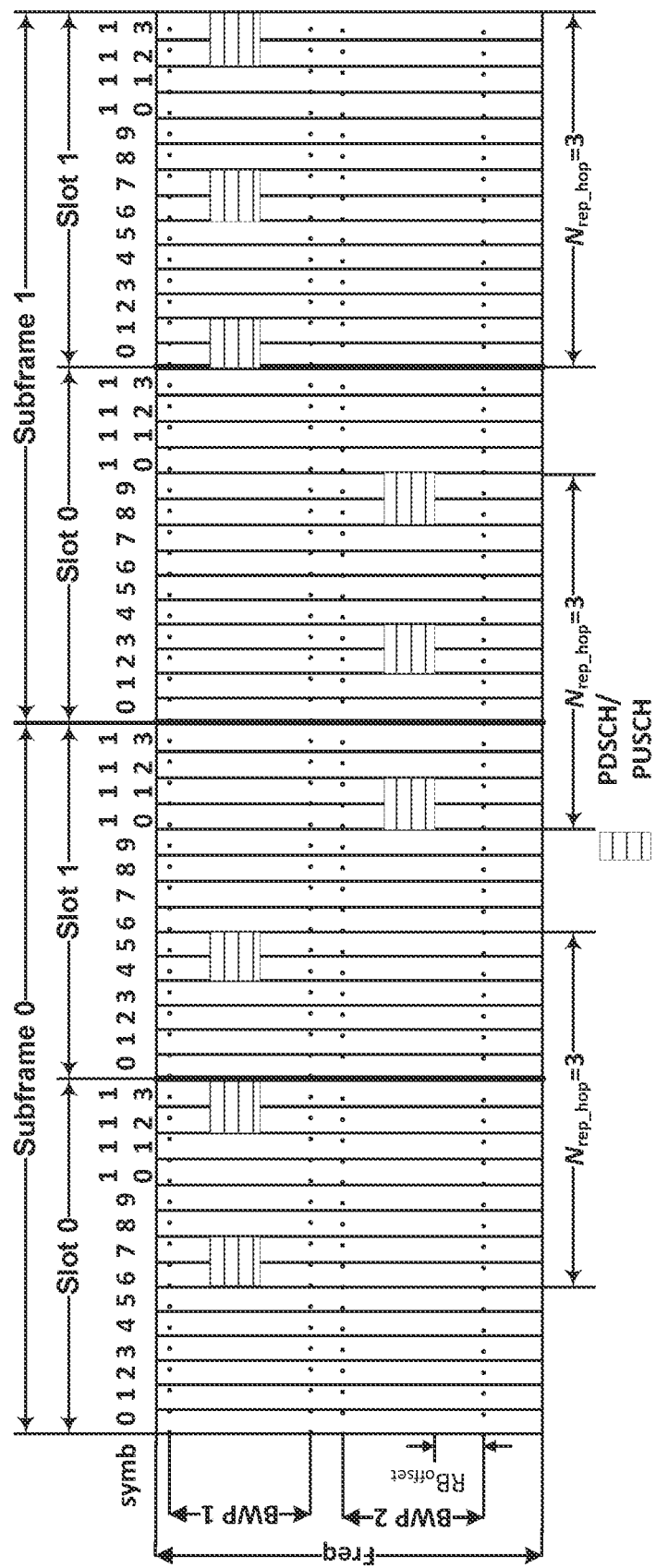
FIG. 23 is a time and frequency diagram illustrating an example of inter-repetition hopping across BWPs.

Inter-repetition hopping across BWPs may achieve where a hop takes place after each $N_{rep\_hop}$ repetitions across different BWPs which may be applied for both PDSCH and PUSCH as shown in FIG. 23 for example. This may be beneficial to reduce the power consumption compared with switching BWP every slot. The hopping occurs between $BWP_{original}$=BWP 1 and $BWP_{hopping}$=BWP 2. The hopped repetitions in $BWP_{hopping}$ may occupy the same frequency resources as those $BWP_{original}$. Also, an offset may be applied for the hopped repetitions in $BWP_{hopping}$. The offset may relative the $RB_{start\_indicated}$ of the scheduled or configured PDSCH or PUSCH in the $BWP_{original}$ or $BWP_{hopping}$. Also, the offset may be relative to particular RB in $BWP_{hopping}$ or in the carrier. The details of signaling the offset value will be provided later. For the reference RB, it may be indicated by high layer signaling. FIG. 23 shows an example that the reference RB is PRB0 of $BWP_{hopping}$.

In the example of FIG. 23, the hopping occurs between two BWPs. Hopping may also occur over multiple BWPs. Procedures similar to those described above to indicate BWP IDs sequence in which repetition may occur may also be used here. Please note that inter-repetition hopping within BWP or across BWPs also refers to inter-repetition group hopping where the frequency hopping occurs after certain number of repetitions. In a special case when the group size is equal to one, then hopping occur every repetition.

Here the examples for hopping within BWP or across BWPs are shown where the repetitions that are equally spaced and have the same duration. In practice, the same concept of frequency hopping may be applied for other configurations of repetition in which they are not equally spaced, and/or have different durations.

To indicate the sequence of BWP IDs in which the frequency hopping may occur, the following three methods may be used alone or in any combination.

First, instead of indicating only one hopping sequence by high layer signaling, RRC parameter hopping_order for example, more than one sequence may be indicated to the UE. For example, if there are four BWPs configured, {0, 1, 2, 3}, then the following sequences of $BWP_{hopping}$ ID(s) may be indicated by high layer signaling {0}, {1}, {2}, {3}, {0, 1}, {0, 2}, {0, 3}, {1, 2}, {1, 3}, {2, 3}, {0, 1, 2}, {1, 2, 3}, etc. MAC-CE may indicate one sequence of $BWP_{hopping}$ to be applied and continue cycling across those BWPs as indicated above. The hopping may be expected to take place in $BWP_{hopping}$ ID(s) in the indicated sequence in increasing order of their ID(s), for example, or according to another rule. If the $BWP_{original}$ belongs to the indicated $BWP_{hopping}$ sequence, then hopping starts from $BWP_{original}$ and continues in the other $BWP_{hopping}$ according to rules such as increasing order of BWP IDs. If the $BWP_{original}$ does not belong to the indicated sequence, then its ID will be added to the indicated sequence and hopping occur according to certain starting with $BWP_{original}$.

Second, a new field may be used to indicate which sequence of $BWP_{hopping}$ should be applied for dynamic PDSCH or PUSCH scheduled by DCI. For example, DCI format 1_0, 1_1, 1_2 for PDSCH or DCI format 0_0, 0_1, 0_2 for PUSCH, may be indicated. For semi-persistent PDSCH or configured grant type 2, then the activating DCI may have a dedicated field to indicate which sequence to be applied. Also, any of the saved bits from other fields may be used to indicate the sequence of frequency hopping. For configured PUSCH grant type 1, as part of ConfiguredGrantConIg or rrc-ConfiguredUplinkGrant for example, a new RRC parameter may indicate the index of the selected hopping sequence or by MAC-CE.

Third, the hopping sequence may be indicated in a Group-Common Physical Downlink Control Channel (GC-PDCCH), such as example DCI format 2_0. Specifically, a new field in GC-PDCCH, DCI format 2_0, may be used to indicate the frequency hopping sequence in addition to other information such as slot format.

Please note that DCI may indicate one sequence of those indicated by RRC, e.g., RRC+DCI, or DCI may indicate one sequence from a short list provided by MAC-CE, e.g., RRC+MAC-CE+DCI.

The starting RB of BWP may change in each hop, as well as other parameters such as number of RBs of BWP. For each hop the allocated RB for PDSCH or PUSCH may remain the same. It is the starting RB of the BWP that changes. Here, the BWP ID remains the same, but its starting RB may change for each hop, in addition to other parameters to BWP that may change.

Multiple locationAndBandwidth may be indicated in BWP IE that may be used when frequency hopping is enabled. Specifically, locationAndBandwidth may be a sequence of frequency domain allocations of BWP where the first one is applied to the repetitions in the first hop, the second frequency allocation is applied to the repetitions in the second hop and so on. W, Procedures similar to those described above inter-slot hopping or inter-repetition hopping can be applied here as well to indicate when the hopping should occur.

Alternatively, an offset may be applied to the first RB of the BWP to obtain the first RB of BWP in each hop. Procedures to indicate the $BWP_{hopping}$ IDs sequence may be applied here to indicate the offset values of BWP starting RB. One or more of the following three procedures may be applied.

First, high layer signaling, such as RRC parameter BWP_RB_start_Offset, may provide multiple sequences of the offset to be applied to the first RB in BWP. For example, the following sequences may be indicated {$offset_0$}, {$offset_1$}, {$offset_2$}, {$offset_3$}, {$offset_0$, $offset_1$}, {$offset_0$, $offset_2$}, {$offset_0$, $offset_3$}, {$offset_1$, $offset_2$}, {$offset_1$, $offset_3$}, {$offset_2$, $offset_3$}, {$offset_0$, $offset_1$, $offset_2$}, {$offset_1$, $offset_2$, $offset_3$}, etc. MAC-CE may indicate one sequence of offsets to be applied to the first BWP RB when hopping occur and continue cycling across those offsets as indicated above.

Second, for dynamic PDSCH or PUSCH scheduled by DCI, DCI format 1_0, 1_1, 1_2 for PDSCH or DCI format 0_0, 0_1, 0_2 for PUSCH, a new field may be used to indicate which sequence of BWP offsets may be applied. For semi-persistent PDSCH or configured grant type 2, then the activating DCI may have field to indicate which sequence to be applied. Also, any of the saved bits from other fields may be used to indicate the sequence of frequency hopping. For configured PUSCH grant type 1, as part of ConfiguredGrantConfig or rrc-ConfiguredUplinkGrant for example, a new RRC parameter may indicate the index of the selected hopping sequence or MAC-CE.

Third, the hopping sequence may be indicated in GC-PDCCH, for example DCI format 2_0. Specifically, a new field in GC-PDCCH, DCI format 2_0 for example, may be used to indicate the frequency hopping sequence in addition to other information such as slot format.

Please note that DCI may indicate one sequence of those indicated by RRC, e.g., RRC+DCI, or DCI may indicate one sequence from a short list provided by MAC-CE, e.g., RRC+MAC-CE+DCI.

A BWP switching timer may be adjusted based on the indicated spacing between scheduled or configured repetitions to avoid unnecessary BWP switching in-between repetitions. One or both of the following procedures may be used for this purpose.

First, a BWP inactivity timer may be set to the maximum of the indicated value, by bwp-InactivityTimer for example, the maximum separation between any two consecutive repetitions or any function of it.

Second, a BWP inactivity timer may not be triggered after the reception of the first repetition until the last indicated repetition. In other words, if a UE receives the first repetition, it does not trigger the BWP inactivity timer even if no activities on the current active BWP because UE is aware that more repetitions should be received or transmitted until the last repetition.

Repetition in Space (Beam-Based Repetition)

Coverage enhancement may also be realized by repeating PDSCH or PUSCH across different beams. Different repetitions may be transmitted using different beams. In NR Release 16, cyclic and sequential beam mapping to repetitions are proposed for PDSCH. For example, if there are two beams, B1 and B2, in cyclic mapping, B1 and B2 are applied for first and second repetitions and the same pattern continues to the remaining PDSCH repetitions (B1B2-B1B2-B1B2- . . . ). See TS 38.214. For sequential beam mapping with two beams B1 and B2, B1 may be applied to the first and second PDSCH repetitions, and B2 applied to the third and fourth PDSCH repetitions and the same pattern continues to the remaining PDSCH repetitions (B1B1-B1B2-B1B1-B2B2- . . . ). See TS 38.214.

The first beam may be applied for the first group of N repetitions, the second beam may be applied for the second group of N repetitions, to be indicated by high layer signaling for example, and so no for the remaining beams and the same pattern continues to the remaining PDSCH repetitions. For example, if we have two beams, B1 and B2, and each group of repetitions has four repetitions, N=4, then the pattern will be (B1B1B1B-B2B2B2B2-B1B1B1B1-B2B2B2B2- . . . ).

If frequency hopping is enabled, beams may be associated with the hops. For example, all the repetitions that are transmitted in the first hop may be transmitted with particular beam while the repetitions that are transmitted in the second hop may be transmitted with the same or another beam. This applies for frequency hopping within BWP and/or across BWPs. For example, in case of hopping across BWPs, each BWP may use specific beam(s), e.g., with same or different beams or with beam patterns configured for each BWP.

When frequency hopping is used, more than one beam may be used for the repetitions transmitted on any particular hop. For example, in case of hopping across BWPs, the repetitions transmitted in BWP1 may use B1 and B2 according to a specific sequence. While the repetitions transmitted in BWP2 may use B3 and B4 according to a specific sequence.

Information Related to Time Domain Details of the Repetitions

For dynamically scheduled PDSCH, semi-persistent PDSCH, dynamically scheduled PUSCH, and configured UL grant type 1/2, a UE needs to know at least the following information to receive or transmit the scheduled or configured transmission: (i) the start and duration of the first repetition: (ii) a way to determine the location of the next repetition: (iii) the number of repetitions; and (iv) a redundancy version (RV) for the repetitions.

For dynamically scheduled PDSCH or PUSCH, the compact scheduling DCI, e.g., DCI format 1_0/DCI format 0_0 for example, may be used but its fields may be interpreted differently to provide the additional information needed for coverage enhancement for PDSCH or PUSCH in addition to other information related to the grant.

In both DCI format 1_0/DCI format 0_0, the frequency domain resource assignment field has $\lceil \log_2(N_{RB}^{UL/DL,BWP}(N_{RB}^{UL/DL,BWP}+1)/2)\rceil$ bits, where $N_{RB}^{UL/DL,BWP}$ is the number of PRB in the UL/DL BWP to provide resource allocation type 1, the start and length of PRBs for PDSCH or PUSCH. For example, if the maximum bandwidth of BWP for reduced capability NR devices is 24 PRBs, then frequency domain resource assignment field has 9 bits. Such flexibility may not be needed for reduced capability NR devices in some cases because the size of PDSCH or PUSCH may be predictable to certain extend and number of needed PRBs may be fixed or almost fixed.

For example, a limited number of possible lengths of PRBs may be used. There may be a single length of PRB, $L_{PRB}$, provided in the protocol specifications or signaled by high layer signaling such as RRC parameter RB_length. Also, high layer signaling may signal multiple lengths of PRB and MAC-CE may be used to indicate which one may be used for PDSCH or PUSCH. In this case, only $\lceil \log_2(N_{RB}^{UL/DL,BWP}-L_{PRB})\rceil$ bits are needed to indicate just the first PRB in PDSCH or PUSCH. In our example, of BWP of 24 PRB and $L_{PRB}=6$, only 5 bits are needed.

Figure 24:
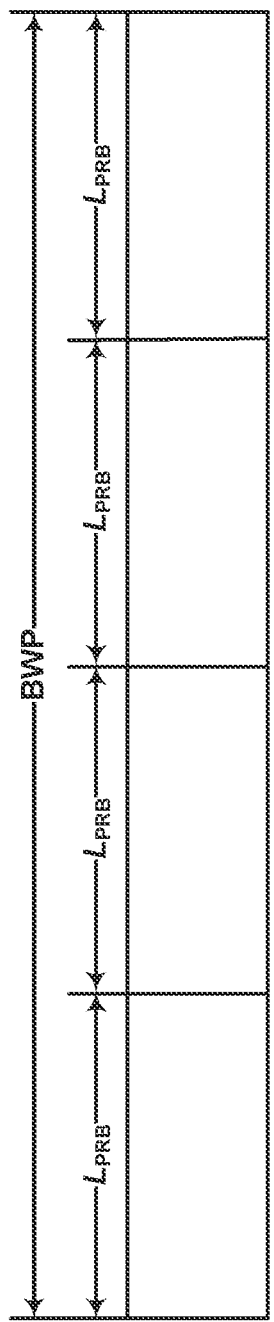
FIG. 24 is a time and frequency diagram illustrating an example where a single group of $L_{PRB}$ is selected.

PDSCH or PUSCH may be allocated for one of $L_{PRB}$ PRBs groups, as shown in FIG. 24 for example, and only $\lceil \log_2(N_{RB}^{UL/DL,BWP})\rceil$). Therefore, with BWP of 24 PRBs and $L_{PRB}=6$, only 2 bits are needed for frequency domain resource assignment field in the DCI.

Consecutive $L_{PRB}$ PRBs groups may be allocated to provide further scheduling flexibility. Therefore, in the example of BWP of 24 PRBs and $L_{PRB}=6$, only $\lceil \log_2(4+3+2+1)\rceil=4$ bits are needed for frequency domain resource assignment field in the DCI.

Figure 25:
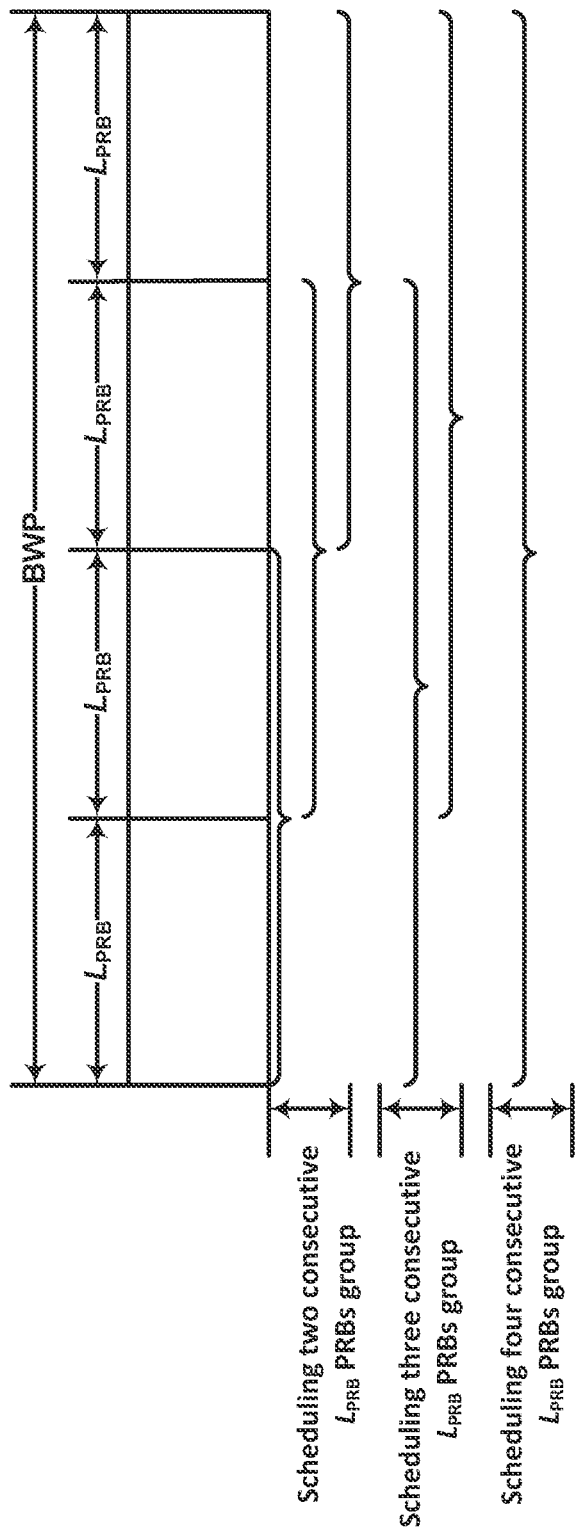
FIG. 25 is a time and frequency diagram illustrating an example where consecutive groups of $L_{PRB}$ are selected.

FIG. 25 is a time and frequency diagram of an example where consecutive groups of $L_{PRB}$ are selected.

In both DCI format 1_0 and/DCI format 0_0, there are five bits reserved for modulation and coding scheme. Due to limited capability of reduced capability NR devices, it is less likely to use high modulation order, e.g., 64 QAM. Therefore, it may be beneficial to save some of those bits, e.g., to use up to 16 QAM only. In this case, four bits are needed for MCS. Further reduction of the modulation and coding scheme field may be achieved by restricting the possible MCS values for reduced capability NR devices.

When the repetitions are equally spaced and have the same duration, the start and duration of the first repetition may be provided using regular NR signaling, e.g., the time domain resource assignment field consisting of four bits in DCI format 0_O/DCI format 1_0. Other repetitions may have the same duration as the first one. The spacing between any consecutive repetitions (the spacing between the first/last symbol of a repetition and the first/last symbol of the next repetition, the spacing between the first/last symbol of a repetition and the last/first symbol of the next repetition, etc.) may be provided by one or more of the following two methods.

First, high layer signaling such as RRC parameter inter_repet_spacing, for example, may provide $N_{spacing}$ possible spacing values in units of symbols, slots, etc. The DCI scheduling PDSCH or PUSCH may indicate which spacing value between repetitions may be used. Some of saved bits from frequency domain resource assignment field, or any other field, may be used to carry this indication, specifically, $\lceil \log_2(N_{spacing})\rceil$ bits. If there are not enough bits available for repurposing in the frequency domain resource assignment field or other fields, then the first spacing value of the provided spacing values set is applied. If there are only B available bits less than $\lceil \log_2(N_{spacing})\rceil$, the selection occurs from the first $2^B$. If the high layer signaling indicates a single spacing value, then no dedicated bits in the DCI for this purpose. If the spacing between consecutive repetitions does not need to be signaled dynamically, MAC-CE may be used to select one of possible spacing values signaled by RRC parameter. The parameter inter_repet_spacing may be signaled as part of PDSCH-Config/PUSCH-Config.

Second, the spacing between consecutive repetitions may be indicated by adding information to PDSCH-TimeDomainResourceAllocationList/PUSCH-TimeDomainResourceAllocationList IEs, a new parameter RRC for inter-repetition spacing. In DCI format 0_0/DCI format 1-0, there are only four bits dedicated for this purpose. Therefore, to provide more flexibility, more bits may be used for indicating the time domain resources. For example, the size or number of Time Domain Resource Allocation (TDRA) tables may be increased. For example, instead of having only 16 entries, a TDRA table may have 32 or 64 entries if one or two additional bits used for time domain indication, respectively. These additional bits may some of the saved bits from frequency domain resource assignment field, or any other field.

The number of repetitions for dynamically scheduled PDSCH or PUSCH may be provided by one or a combination of the following three methods.

First, high layer signaling may indicate a set of possible $N_{rept}$ repetitions values, such as RRC parameter nur_repet for example. The DCI scheduling PDSCH or PUSCH may indicate which number of repetitions may be used. Some of the saved bits from frequency domain resource assignment field, or any other field, may be used to carry this indication specifically, $\lceil \log_2(N_{rept})\rceil$ bits. If there are not enough bits available for repurposing in the frequency domain resource assignment field or other fields, then the first spacing value of the provided spacing values set may be applied. If there are only B available bits less than $\lceil \log_2(N_{rept})\rceil$, the selection may occur from the first $2^B$. If the high layer signaling indicates a single spacing value, then no dedicated bits in the DCI are used for this purpose. If the high layer signaling indicates a single spacing value, then no dedicated bits in the DCI for this purpose. For a case where the number of repetitions does not need to be signaled dynamically, MAC-CE may be used to select one of possible repetition values signaled by RRC parameter. The parameter num_repet may be signaled as part of PDSCH-Config/PUSCH-Config.

Second, instead of indicating actual number of repetitions, high layer signaling may indicate the time duration/window, in which repetitions will take place, such as RRC parameter dur_repet for example. It may be in units of slots, mS, etc. The repetitions may be transmitted/received until the last repetition that can be fully contained before the end of the window. As with indication of the number of repetitions, DCI/MAC-CE may be used to indicate the selected window size.

Third, the number of repetitions may be indicated in the PDSCH or PUSCH TDRA, e.g., using a new parameter RRC for number of repetitions. As mentioned above, the number of rows in TDRA table may be increased and other bits in DCI 0_0/1_0 may be repurposed to indicate the selected row as described above.

Where repetitions are fully contained within a slot, and the same symbols in the subsequent slots are used to carry the additional repetition as shown in the example of FIG. 6, PDSCH-TimeDomainResourceAllocationList or PUSCH-TimeDomainResourceAllocationList IEs may be used to indicate multiple SLIV values of all repetitions in the first slot. The same SLIV value(s) may be applied in all the subsequent slots. The spacing between the slots, e.g., slot-periodicity, may be configured by high layer signaling. If high layer signaling provided multiple slot-periodicities, then a new field in the scheduling DCI or the grant activating DCT may be used to indicate the selected periodicity.

Alternatively, again referring to FIG. 6, PDSCH-TimeDomainResourceAllocationList or PUSCH-TimeDomainResourceAllocationList IEs may be used to indicate a single SLIV value of the first repetition. The subsequent repetition in the same slot may back to back after the end of the first repetition until the end of the slot. The slot-periodicity may be indicated as stated above. The same symbols in the subsequent slot, based on the indicated slot-periodicity, may carry the remaining repetitions.

Alternatively, for the example in FIG. 6, PDSCH-TimeDomainResourceAllocationList or PUSCH-TimeDomainResourceAllocationList IEs may be used to indicate a single SLIV value of the first repetition. For the case that repetitions are equally spaced in the first slot, a high layer signaling may indicate the spacing between any two consecutive repetition in first slot carrying the first repetition. If high layer signaling indicated more than one value (in scheduling DC or activating DCI, or MAC-CE), the slot-periodicity may be indicated as stated above. The same symbols in the subsequent slot, based on the indicated slot-periodicity, may carry the remaining repetitions.

Alternatively, for the example in FIG. 6, PDSCH-TimeDomainResourceAllocationList or PUSCH-TimeDomainResourceAllocationList IEs may be used to indicate a single SLIV value of the first repetition. The number of repetitions in the first slot may be indicated using one of the methods described above. Then the first repetition may follow the indicated SLIV value followed by back to back repetitions based on the indicated number of repetitions per slot. Here, repetitions in the first slot do not necessarily reach the end of slot. The slot-periodicity may be indicated as stated above. The same symbols in the subsequent slot, based on the indicated slot-periodicity, may carry the remaining repetitions.

Figure 26:
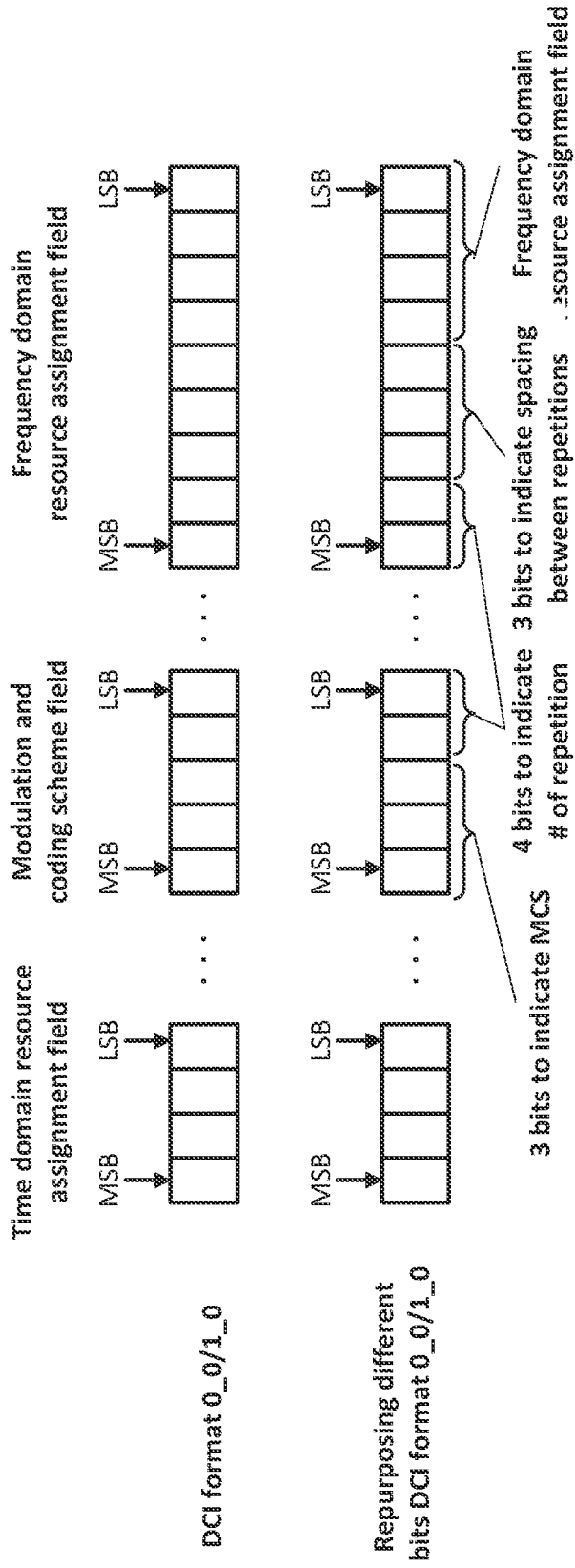
FIG. 26 illustrates examples of repurposing available bits of DCI format 0_0/1_0 to indicate the spacing between the consecutive repetitions and number of repetitions.

FIG. 26 shows an example of repurposing the saved bits from different fields of DCI format 0_0/1_0 for BWP of 24 PRBs. The upper portions of FIG. 26 show the frequency/time domain resource assignment fields consists of 9/4 bits, respectively, and MCS field consists of five bits. As described above, only four bits starting from the LSB of frequency domain resource assignment field are used to indicate which PRBs carrying PDSCH or PUSCH. The subsequent three bits are used to indicate the spacing between any two consecutive repetitions. The most significant two bits of this field and the least significant two bits of the MCS field indicate the number of repetitions. The remaining bits of MCS field are used to indicate the MCS.

Although separate bit fields are used in this example to indicate the spacing between any two consecutive repetitions and number of repetitions in this example, the TDRA table may also be expanded, e.g., using repurposed bits.

A UE needs to know whether the fields of DCI 0_0/1_0 are interpreted as in NR Rel 15/16, or according to another approach. To this end, one or more of the following four methods may be used.

The first is based on a UE's capability. If a UE belongs to the category of low capability UEs, then the modified interpretation of DCI 0_0/1_0 fields may be applied here as well.

Second, in some cases it may be beneficial to have both interpretation of DCI fields. A new RNTI for scrambling the DCI CRC when the modified interpretation of DCI 0_0/1_0 fields should be applied, e.g., NR_light_RNTI. If DCI is scrambled by C-RNTI, the conventional interpretation is applied. If it is scrambled by NR_light_RNTI, the modified interpretation is applied.

Third, some CORESETs/search spaces may be reserved for each way for interpreting the DCI fields. For example, RRC parameter in ControlResourceSet/SearchSpace IEs may indicate whether the conventional interpretation of DCI fields or the modified one should be applied. If this parameter is absent, then conventional interpretation of DCI fields is applied.

Fourth, some DMRS scrambling initializations may be reserved for PDCCH which UE should decode its DCI with the modified interpretation provided above. For example, an RRC parameter may indicate the list of the reserved DMRS scrambling initializations.

Techniques that may be achieved by repurposing existing fields of DCI 0_0/1_0 may also be achieved using a new DCI format for reduced capability NR devices.

For the case that the repetitions are not equally spaced and have different duration, the PDSCH or PUSCH TDRA table may be modified such that each row indicates multiple SLIV values, where each value corresponds to a particular repetition. If the number of SLIV values in any row is greater than the number of indicated repetitions $N_{rept}$ using one of the aforementioned methods, then only $N_{rept}$ SLIV values may be used, for example. Normally, the UE would not expect $N_{rept}$ to be smaller than of the SLIV values in the indicated row.

For the case of repetitions-groups over non-consecutive slots illustrated in FIG. 6, the spacing between each repetitions-group may be indicated using one of the aforementioned methods. The TDRA of PDSCH or PUSCH may indicate the time domain resources for the first repetition. Then remaining repetitions occur until the end of the slot and the whole thing is repeated based on the indicated spacing between the repetitions-groups.

For scheduling DCI 0_1/0_2/1_1/1_2, repurposing of the existing fields may occur as described in the aforementioned methods or any of their combinations.

For semi-persistent PDSCH or PUSCH configured grant type 2 that is activated DCI format 1_1/1_2 or 0_1/0_2, respectively, the information on the spacing between any two consecutive repetitions, duration of each repetition, number of repetition may be carried in activating DCI by repurposing some fields as described above. If new DCI formats are introduced to activating semi-persistent PDSCH or PUSCH configured grant type 2, then dedicated fields as described above may be introduced. Alternatively, high layer signaling may indicate the needed information such as RRC parameters, inter_repet_spacing, num_repet, for example. These RRC parameters may be transmitted as part of SPS-config or ConfiguredGrantConfig, respectively. Also, RRC parameters may configure multiple values spacing between any two consecutive repetitions, number of repetition and MAC-CE may indicate the value to be applied.

For PUSCH configured grant type 1, e.g., when no activating DCI is used, then the information may be provided by RRC or RRC+ MAC-CE as described above.

A UE may assume that RV of the scheduled or configured PDSCH or PUSCH is cycled based on a specified sequence, as provided in the protocol specifications, such as 0-2-3-1. When DCI is used to schedule the first repetition/activate the grant and indicate first RV to be used, the subsequent repetitions cycle RV based on the specified sequence. Also, RV sequences may be indicated by high layer signalling, such as RRC parameters.

In the case that pdsch-AggregationFactor, pusch-AggregationFactor, or repK is configured in PDSCH-config or PUSCH-config or ConfiguredGrantConfig, respectively, to indicate the repetition number of PDSCH or PUSCH in consecutive slots, respectively, each PDSCH or PUSCH may be repeated extra times based on the provided configuration described above such as num_repet and inter_repet_spacing for example.

The number of repetitions for PDSCH or PUSCH may be signaled through high layer parameters, such as RRC parameter num_repetition for example, which may be applied dynamically scheduled PDSCH, semi-persistent PDSCH, dynamically scheduled PUSCH, or configured UL grant type 1/2.

Different repetitions may have different MCS indices. The MCS index for each repetition may be indicated or derived by a certain rule. For example, high layer signaling may indicate multiple MCS index offset values, and one of them may applied, denoted as $MCS_{offset}$. Some repetitions may apply the MCS index indicated in the scheduling DCI for dynamic PDSCH or PUSCH, provided in the activating DCI in the case of semi-persistent PDSCH or configured grant type 2, or provided in RRC configurations as the case for PUSCH configured grant type 1, denoted as $MCS_{original}$. Other repetitions may apply MCS index+the indicated offset value, e.g., the actual MCS index is $MCS_{original}+MCS_{offset}$. Those two MCS indices, $MCS_{original}$ and $MCS_{original}+MCS_{offset}$, may be applied every other repetition. In other words, the first repetition applies $MCS_{original}$, the second repetition applies $MCS_{original}+MCS_{offset}$, the third repetition apply $MCS_{original}$ and so on.

Also, $MCS_{original}$ may be applied on first group of N repetitions, $MCS_{original}+MCS_{offset}$ may be applied on the subsequent group of N repetition and so on. The number of repetitions in each group may be indicated by high layer signaling.

Also, if frequency hopping is enabled, different hops may apply different MCS. For example, the MCS offset may be a function of frequency offset of the hop.

If high layer signaling indicates multiple $MCS_{offset}$ values, then MAC-CE may indicate the selected MCS offset value.

Also, a new field in the scheduling/activating DCI may indicate the selected $MCS_{offset}$ value or by using any of the saved bits mentioned above.

Information Related to Frequency Domain Details of the Repetitions

For dynamically scheduled PDSCH or semi-persistent PDCSH, high layer signaling may provide a UE with $N_{hopping}$ values of frequency offsets, such as RRC parameter PDSCH-hopping_offset, for example. The scheduling/activating DCI of PDSCH may indicate one offset value by $\log_2(N_{hopping})$. For example, the MSB of the saved bits of frequency domain resource assignment field, or from other fields, may be used to indicate the offset. For less dynamic situation, the frequency offset value may be indicated by MAC-CE.

For the case of PDSCH or PUSCH hopping across BWPs, the ID of $BWP_{hopping}$ may be indicated by high layer signaling such as RRC parameter BWP_hopping_ID. Also, BWP_hopping_ID may indicate multiple BWP IDs for frequency hopping and DCI may select one ID for frequency hopping. This field is different from the BWP switching field. Also, RRC+MAC-CE may be used to provide the $BWP_{hopping}$ ID. If RRC parameter BWP_hopping_ID and frequency hopping offset parameter are configured, then the indicated offset is applied within $BWP_{hopping}$ as described above.

Unblind Coverage Enhancement

Unblind coverage enhancement may be achieved by enabling the UE to assist the scheduling entity in determining the needed enhancement level for PDSCH or PUSCH or SideLink (SL) PSSCH, wherein the scheduling entity may be a gNB, another peer UE or a Roadside Unit (RSU). In some cases, a gNB may configure/indicate certain number of repetitions based on some measurement, but later due to the UE mobility either more coverage enhancement is needed (gNB did optimistic estimate for the needed coverage enhancement level) or less coverage enhancement is needed to save power (gNB did pessimistic estimate for the needed coverage enhancement level).

Downlink Transmission

For dynamically scheduled PDSCH or activated semi-persistent PDSCH, gNB may indicate the number of repetitions, spacing between repetition, etc. If a UE realized the number of repetitions need to be modified, a UE may transmit an indication to gNB to modify the grant. One or both of the following means may be used to provide such an indication.

First, the indication may be transmitted after receiving the DCI scheduling PDSCH or activate semi-persistent PDSCH, but before the reception of the first PDSCH. In this case, the UE may estimate the channel quality based on PDCCH DMRS, for example, or other reference signals and verify whether the indicated number of repetitions is enough to attain reliable decoding of PDSCH.

Figure 27:
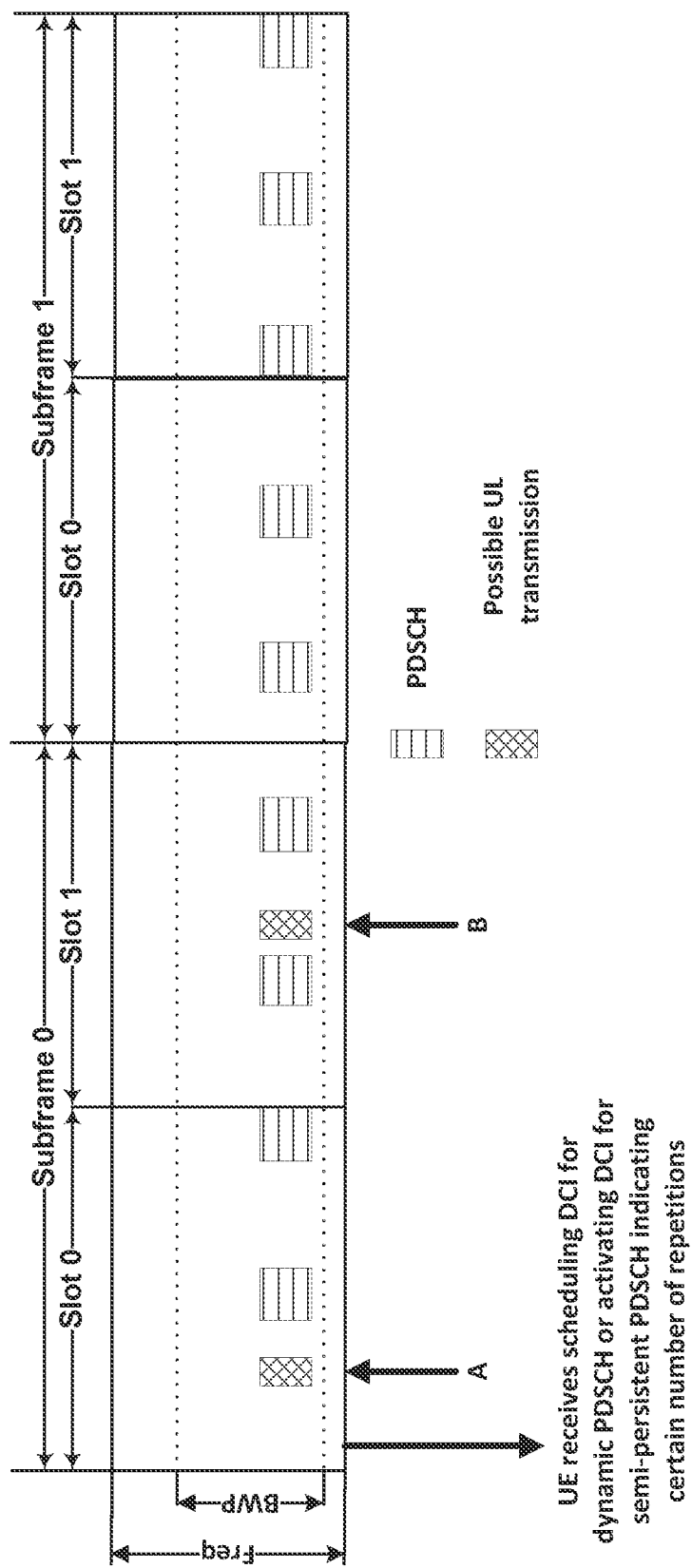
FIG. 27 is a time and frequency diagram illustrating and example of requesting to modify number of repetitions for PDSCH.

Alternatively, the UE may transmit an UL signal/channel, as illustrated by arrow A in FIG. 27, for example. On the other hand, a UE may receive few PDSCH repetitions and then based on the estimated channel quality, the UE may realize that indicated number of repetitions may not enough for reliable decoding. Therefore, a UE may transmit an UL signal/channel to indicate the need to modify the indicated number of repetitions as shown by arrow B in FIG. 27 for example. Please note that modifying the number of repetitions implies either to increase the number of repetitions or decrease (early terminate) them.

FIG. 27 shows a single arrow for possible UL signal/channel transmission. In practice, this signal may be repeated multiple times for coverage enhancement. All repetitions for UL signal/channel may take place before the transmission of the first PDSCH, shown by arrow A. Or the repetitions of the UL signal/channel may be interlaced/interleaved with PDSCH as shown by arrow B.

This UL signal/channel may be a contention-free or contention-based Physical Random-Access Channel (PRACH), PUCCH (e.g., carrying ACK/NACK), or PUSCH carrying MAC-CE or uplink control information (UCI) for example. A UE needs to indicate the desired number of repetitions either explicitly or implicitly. For the explicit case, a dedicated field indicating in UCI/MAC-CE may indicate the desired offset in the number of repetitions, or direct mapping to the desired number of repletion such as mapping the PRACH occasion/DMRS initialization sequence of PUSCH/PUCCH with desired offset. The explicit indication is beneficial especially when operating in frequency division duplexing (FDD) mode. On the other hand, the implicit indication is based on measurement conducted by gNB. For example, gNB may measure the quality of PRACH or DMRS of PUCCH/PUSCH and adjust the indicated number of repetitions accordingly. This is beneficial in the case of time division duplexing (TDD) operation mode. Please note that the desired offset in the number of repetitions may increase, decrease, or terminate the repetitions.

The resources for the UL signal/channel that carries the indication may be provided relative scheduled PDSCH itself. For example, the indication may be transmitted in within a certain window before/after each repetition. The duration of the window may be indicated by high layer signaling, such as RRC parameter rep_adj_window. The window may start from the $n_{start}$ symbol after end of each repetition (depending on UE capability and the time needed to switch from DL to UL). Alternatively, an offset may be applied, or the window may be indicated by high layer signaling. Also, the window may end at new symbol, or before the beginning of the next repetition depending on UE capability. An offset may be applied. The configuration may be indicated by high layer signaling.

Another possibility for such signal/channel is UCI carrying ACK/NACK of PDSCH. Basically, DCI can indicate time separation between PDSCH and occasion for ACK/NACK submission using PDSCH-to-HARQ-feedback timing field. Therefore, this value may be applied after each repetition, or possibly after few repetitions determined by certain rules, to enable the UE to transmit ACK/NACK. If gNB receives an early ACK, then gNB may abort the remaining repetitions and UE is not mandated to monitor the remaining repetitions after ACK transmission.

If a UE transmits an UL signal/channel requesting to modify the number of repetitions either explicitly or implicitly (an early NACK for example and possibly to be combined with other information about suggest number of repetitions) and received another DCI in which the same HARQ process ID of the PDSCH that is currently received and NDI is not toggled, the UE may then assume that additional repetitions are scheduled. The total number of repetitions is equal the number of repetitions indicated in first scheduling DCI plus the number of repetitions indicated in the DCI received after transmitting the modification request. A conditioned search space may be used which is only monitored if a UE transmits an UL signal or channel to request modifying the number of repetitions. Some parameters of this search space such as monitoring slot periodicity and offset may depend on the indicated grant.

Figure 28A:
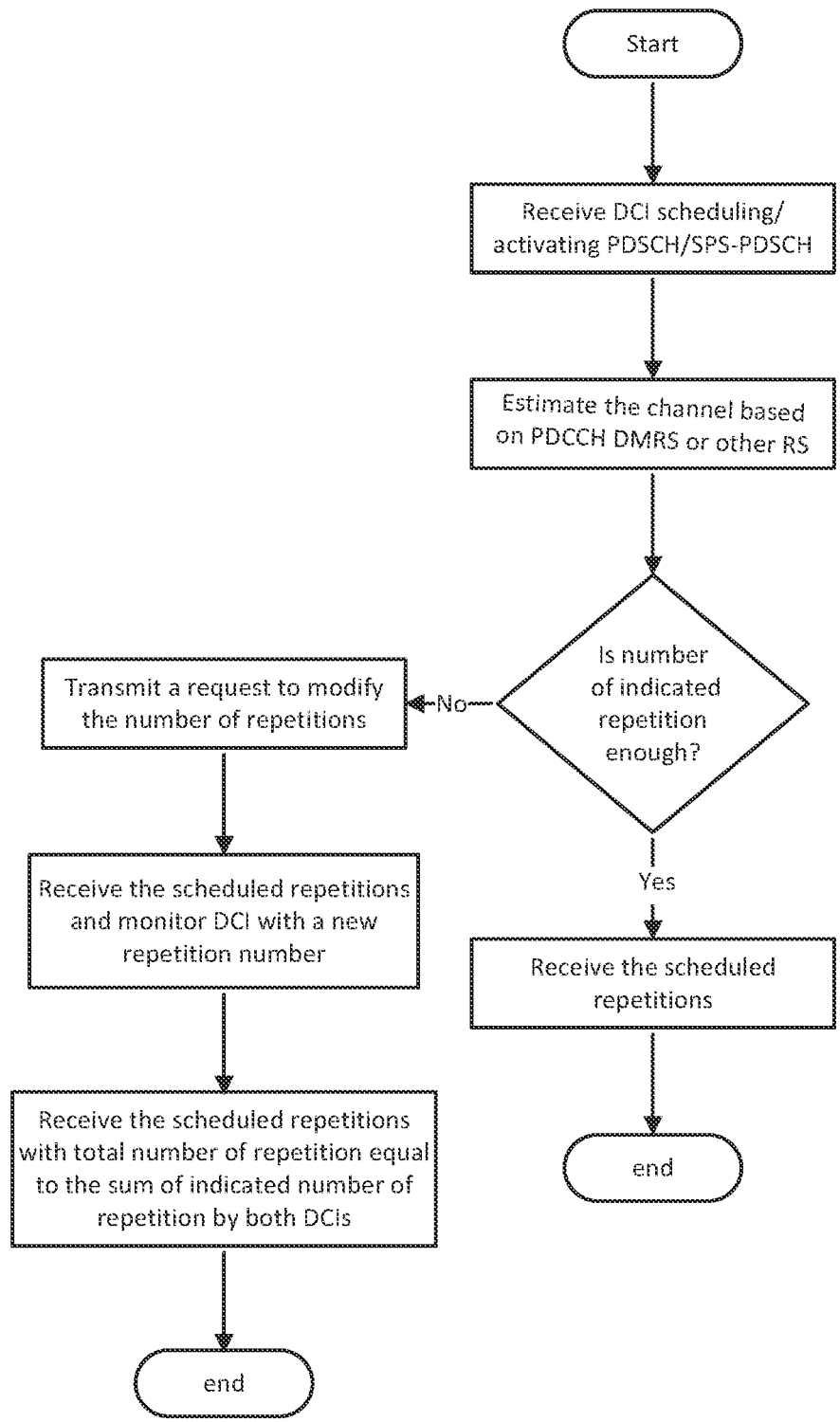
FIGS. 28A and 28B are flowcharts illustrating example procedures for modifying the number of repetitions indicated by a gNB.
Figure 28B:
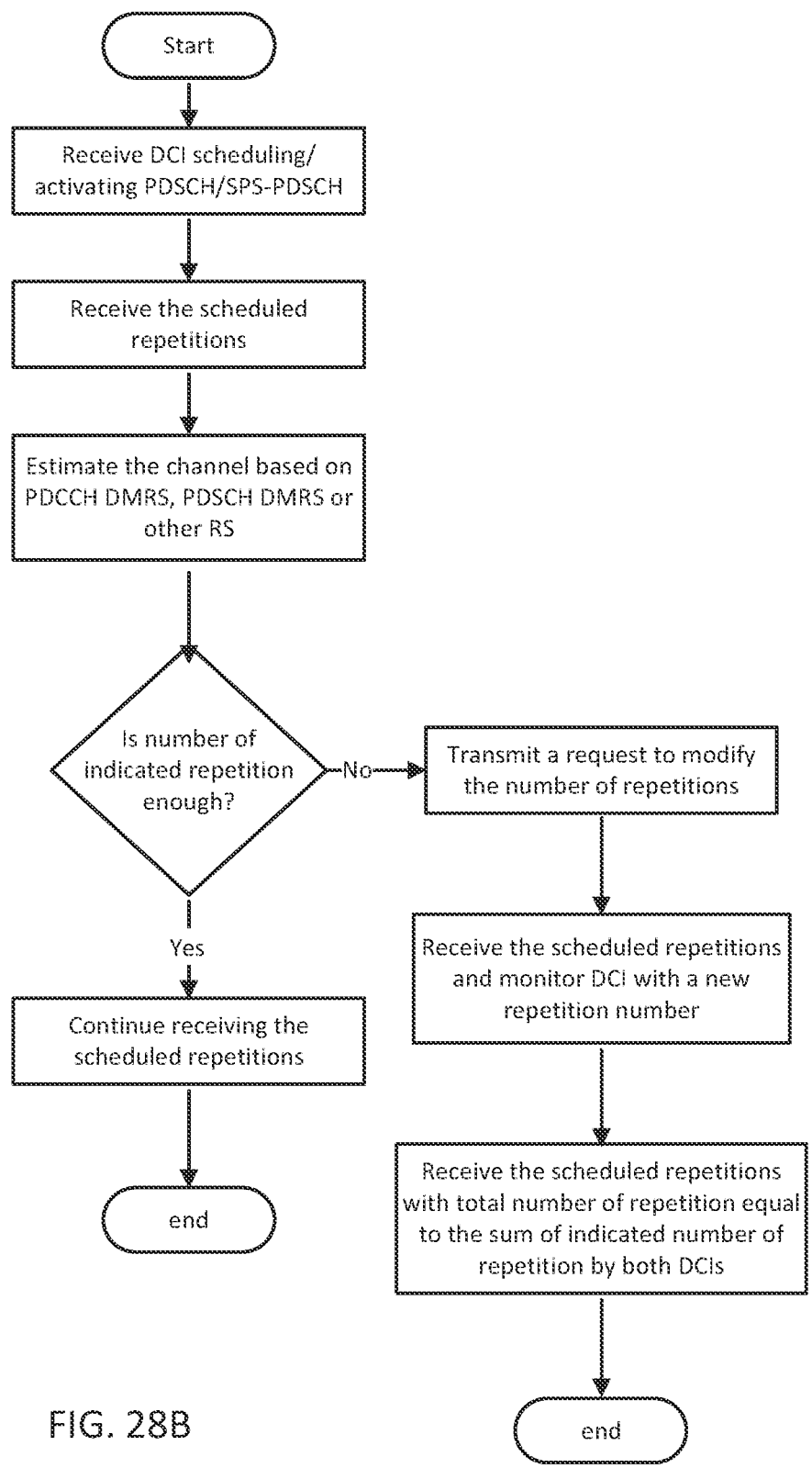

The procedures described above are is illustrated FIGS. 28A and 28B. In FIG. 28A, a UE starts assessing the indicated number of repetitions as early as PDCCH is received. In FIG. 28B, a UE assesses the indicated number of repetitions after receiving at least the first repetition.

The gNB may modify the number repetitions to enhance coverage. In practice, other procedures may be applied to enhance coverage without modifying number of repetitions. For example, the gNB may modify grant to enhance coverage, but keep the number of repetitions fixed. For example, the gNB may reduce the MCS and increase the duration for each repetition, change the frequency allocation. In this case, the UE may assume the new DCI overwrite the old DCI and remaining repetitions may follow the new configurations. Further, the UE may assume that the original number of repetitions will follow the old DCI while the additional repetitions will follow the new DCI.

A UE may use any reference signals that are transmitted with scheduled or activated PDSCH, such as CSI-RS for CSI or CSI-RS for phase-tracking, to estimate a metric such as RSRP, RSRQ SINR, etc., to determine whether any modifications of the indicated configurations are needed. For such measurements, no reporting is required. Some thresholds may be configured by high layer signaling such that, if the measured quality is below the indicated threshold, a UE may transmit a request to modify the grant configurations.

Uplink Transmission

For dynamically scheduled PUSCH or configured grant type 1/2, the indicated number of repetitions may not be appropriate due to the mobility of reduced capability NR devices. Similar to DL transmission, UE may use PDCCH DMRS to estimate the channel and determine whether the indicated number of repetitions needs to be modified. This is beneficial for dynamic PUSCH, and for configured grant type 2 where the time separation between the activating DCI and PUSCH transmission is small. For the case of configured grant type 1, the time separation between configured grant activating DCI and the actual transmission is big, and reduced capability NR devices may use a recent reference signal to estimate the channel quality and determine whether the indicated number of repetitions needs to be modified.

If UE realizes that the number of indicated repetition is needs to be modified, then one or both of the following methods may be used.

First, in the first $N_{repet\_adj}$ repetitions, the UE may transmit piggybacked UCI on PUSCH indicating that the number of repetitions needs to be modified. The piggybacked UCI may indicate the number of suggested repetitions/an adjustment of the already indicated number of repetitions. The value of $N_{repet\_adj}$ may be indicated by high layer signaling.

Second, in the first $N_{repet\_adj}$ repetitions, the UE may transmit MAC-CE indicating the adjustment of number repetitions.

UCI/MAC-CE may be transmitted in the first $N_{repet\_adj}$ repetitions. UCI/MAC-CE in non-consecutive repetitions may also be determined based on certain rules. For example, it may be transmitted every other repetition, every i repetitions, etc.

After UE transmits the indication requesting to change the number of repetitions, UE may start monitoring gNB response. If the UE receives a DCI with the same HARQ process ID and untoggled NDI, then the UE may assume that total number of repetitions is equal to sum of what indicated in both DCIs. This works for dynamically scheduled PUSCH. For configured grant type 1/2, the DL MAC-CE may overwrite the indicated number of repetitions.

In this document, unless explicitly otherwise stated, gNB may be understood as a scheduling entity and as such the functions of the gNB as described in this paper may be assumed or provided by other entities such as a peer UE or a Road Side Unit (RSU) for e.g., when the communication is over sidelink.

DMRS Sharing

With more repetitions, the DMRS overhead may be significant, especially if the number of the allocated resources for repetitions is small. Further, given that reduced capability NR devices may be fixed or have limited mobility. To address these, DMRS sharing may be enabled among different repetitions for PDSCH or PUSCH. DMRS sharing refers to the case that some configured DMRS within a PDSCH or PUSCH repetition or across different repetitions may be dropped, and those REs that would be occupied by DMRS may carry PDSCH or PUSCH instead of DMRS. Here, the UE or gNB may rely on remaining DMRS to estimate the channel.

The power of the remaining DMRS symbols may be boosted to further enhance the channel estimation quality. The level of power boosting may be function of the number of dropped DMRS symbols or may be indicated by high layer signaling.

Figure 29:
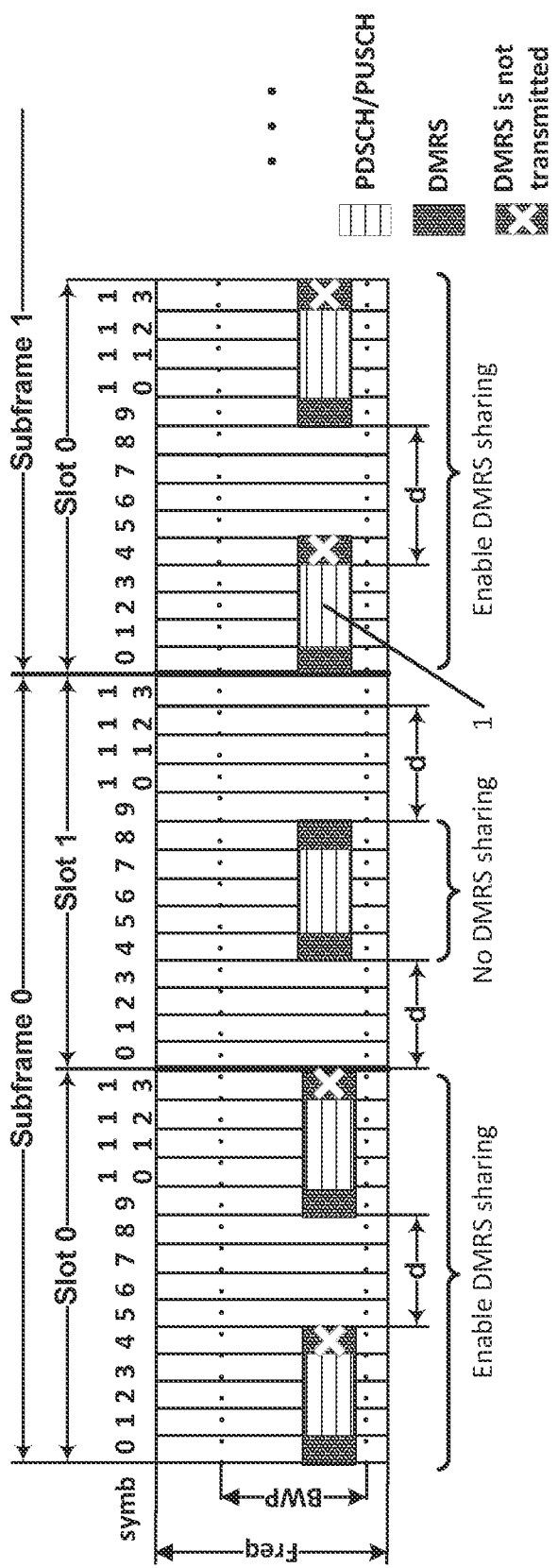
FIG. 29 is a time and frequency diagram of an example of DMRS sharing for when frequency hopping is disabled.

DMRS sharing may occur between repetitions that are scheduled or configured are confined within a slot. In other words, if there are multiple repetitions fully confined in a single slot, then DMRS sharing may occur. FIG. 29 shows an example of PDSCH or PUSCH repetitions of five symbols duration and the spacing between the last symbol of repetitions and the first symbol of the next repetition is d=4 symbols. Please note that the fifth repetition, denoted by 1 in FIG. 29, is shifted by one symbol to the next slot to be fully contained in the next slot as described earlier. Mapping type B is assumed in FIG. 29 with two DMRS symbols occupying the first and last symbol in each repetition. In this example, DMRS sharing is adopted when at least two repetitions are fully contained within a slot. In this case, the last DMRS symbol is dropped from the repetition pairs in Slot 0 in Subframe 0 and 1. Since slot 1 in Subframe 0 has only one repetition, then no DMRS is dropped. When DMRS is dropped, the freed REs that would carry DMRS may be used to carry PDSCH or PUSCH.

Criteria for dropping DMRS may be a function of other channel parameters such as the mobility speed which is reflected in doppler shift. For example, if speed or doppler shift is greater than particular threshold, then DMRS sharing may be disabled, or limited DMRS sharing may be applied. The threshold value may be specified or indicated by high layer signaling. In the case of limited DRMS sharing, the number of dropped DMRS symbols is lower than in the case where full DMRS sharing is applied.

High layer signaling may explicitly indicate whether DMRS sharing is enabled or disabled. The minimum number of repetitions within a slot at which DMRS sharing is enabled may be signaled by high layer signaling, and when such signaling is absent, DMRS sharing may be disabled. The minimum number of repetitions may be implied by signaling the minimum spacing between any two consecutive repetitions at which sharing DMRS is enabled.

In this example, the last DMRS symbol in each repetition is dropped when DMRS sharing is enabled. Other dropping patterns/methods may be applied.

For example, high layer signaling may indicate maximum number of DMRS symbols that may be dropped from the end of the repetitions. In this example, it is equal to one. Also, it may be assumed at least the first DMRS symbols of each repetition is always transmitted.

Figure 30A:
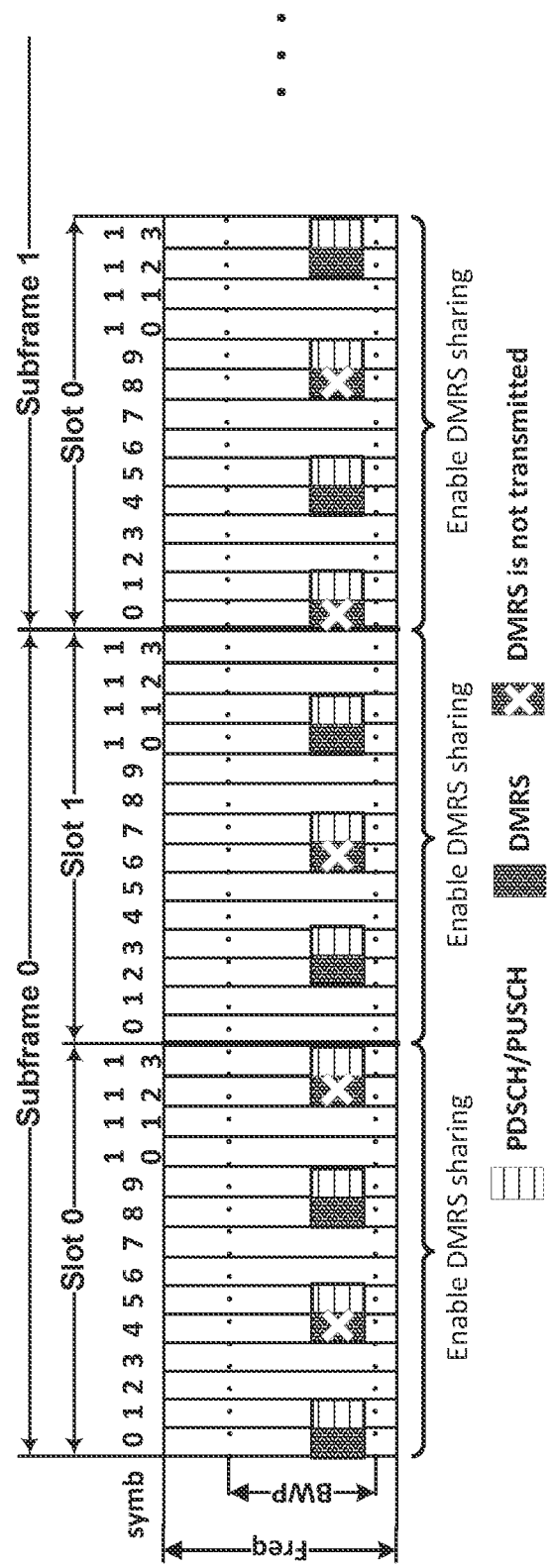
FIGS. 30A and 30B are time and frequency diagrams illustrating examples of DMRS sharing for when frequency hopping is disabled.
Figure 30B:
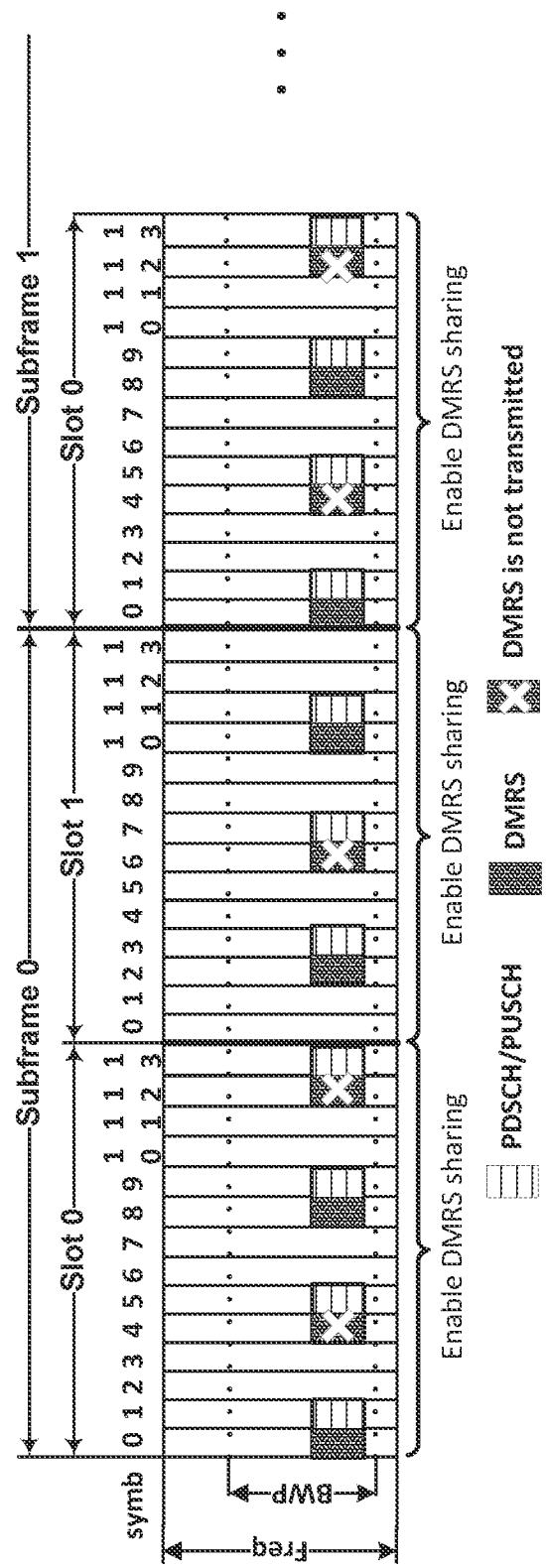

Further, high layer signaling may indicate a pattern of repetitions in which all, or some, of the DMRS symbols may be dropped. FIG. 30A shows an example of dropping DMRS symbols of every other repetition. In this example, high layer signaling may indicate a ½. Alternatively, high layer signaling may indicate a bitmap field, 7 bits for example, where each bit correspond to one repetition. If the number of repetitions within a slot is N and it is smaller than 7, then UE may only consider the first N bits. If a bit correspond to a repetition is set to one, the UE may assume that its DMRS is dropped, for example. This is illustrated in FIG. 30B, for example, which differs from FIG. 30A as to which DMRS symbols of which repetitions are dropped. Specifically, the repetitions for which the DMRS symbol in dropped in Slot 0 in subframe 1 are different. In FIG. 30A, DMRS dropping occurs every other repetition. In FIG. 30B, DMRS dropping occurs according an indicated bitmap applied separately in each slot. If the number of repetitions within a slot is N, and N is greater than the number of allocated bits for the bitmap, then cycling may be assumed to occur to cover all the repetitions within the slot.

Figure 31:
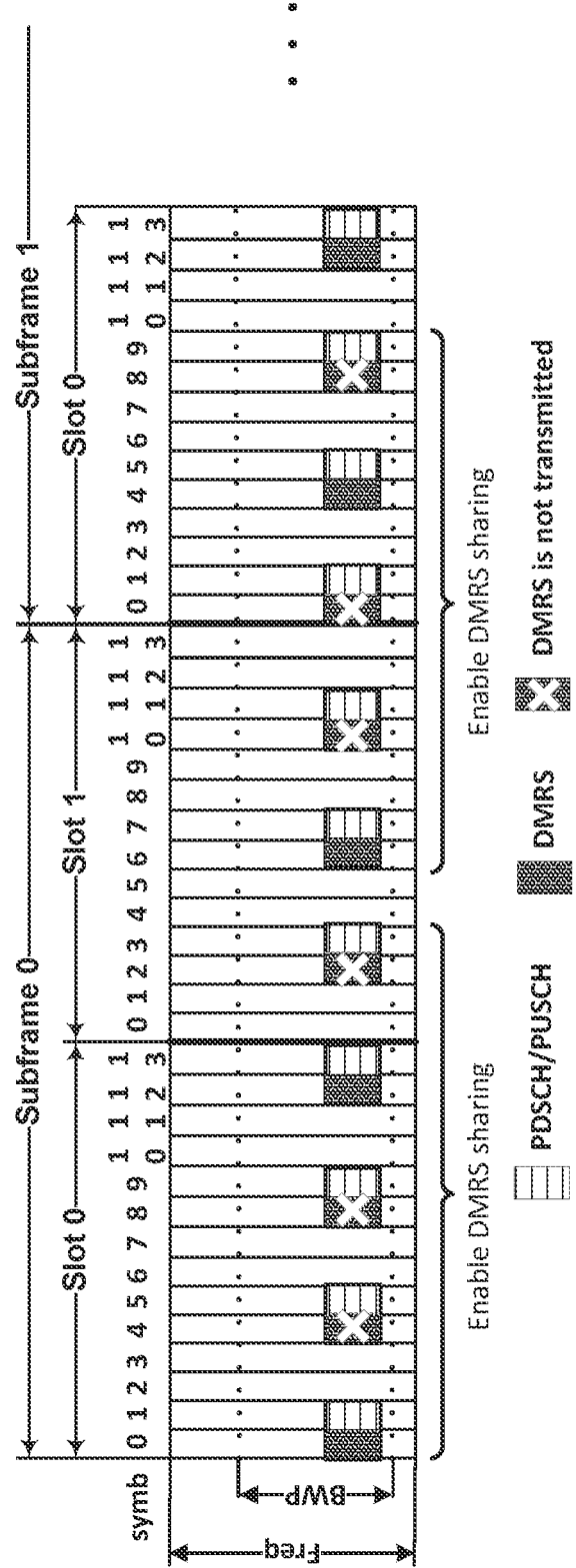
FIG. 31 is a time and frequency diagram an example of DMRS sharing across a slot boundary.

Instead of restricting the DMRS sharing to repetitions that are fully within a single slot, DMRS sharing may be permitted between N repetitions across slot boundaries. FIG. 31 shows an example of where N=5. High level signaling has indicated that every third repetition will maintain its DMRS. Alternatively, the high layer may have provided a bitmap indicating 100100 (7 bits from the previous example). In the case of the bitmap, the number of bits may be equal to N. If N is smaller than the field's bit width, then UE may only consider the first N bits. If N is larger than the field's bit width, then UE may assume that the bitmapped is cycled until reaching N repetitions.

Figure 32:
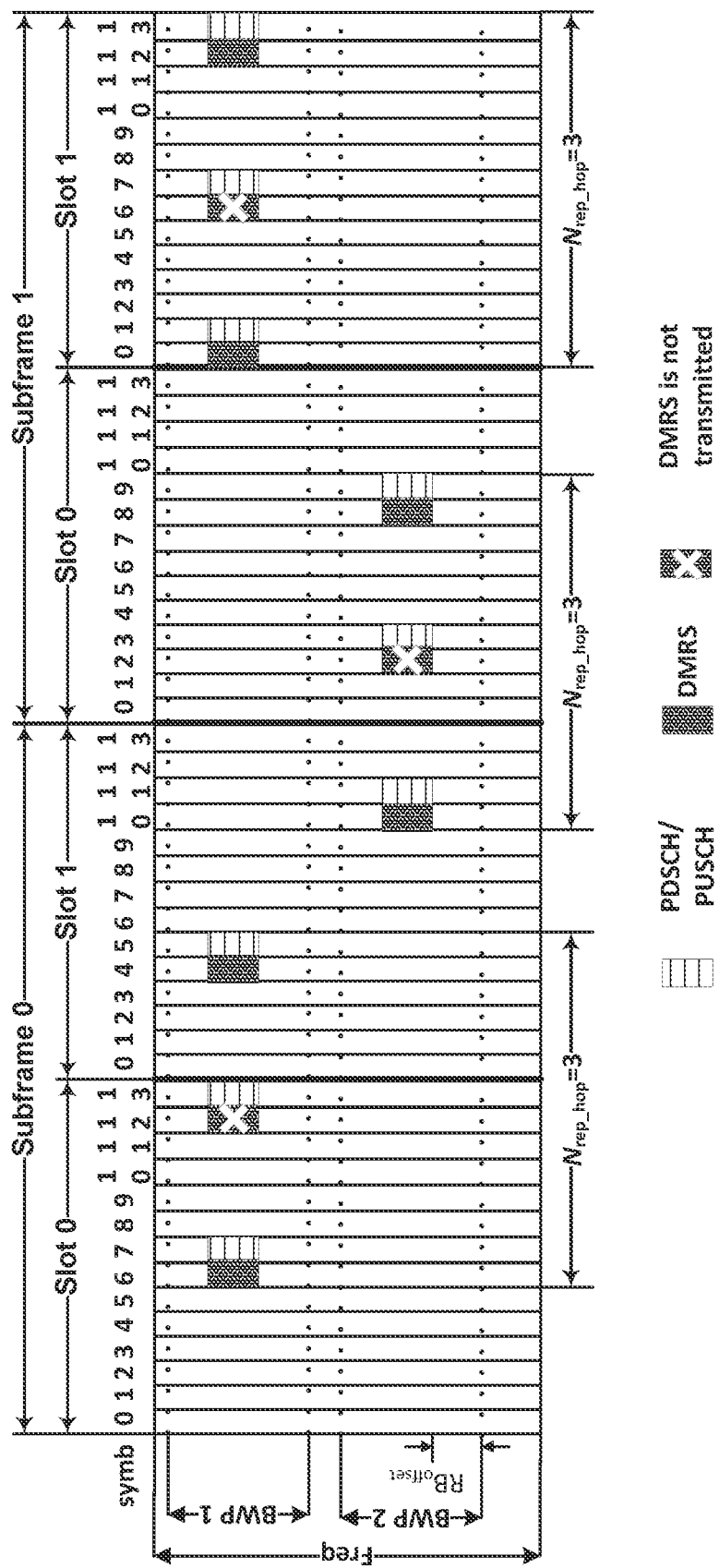
FIG. 32 is a time and frequency diagram an example of DMRS sharing with frequency hopping enabled.

If frequency hopping is enabled and hopping occurs either within BWP or across BWPs, DMRS sharing may occur between hops occupying the same frequency resources. Procedures may be adopted to determine which repetitions DMRS may be dropped, e.g., per hop. FIG. 32 shows an example of hopping across BWPs every 3 repetitions. Similarly, DMRS sharing may occur every three repetitions within each hop such that the DMRS of each other repetition per hop is dropped.

For the case of hopping within BWP, wideband DMRS may at least cover PRB of PDSCH/PUSCH across different hops, for example.

For the case of hopping within or across BWPs, the DMRS sharing may be applied between different hops if they fall within the coherent bandwidth of the channel. High layer signaling may indicate whether such feature may be enabled or not, e.g., based on a channel measurement.

For the cases of hopping across multiple BWPs that are partially or fully overlapped, DMRS sharing may be applied between the hops in the common RBs between those BWPs.

DMRS sharing scheme may vary from one BWP to another. For example, DMRS sharing may be applied on repetitions that fall within BWP, but DMRS sharing may be disabled for the repetitions that falls on other BWPs. Further, each BWP may have a different density for DMRS sharing. For example, a bitmap used to indicate the sequence of dropping DMRS may vary from BWP to another.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 33A:
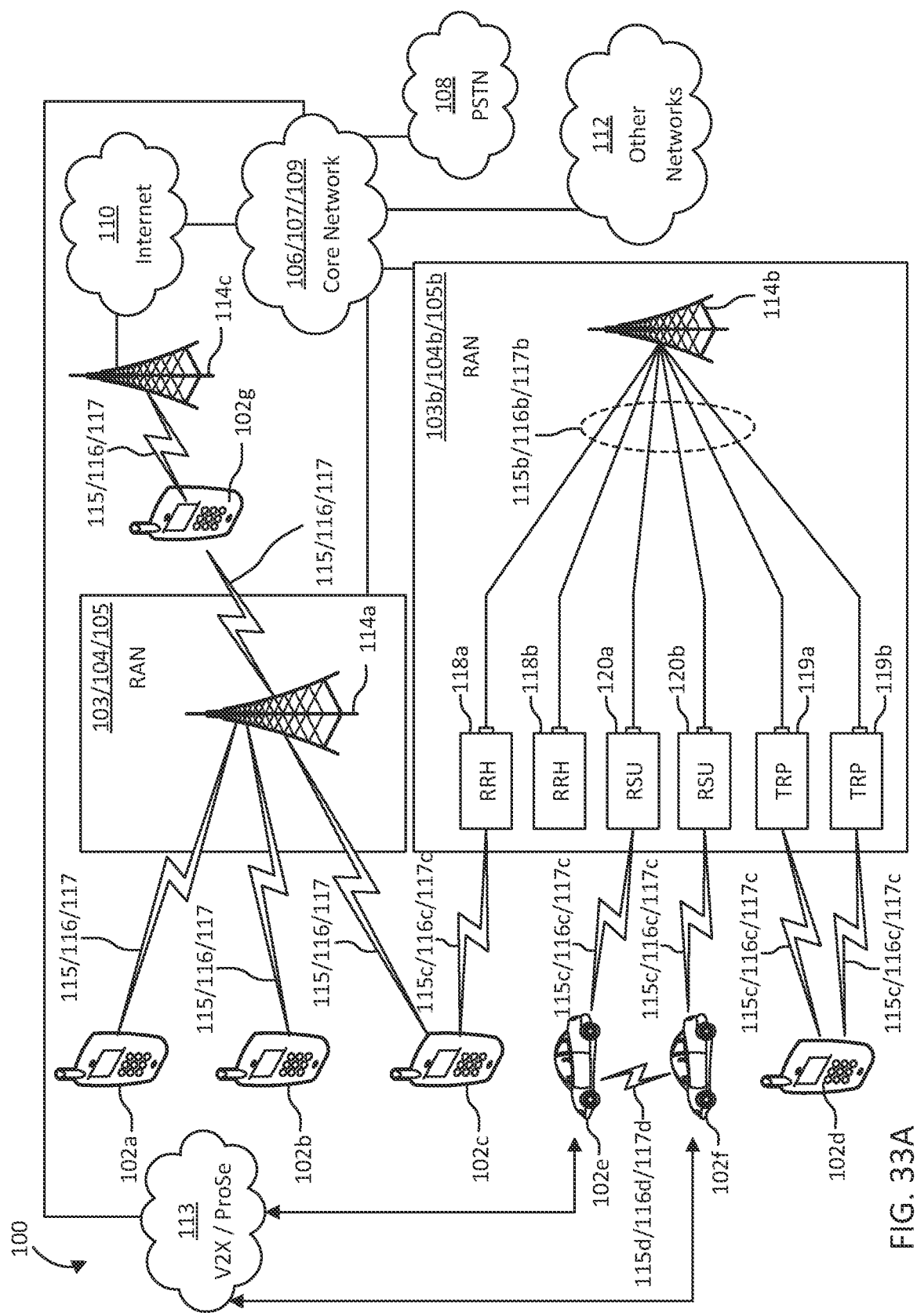
FIG. 33A illustrates an example communications system in which the methods and apparatuses described and claimed herein may be embodied.

FIG. 33A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 33A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 33A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 33A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 33A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 33A may be configured to communicate with the base station 114a, which may employ a cellular-based radio technology, and with the base station 114c, which may employ an IEEE 802 radio technology.

Figure 33B:
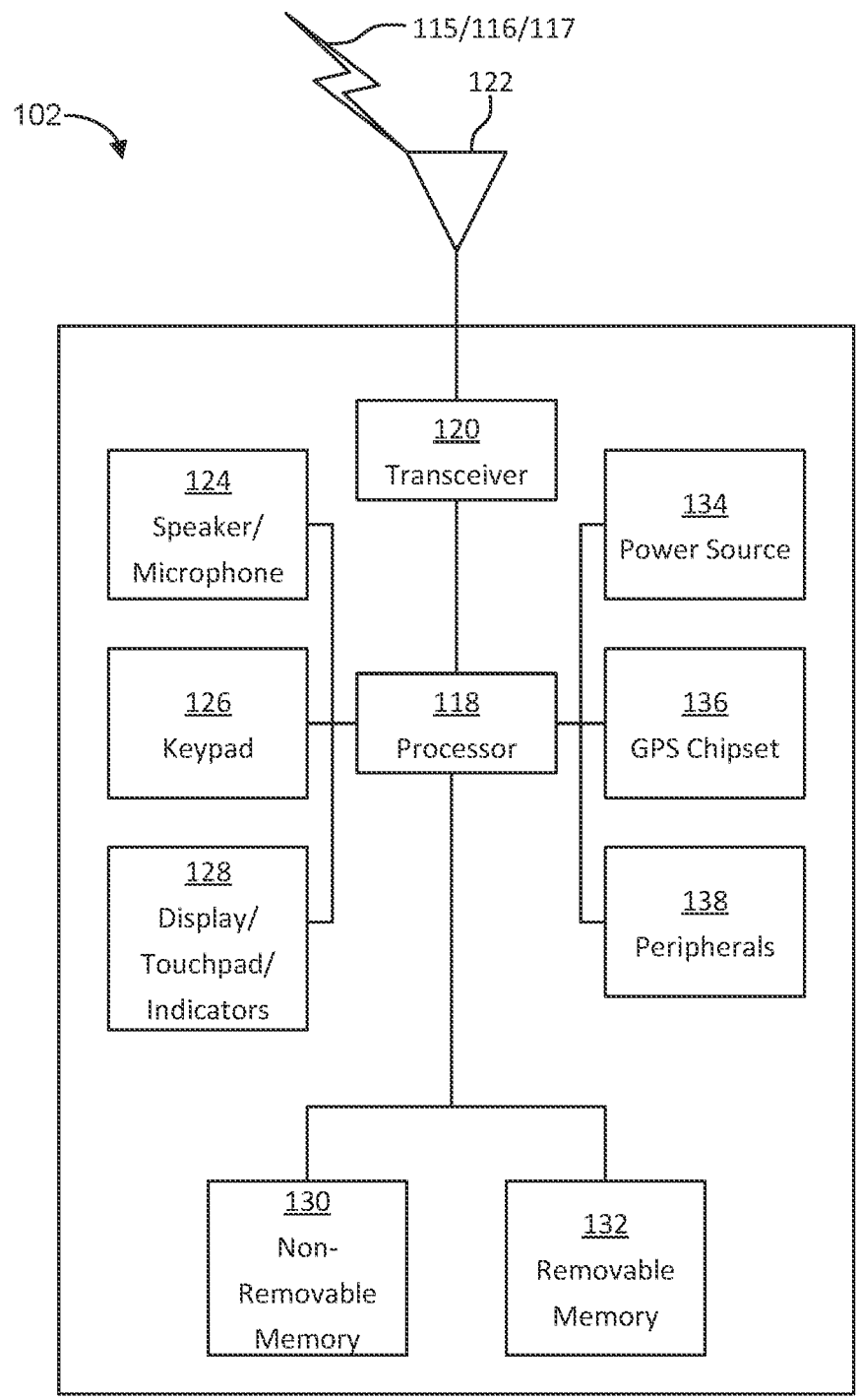
FIG. 33B is a block diagram of an example apparatus or device configured for wireless communications.

FIG. 33B is a block diagram of an example apparatus or device configured for wireless communications in accordance with the embodiments illustrated herein, such as for example, a WTRU 102. As shown in FIG. 33B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 33B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 33B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 33B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 33C:
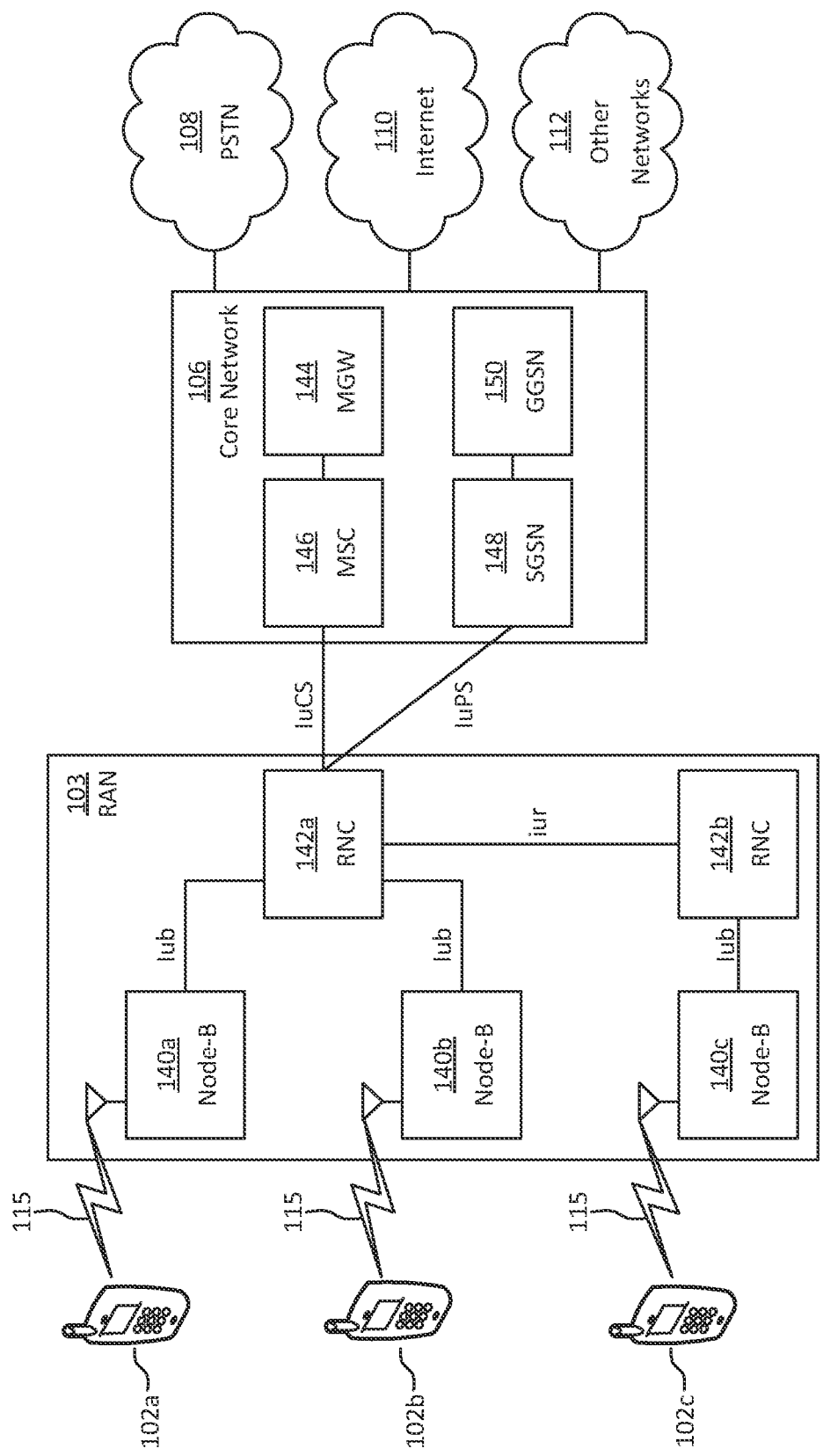
FIG. 33C is a system diagram of an example radio access network (RAN) and core network.

FIG. 33C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 33C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 33C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 33C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 33D:
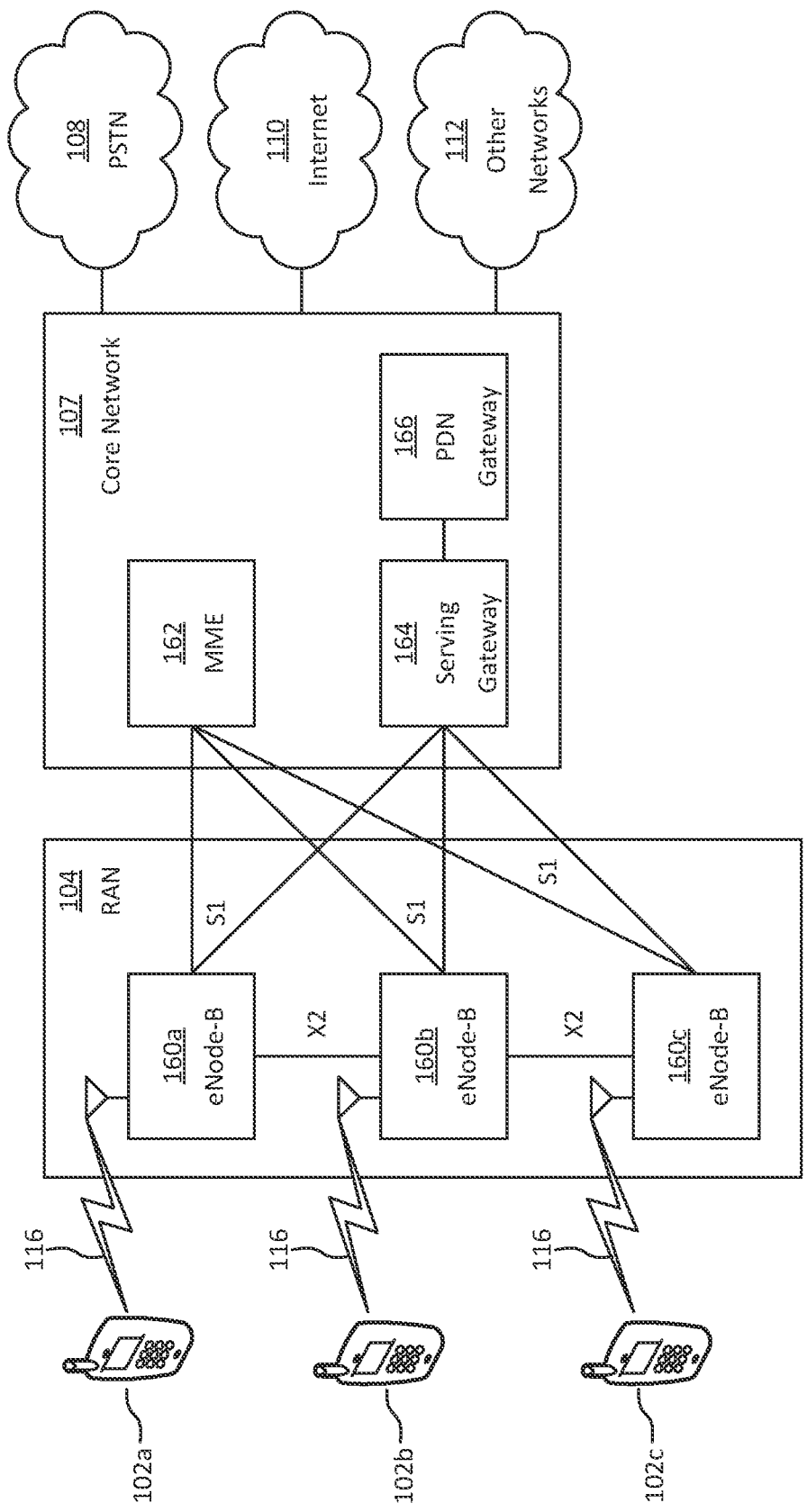
FIG. 33D is a system diagram of another example RAN and core network.

FIG. 33D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 33D, the eNode-Bs 160a, 160b, 160c may communicate with one another over an X2 interface.

The core network 107 shown in FIG. 33D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 33E:
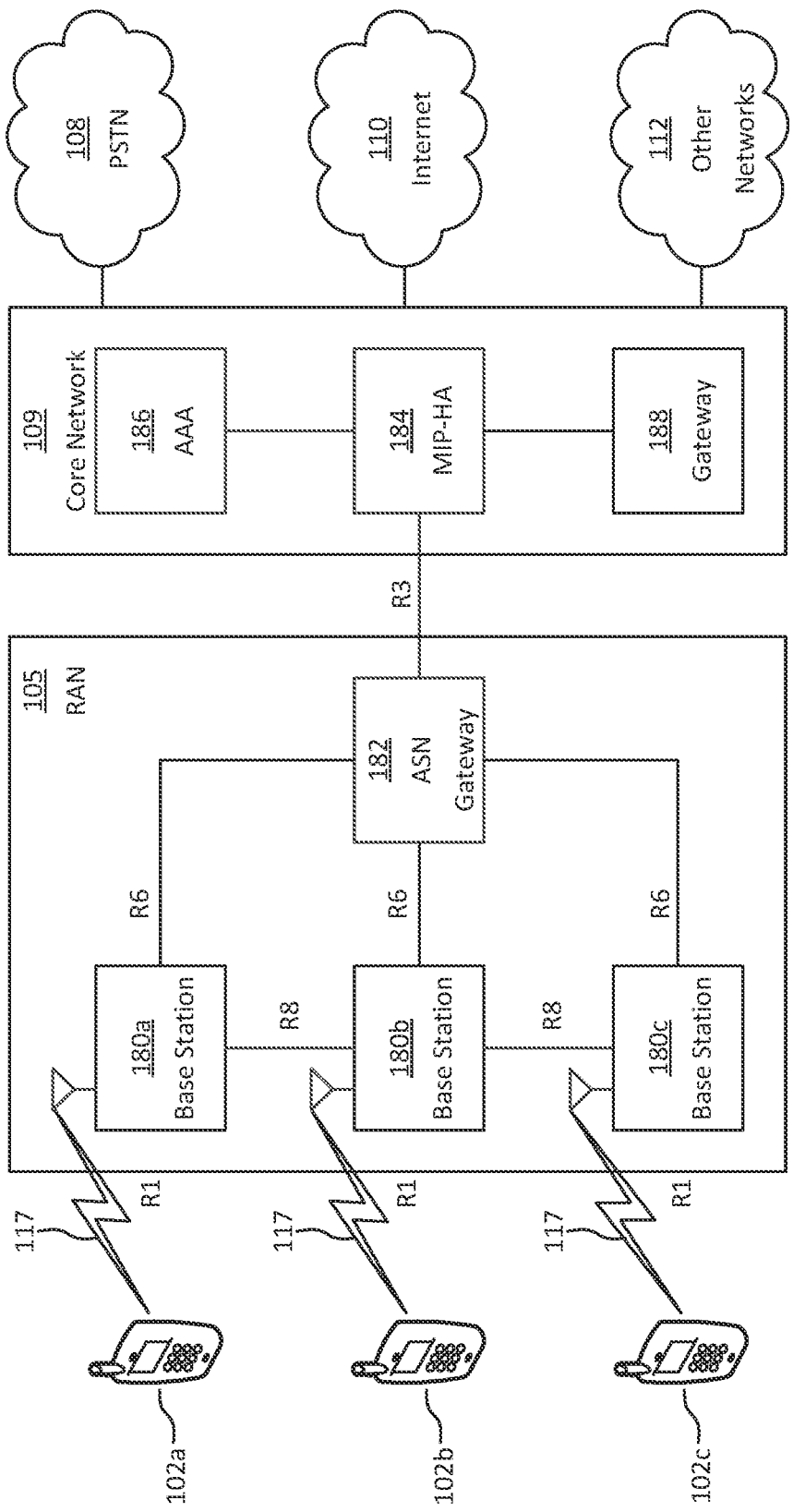
FIG. 33E is a system diagram of another example RAN and core network.

FIG. 33E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 33E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 33E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MUP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 33E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 33A, 33C, 33D, and 33E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 33-AE are provided by way of example only, and it is understood that the subject matter disclosed and claimed herein may be embodied or implemented in any similar communication system, whether presently defined or defined in the future.

Figure 33F:
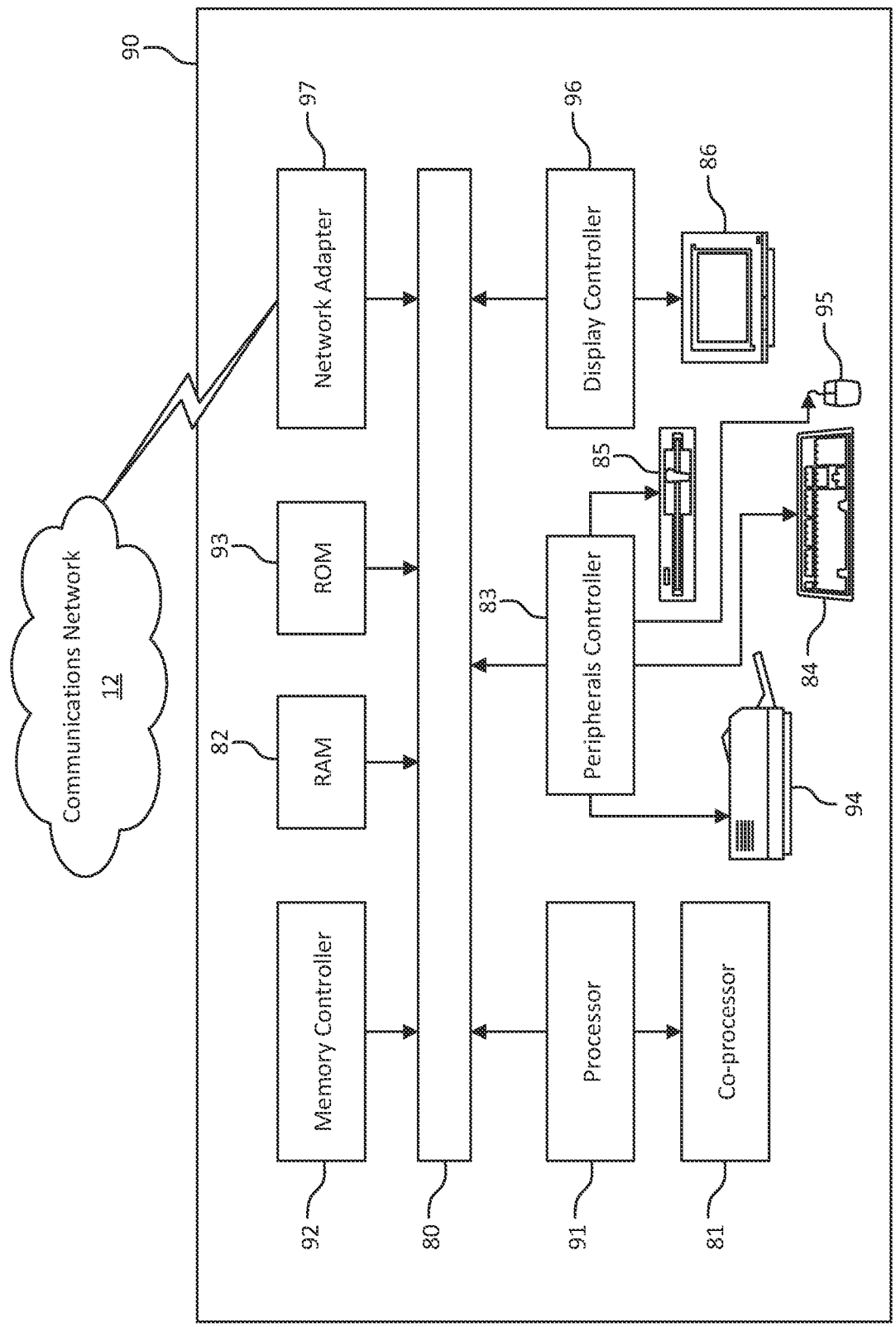
FIG. 33F is a block diagram of an example computing system.

FIG. 33F is a block diagram of an exemplary computing system 90 in which one or more apparatuses of the communications networks illustrated in FIGS. 33A, 33C, 33D, and 33E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91.

Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 33A-E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 33G:
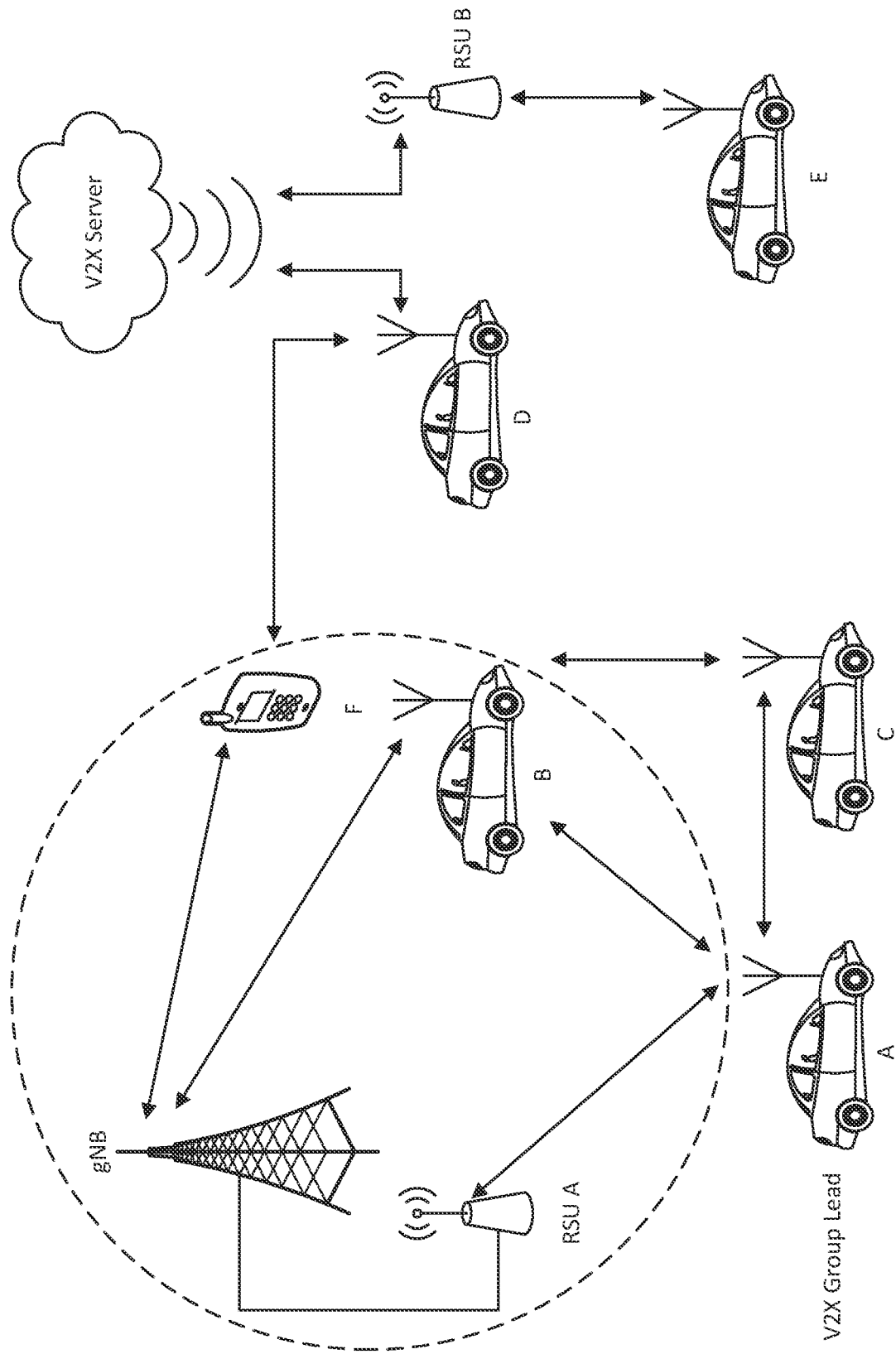
FIG. 33G is a block diagram of another example communications system.

FIG. 33G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

TABLE 0

| | Abbreviations |
|---|---|
| ACK | Acknowledgement |
| BWP | Bandwidth part |
| CORESET | Control Resource Set |
| C-RNTI | Cell Radio-Network Temporary Identifier |
| CSI-RS | Channel State Information-Reference Signal |
| CS-RNTI | Configured Scheduling Radio-Network Temporary Identifier |
| DCI | DL Control Information |
| DL | Downlink |
| DL SPS | Downlink Semi-Persistent Scheduling |
| DMRS | Demodulation reference signals |
| eMBB | Enhanced Mobile Broadband |
| FDD | Frequency Division Duplexing |
| GC-PDCCH | Group Common Physical Downlink Control Channel |
| gNB | Next Generation NodeB |
| IE | Information Element |
| MAC-CE | Medium Access Control-Control Element |
| MCS | Modulation Coding Scheme |
| MCS-RNTI | Modulation Coding Scheme Radio-Network Temporary Identifier |
| MsgA | Message A |
| M-TRP | Multiple-TRP |
| NACK | Negative Acknowledgement |
| NR | New Radio |
| OFDM | Orthogonal Frequency Division Multiplexing |
| PDCCH | Physical Downlink Control Channel |
| PHY | Physical Layer |
| PRACH | Physical Random-Access Channel |
| PRB | Physical Resource Block |
| PUCCH | Physical uplink control channel |
| PUSCH | Physical uplink shared channel |
| QCL | Quasi Co-Location |
| RACH | Random Access Channel |
| RAN | Radio Access Network |
| RBs | Resource Blocks |
| REs | Resource Elements |

TABLE 0-continued

Abbreviations

| | |
|---|---|
| RRC | Radio Resource Control |
| RS | Reference signal |
| RSU | Roadside Unit |
| RV | Redundancy Version |
| SFI | Slot Format Indicator |
| SL | SideLink |
| SLIV | Start and Length Indicator Value |
| SRS | Sounding reference signal |
| SSB | Synchronization Signal Block |
| TCI | Transmission Configuration Indication |
| TDD | Time Division Duplexing |
| TDRA | Time Domain Resource Allocation |
| TRP | Transmission and Reception Point |
| UCI | Uplink Control Information |
| UE | User Equipment |
| UL | Uplink |
| URLLC | Ultra-Reliable and Low-Latency Communications |

TABLE 1

Possible PUSCH mapping types for each PUSCH repetition type

| | PUSCH repetition Type A | PUSCH repetition Type B |
|---|---|---|
| PUSCH mapping Type A | Allowed | Not allowed |
| PUSCH mapping Type B | Allowed | Allowed |

TABLE 2

Mapping Original repetition MCS index when it is divided into two sub-repetitions

| $z_{mini,1}$ ($z_{mini,2} = z - z_{mini,1}$) | MCS index of the $1^{st}$ sub-repetition | MCS index of the $2^{nd}$ sub-repetition |
|---|---|---|
| 2 (z-2) | $MCS_z + \alpha_2$ | $MCS_z + \beta_2$ |
| . | . | . |
| . | . | . |
| . | . | . |
| z-2 (2) | $MCS_z + \alpha_{z-2}$ | $MCS_z + \beta_{z-2}$ | where $\alpha_i$ and $\beta_i$, $i \in \{2, 3, \ldots, z-2\}$, may be specified parameters, provided in the protocol specifications or they may be configured through high layer signaling such as RRC.

TABLE 3

Rep_Compensation information element

Rep_Compensation information element

```
-- ASN1START
-- TAG-SPS-CONFIG-START
Rep_Compensation ::=              SEQUENCE {
  Offset               CHOICE {
    Sym2                             INTEGER (0..13),
    Sym4                             INTEGER (0..13),
    Sym6                             INTEGER (0..13),
    Sym10                            INTEGER (0..13),
  }
  Comp_window    ENUMERATED {sym2, sym7, s11, s15, 10}     OPTIONAL,
  CompRV         ENUMERATED {s1-0231, s2-0303, s3-0000}    OPTIONAL,
}
-- TAG-SPS-CONFIG-STOP
-- ASN1STOP
```

Rep_Compensation field descriptions
Offset

Configures the offset between the last scheduled or configured repetition and first candidate location for dropped repetitions compensation and it configures the spacing between the candidate location. For example, if Offset is set to Sym2-5, this means that there are two OFDM symbol spacing between the end of the last configured/scheduled repetition and the beginning of the first candidate location for repetition compensation. Those candidate locations are spaced by 5 OFDM symbols.
comp_window Configure the window for repetition compensation and it starts after the last configured/scheduled repetition.
CompRV The redundancy version sequence to be used for the compensated repetitions. If more than four repetitions need to be compensated, then the RV will be cycled across those repetitions. If this parameter is absent, the compensation of any dropped repetition has the same RV.

TABLE 4

| | PDSCH DMRS position for single-symbol DMRS | | | | | | | | | | |
|---|---|---|---|---|---|---|---|---|---|---|---|
| | DM-RS positions $\bar{l}$ | | | | | | | | | | |
| | PDSCH mapping type A | | | | | | | PDSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | |
| | pos0 | | pos1 | | pos0 | | pos1 | | pos0 | | pos1 | |
| $l_d$ in symbols | 1st hop | 2nd hop | 1st hop | 2nd hop | 1st hop | 2nd hop | 1st hop | 2nd hop | 1st hop | 2nd hop | 1st hop | 2nd hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

We claim:

1. A wireless transmit/receive unit (WTRU) comprising a processor and memory storing instructions that, when executed by the processor, cause the WTRU to perform operations comprising:
   receiving a first message comprising first information indicating one or more sequences of starting frequencies for a plurality of bandwidth parts (BWPs);
   receiving a second message comprising second information indicating one of the one or more sequences of starting frequencies for a first BWP of the plurality of BWPs;
   transmitting one or more physical uplink shared channel (PUSCH) repetitions or receiving one or more physical downlink shared channel (PDSCH) repetitions at a first frequency within the first BWP based on a first starting frequency of the indicated one of the one or more sequences of starting frequencies;
   switching the first starting frequency of the first BWP to a second starting frequency of the indicated one of the one or more sequences of starting frequencies, wherein a second BWP is based on the second starting frequency; and
   transmitting one or more additional PUSCH repetitions or receiving one or more additional PDSCH repetitions at a second frequency within the second BWP.

2. The WTRU of claim 1, wherein switching the first starting frequency of the first BWP to the second starting frequency of the second BWP is performed after a number of repetitions have been transmitted or received.

3. The WTRU of claim 1, wherein switching the first starting frequency of the first BWP to the second starting frequency of the second BWP is performed after a number of slots.

4. The WTRU of claim 1, wherein an identifier is associated with the first BWP, and wherein the identifier associated with the first BWP does not change when the first starting frequency of the first BWP is switched from the first starting frequency to the second starting frequency.

5. The WTRU of claim 1, wherein the one or more sequences of starting frequencies for the plurality of BWPs are received via radio resource control (RRC) signaling.

6. The WTRU of claim 1, wherein the indication of the one of the one or more sequences of starting frequencies is received via one of: a medium access control (MAC) control element (CE), a downlink control information (DCI), or a group-common physical downlink control channel (GC-PDCCH).

7. The WTRU of claim 1, wherein each of the one or more sequences of starting frequencies for the plurality of BWPs is specified as a sequence of offsets relative to a first resource block allocated for each BWP of the plurality of BWPs.

8. The WTRU of claim 1, wherein the one or more sequences of starting frequencies for the plurality of BWPs are indicated via a sequence of location and bandwidth parameters.

9. A method implemented in a wireless transmit/receive unit (WTRU), the method comprising:
   receiving a first message comprising first information indicating one or more sequences of starting frequencies for a plurality of bandwidth parts (BWPs);
   receiving a second message comprising second information indicating one of the one or more sequences of starting frequencies for a first BWP;
   transmitting one or more physical uplink shared channel (PUSCH) repetitions or receiving one or more physical downlink shared channel (PDSCH) repetitions at a first frequency within the first BWP based on a first starting frequency of the indicated one of the one or more sequences of starting frequencies;
   switching the first starting frequency of the first BWP to a second starting frequency of the one of the one or more indicated sequences of starting frequencies, wherein a second BWP is based on the second starting frequency; and
   transmitting one or more additional PUSCH repetitions or receiving one or more additional PDSCH repetitions at a second frequency within the second BWP.

10. The method of claim 9, wherein switching the first starting frequency of the first BWP to the second starting frequency of the second BWP is performed after a number of repetitions have been transmitted or received.

11. The method of claim 9, wherein switching the first starting frequency of the first BWP to the second starting frequency of the second BWP is performed after a number of slots.

12. The method of claim 9, wherein an identifier is associated with the first BWP, and wherein the identifier associated with the first BWP does not change when the first starting frequency of the first BWP is switched from the first starting frequency to the second starting frequency.

13. The method of claim 9, wherein the one or more sequences of starting frequencies for the plurality of BWPs are received via radio resource control (RRC) signaling.

14. The method of claim 9, wherein the indication of the one of the one or more sequences of starting frequencies is received via one of: a medium access control (MAC) control element (CE), a downlink control information (DCI), or a group-common physical downlink control channel (GC-PDCCH).

15. The method of claim 9, wherein each of the one or more sequences of starting frequencies for the plurality of BWPs is specified as a sequence of offsets relative to a first resource block allocated for each BWP of the plurality of BWPs.

16. The method of claim 9, wherein the one or more sequences of starting frequencies for the plurality of BWPs are indicated via a sequence of location and bandwidth parameters.

* * * * *